US006254945B1

(12) United States Patent
Simmons

(10) Patent No.: US 6,254,945 B1
(45) Date of Patent: Jul. 3, 2001

(54) CUSHIONING PRODUCT

(75) Inventor: James A. Simmons, Painesville Township, OH (US)

(73) Assignee: Ranpak Corp., Concord Township ( * ) Notice: Subject to any disclaimer, the term of this patent is extended or adjusted under 35 U.S.C. 154(b) by 0 days.

(21) Appl. No.: 08/482,639

(22) Filed: Jun. 7, 1995

Related U.S. Application Data

(63) Continuation of application No. 08/482,649, filed on Jun. 7, 1995, now Pat. No. 5,643,167, which is a continuation of application No. PCT/US95/04113, filed on Apr. 3, 1995, which is a continuation-in-part of application No. 08/221,624, filed on Apr. 1, 1994, now Pat. No. 5,791,483.

(51) Int. Cl.[7] ..................... B32B 1/06

(52) U.S. Cl. ..................... 428/35.2; 428/34.3; 428/68; 206/584; 206/814; 493/967

(58) Field of Search ..................... 428/68, 98, 194, 428/34.3, 35.2; 206/584, 814; 162/109; 493/967

(56) References Cited

U.S. PATENT DOCUMENTS

| | | | |
|---|---|---|---|
| 1,989,794 | 1/1935 | Duvall | 154/54 |
| 2,425,123 | 8/1947 | Quayle et al. | 164/17 |
| 3,256,673 * | 6/1966 | Tew et al. | 53/182 |
| 3,323,983 | 6/1967 | Palmer et al. | 162/362 |
| 3,377,224 | 4/1968 | Gresham et al. | 156/209 |
| 3,603,216 | 9/1971 | Johnson | 93/1 WZ |
| 3,606,726 * | 9/1971 | Spertus et al. | 493/967 |
| 3,613,522 | 10/1971 | Johnson | 93/1 WZ |
| 3,650,877 | 3/1972 | Johnson | 161/47 |
| 3,655,500 | 4/1972 | Johnson | 161/104 |
| 4,026,198 | 5/1977 | Ottaviano | 93/1 WZ |
| 4,237,776 | 12/1980 | Ottaviano | 493/382 |
| 4,557,716 | 12/1985 | Ottaviano | 493/464 |
| 4,717,613 | 1/1988 | Ottaviano | 428/129 |
| 4,750,896 | 6/1988 | Komaransky et al. | 493/357 |
| 4,884,999 | 12/1989 | Baldacci | 493/439 |
| 4,937,131 | 6/1990 | Baldacci et al. | 428/131 |
| 4,968,291 | 11/1990 | Baldacci et al. | 493/354 |
| 5,123,889 | 6/1992 | Armington | 493/352 |
| 5,188,581 | 2/1993 | Baldacci | 493/381 |
| 5,211,620 | 5/1993 | Ratzel et al. | 493/346 |
| 5,322,477 | 6/1994 | Armington et al. | 493/346 |
| 5,330,819 * | 7/1994 | Krueger | 206/584 |

* cited by examiner

*Primary Examiner*—Alexander S. Thomas
(74) *Attorney, Agent, or Firm*—Renner, Otto, Boisselle & Sklar, LLP

(57) ABSTRACT

A cushioning product including a pillow-like portion made from multiple plies of a sheet-like stock material. The cushioning product is characterized by the pillow-like portion including an inner stuffing and a shell which surrounds the inner stuffing. The multiple plies of the sheet-like stock material include at least one ply shaped to form the shell of the pillow-like portion and remaining plies crumpled to form the inner stuffing. The inner stuffing is formed only from the remaining plies of the sheet-like stock material.

9 Claims, 43 Drawing Sheets

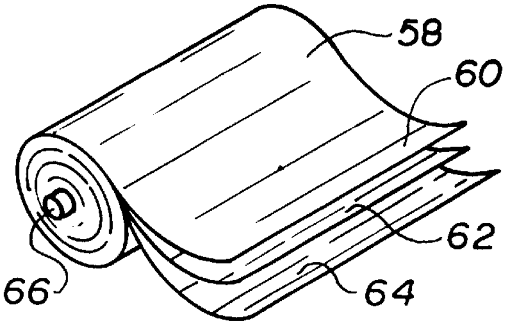
FIG. 3A
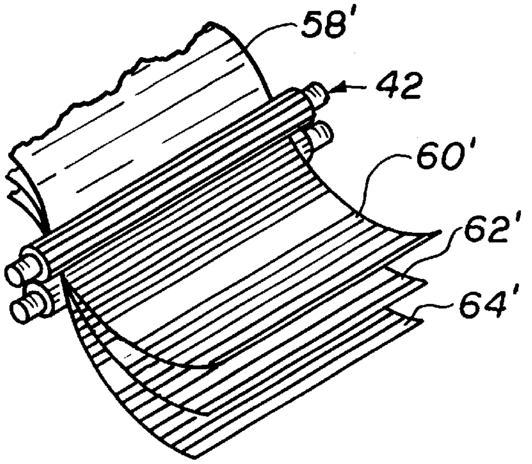
FIG. 3B
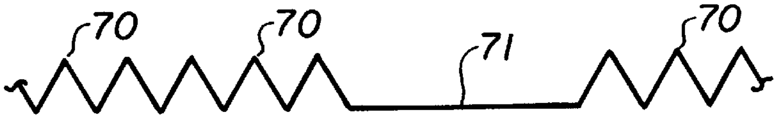
FIG. $3B_1$
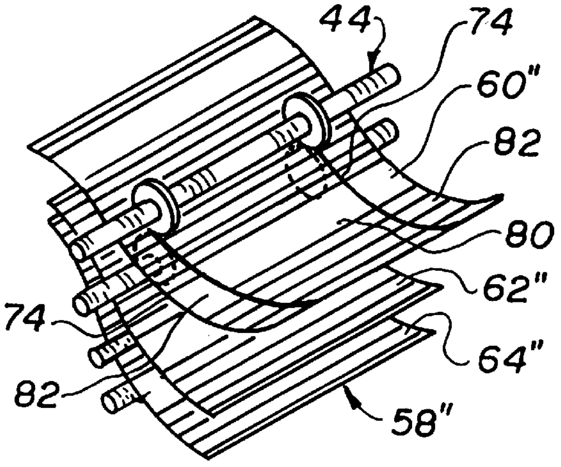
FIG. 3C
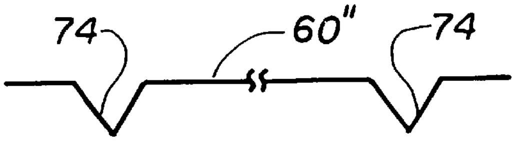
FIG. $3C_1$

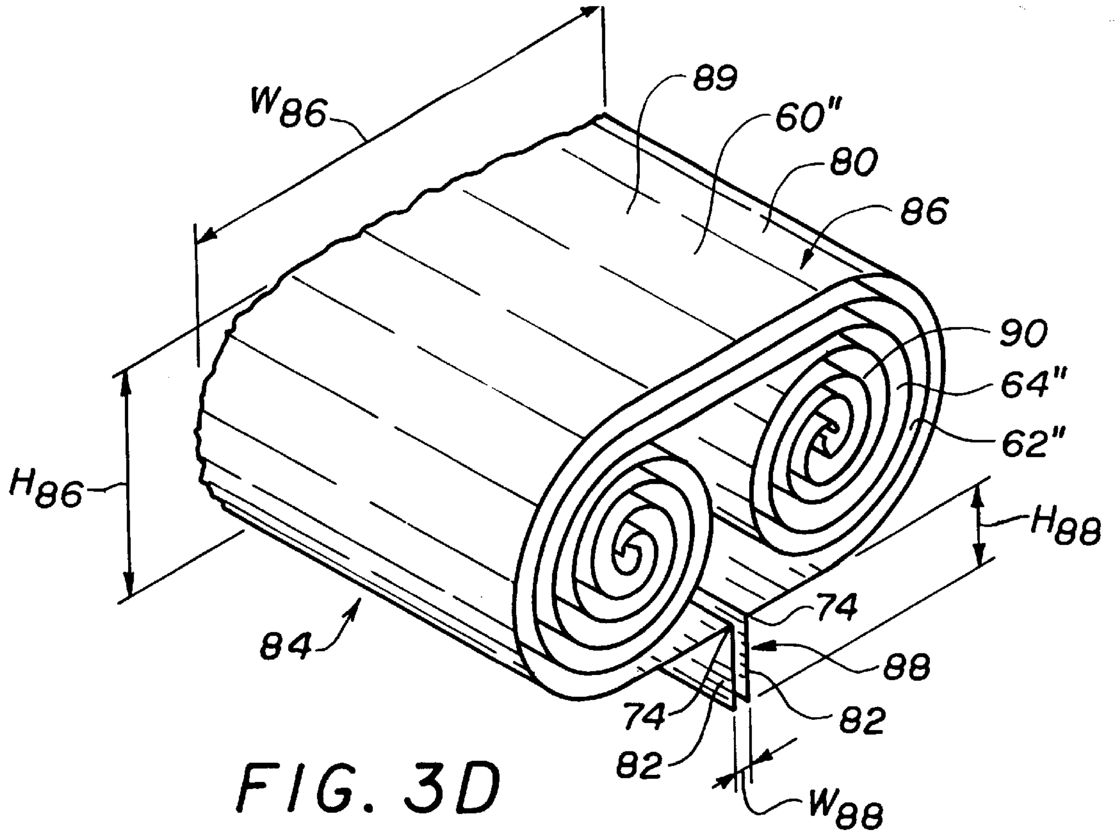
FIG. 3D
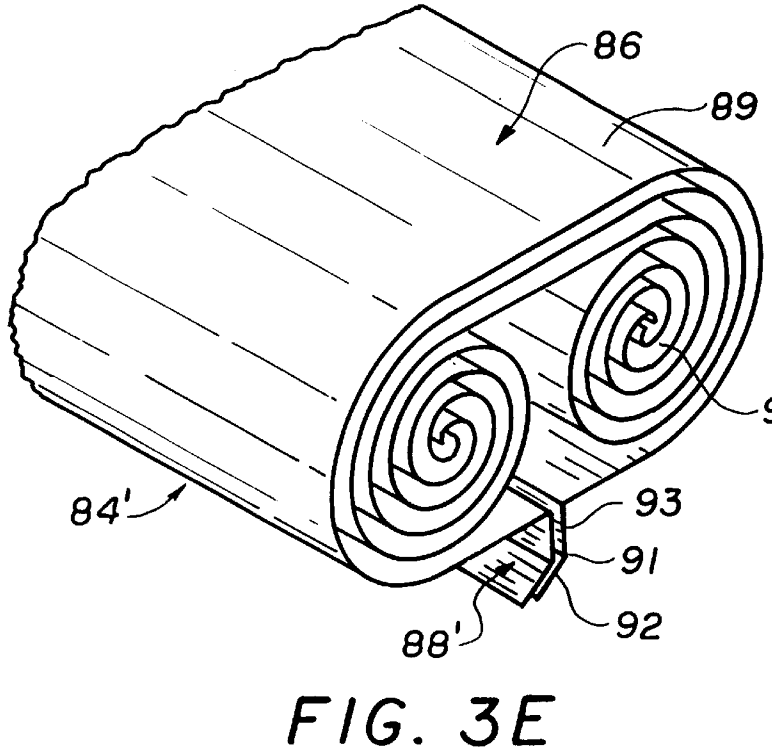
FIG. 3E
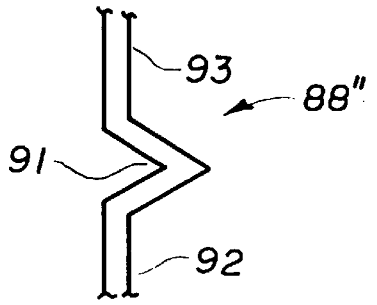
FIG. 3E1

FIG. 3F1

FIG. $3G_1$

FIG. $3G_2$

MATCH TO FIG. 32A

CUSHIONING PRODUCT

This application is a continuation of Ser. No. 08/482,649 filed Jun. 7, 1995, U.S. Pat. No. 5,643,167 which is a continuation of PCT/US95/04113, filed Apr. 3, 1995, which is a continuation-in-part of Ser. No. 08/221,624, filed Apr. 1, 1994 U.S. Pat. No. 5,791,483.

This invention relates generally to a cushioning conversion machine for converting sheet-like stock material into a cushioning product, a cushioning product and method of using same, and a method of converting sheet-like stock material into a cushioning product.

In the process of shipping an item from one location to another, a protective packaging material is typically placed in the shipping case, or box, to fill any voids and/or to cushion the item during the shipping process. Some conventional protective packaging materials are plastic foam peanuts and plastic bubble pack. While these conventional plastic materials seem to adequately perform as cushioning products, they are not without disadvantages. Perhaps the most serious drawback of plastic bubble wrap and/or plastic foam peanuts is their effect on our environment. Quite simply, these plastic packaging materials are not biodegradable and thus they cannot avoid further multiplying our planet's already critical waste disposal problems. The non-biodegradability of these packaging materials has become increasingly important in light of many industries adopting more progressive policies in terms of environmental responsibility.

The foregoing and other disadvantages of conventional plastic packaging materials have made paper protective packaging material a very popular alterative. Paper is biodegradable, recyclable and renewable, making it an environmentally responsible choice for conscientious industries.

While paper in sheet form could possibly be used as a protective packaging material, it is usually preferable to convert the sheets of paper into a relatively low density pad-like cushioning dunnage product. This conversion may be accomplished by a cushioning conversion machine/method, such as those disclosed in U.S. Pat. Nos. 3,509,798, 3,603,216, 3,655,500, 3,779,039, 4,026,198, 4,109,040, 4,717,613 and 4,750,896, and also in pending U.S. patent applications Ser. Nos. 07/533,755, 07/538,181, 07/592,572, 07/734,512, 07/786,573, 07/840,306 and 07/861,225.

With most, if not all, of the conversion processes/machines disclosed in the above-identified patents and applications, the cushioning product is created by converting multi-layer, and preferably three-layer, paper stock material into the desired geometry. The cushioning product includes pillow-like portions formed by the lateral edges of all of the layers of stock paper being rolled inwardly to form a pair of twin spirals. The central regions of this structure are then compressed and connected (such as by coining) to form a central compressed portion and two lateral pillow-like portions which essentially account for the cushioning qualities of the product.

The central compressed portion of such a cushioning product is believed to be necessary to ensure that the pillow-like portions optimally maintain their cushioning qualities. In other words, without a connection of this type, the resiliency of the pillow-like portions would encourage the twin spirals to "unwind." However, the central portion, due to its compressed state, increases the density of the overall cushioning product. For example, the cushioning product created by the conversion process/machine set forth in U.S. Pat. No. 4,026,198 possesses a density of approximately 1 pound/foot$^3$.

In the past, attempts have been made to decrease the density of the cushioning products by altering its construction. Specifically, U.S. Pat. No. 4,717,613 introduced a conversion process/machine which creates a cushioning product having an overall density of approximately 0.6 to 0.7 pound/foot$^3$. This decrease in density is accomplished by urging the stock material outwardly into the pillow-like portions whereby the central compressed section is comprised of a lesser amount of stock material.

Despite past improvements, applicants believe a need remains for conversion processes/machines which create paper cushioning products of even lower densities. Moreover, irrespective of particular density properties, environmental and other concerns provide a constant desire for new and effective paper cushioning products and for processes/machines for creating such products.

The present invention provides a cushioning conversion machine and method for converting multi-layer stock material into a cushioning product. The construction of the cushioning product is such that the product's overall density is relatively low while at the same time the integrity of the product's cushioning qualities are maintained. Moreover, the cushioning product of the present invention may be, and preferably is, made of paper which is biodegradable, recyclable and renewable. Accordingly, the present invention provides an environmentally responsible alternative to plastic packaging products.

According to one aspect of the invention, there is provided a cushioning conversion machine designed to convert a stock material, which includes at least a first layer and a second layer, into a cushioning product. In the cushioning product, the layers of the stock material form a pillow-like portion and at least one tab portion which projects from the pillow-like portion. The tab portion is connected in such a manner that the pillow-like portion maintains its pillow-like geometry. The cushioning product preferably has a density in the range of 0.30–0.50 pounds/foot$^3$ and more preferably has a density approximately equal to 0.35–0.40 pounds/foot$^3$.

The cushioning conversion machine includes a frame and conversion assemblies which are mounted to the frame. The conversion assemblies, which convert the stock material into the cushioning product, include a stock-shaping assembly and a tab-connecting assembly. The stock-shaping assembly shapes the stock material into a continuous strip having a pillow-like portion and at least one tab portion projecting therefrom. The tab-connecting assembly connects the tab portion of the continuous strip whereby the pillow-like portion will maintain its pillow-like geometry.

The stock-shaping assembly according to the present invention comprises shaping devices, one shaping a central section of one or more layers into a casing for the pillow-like portion and lateral end sections into the tab portion or portions. The other shaping device shapes one or more layers of the stock material into a stuffing for the pillow-like portion.

The tab-connecting assembly according to the present invention includes a folding device which folds the tab portion to form a folded tab portion, a connecting device which connects the folded tab portion, and a pulling device which pulls the tab portion through the folding device and the connecting device. The folding device comprises a set of walls shaped and arranged to fold the tab portion to form the folded tab portion. The connecting device comprises coining members which are shaped and arranged to coin, and thereby connect, the folded tab portion.

The conversion assemblies may also include a stock-preparing assembly which prepares the stock material. The preferred stock-preparing assembly includes an embossing device which embosses the stock material with an embossing pattern, a separating device which separates the layers of stock material, and a supplying device which supplies the stock material to the embossing device and the separating device. Additionally or alternatively, the conversion machine may include a strip-cutting assembly which cuts the continuous strip to create a pad of a desired length.

In a method of converting stock material into a cushioning product according to the present invention, a plurality of sheets of stock material are provided. The sheets are shaped into a continuous strip having a pillow-like portion and at least one tab portion projecting therefrom. The tab portion is connected so that the pillow-like portion maintains its pillow-like geometry. Preferably, the plurality of sheets are provided in the form of a multi-layer stock roll.

According to one particular embodiment of the invention, a cushioning conversion machine converts stock material including a pair of outer layers and at least one inner layer into a cushioning product. In the cushioning product, the inner layer or layers of the stock material are crinkled to form a low density stuffing which is sandwiched between the outer layers to form a pillow-like portion. The outer layers are connected along their longitudinal edges by tab portions which project from opposite sides of the pillow-like portion. Each tab portion is connected in such a manner that the pillow-like portion maintains its pillow-like geometry. Preferably, the stock material includes a plurality of inner layers that are first pleated transversely and then rolled or otherwise urged laterally inwardly upon themselves to form the low density stuffing. In a preferred embodiment, each of the layers is 15 inches wide, biodegradable, recyclable, and reusable thirty-pound Kraft paper.

The conversion assemblies, which convert the stock material into the cushioning product, include a stock-shaping assembly and tab-connecting assemblies. The stock-shaping assembly shapes the inner layer or layers as above mentioned and the outer layers such that central sections thereof form respective) halves of a tubular casing and outer edge portions form tab portions. One shaping device shapes the inner layers of the stock material into the stuffing for the pillow-like portion, and another shaping device shapes the central sections of the outer layers into the tubular casing for the pillow-like portion and lateral end sections into the tab portions. The tab portions are brought into juxtaposition, folded and then stitched together by the tab connecting assemblies preferably with the tabs being perforated to securely lock them together. In this manner, the tab-connecting assemblies connect the tab portion of the continuous strip whereby the pillow-like portion will maintain its pillow-like geometry.

According to a further aspect of the invention, a cushioning conversion machine for converting multi-layer stock material into a cushioning product comprises a frame assembly and conversion assemblies which are mounted to the frame assembly and which convert the stock material into the cushioning product, the conversion assemblies including a shaping member having converging side walls, and a feed device for causing at least one layer of stock material to pass through the shaping member so as to cause the layer of stock material to be folded on itself to form a relatively narrow cushioning strip, and the feed device including a pair of cooperating rollers for centrally engaging the cushioning strip, at least one of the rollers being rotatably driven, and one of the rollers having central annular recess and the other having a central annular raised portion projecting into the recess in the other roller to form a generally U-shape passage for the central portion of the cushioning strip between the rollers.

These and other features of the invention are fully described and particularly pointed out in the claims. The following description and annexed drawings set forth in detail illustrative embodiments, these embodiments being indicative of built a few of the various ways in which the principles of the invention may be employed.

BRIEF DESCRIPTION OF THE DRAWINGS

In the annexed drawings:

FIGS. 3A–3H are schematic illustrations of the steps of a method of converting sheet-like stock material into a cushioning product according to the present invention;

Figure 3F:
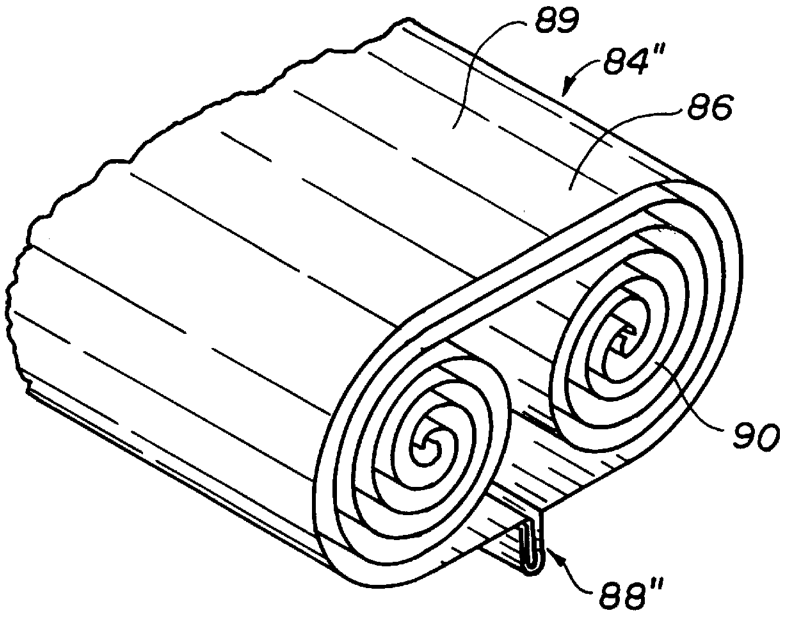
Figure 3G:
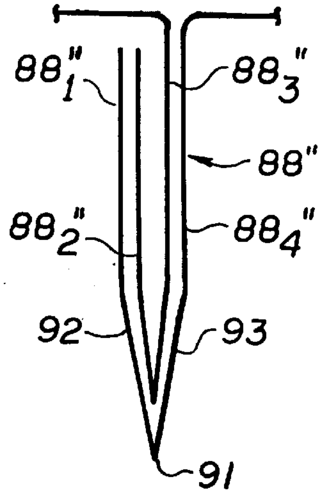
Figure 3G:
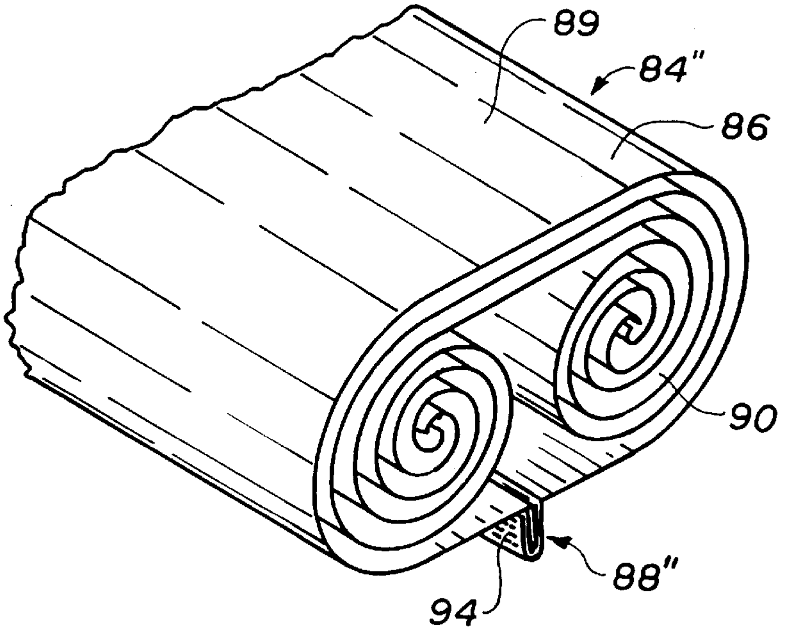
Figure 3H:
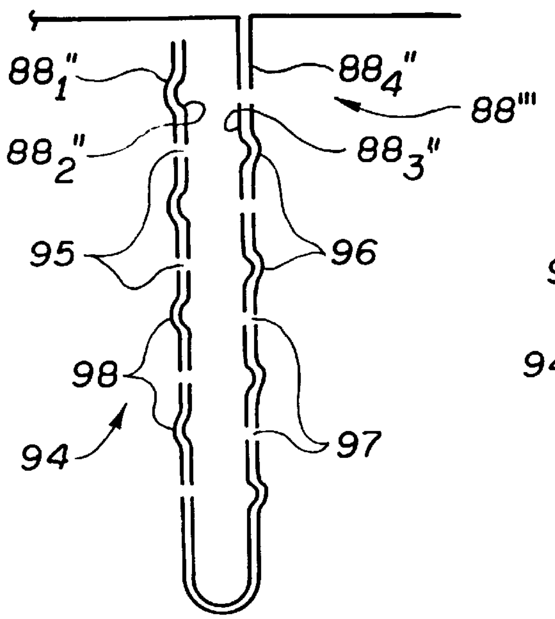
Figure 3H:
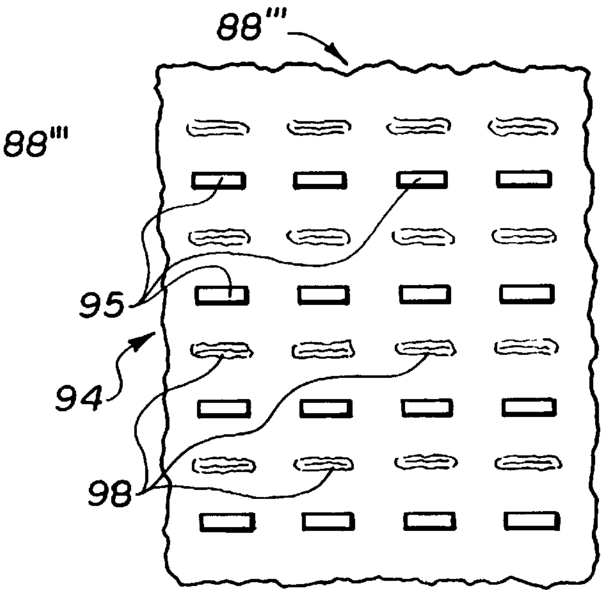
Figure 3H:
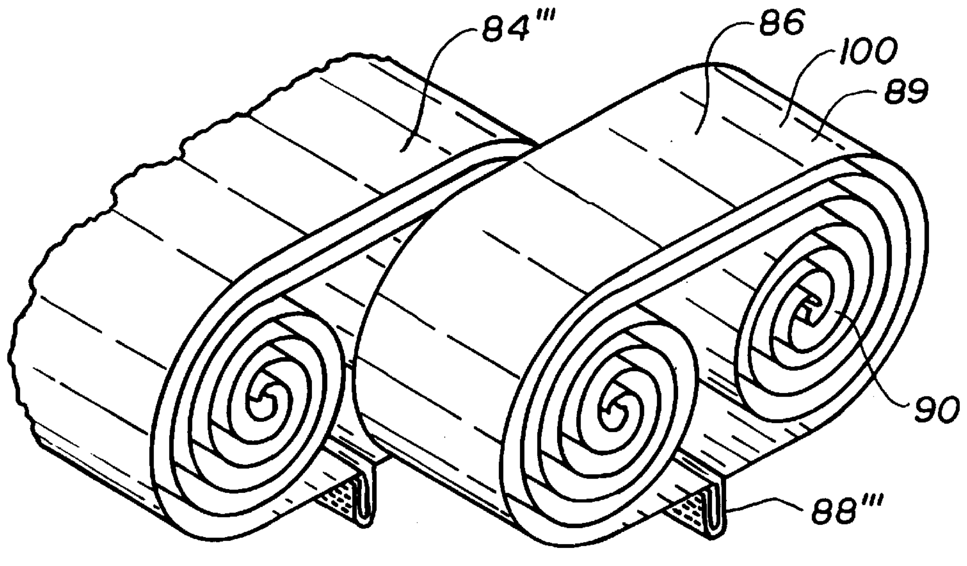
Figure 4:
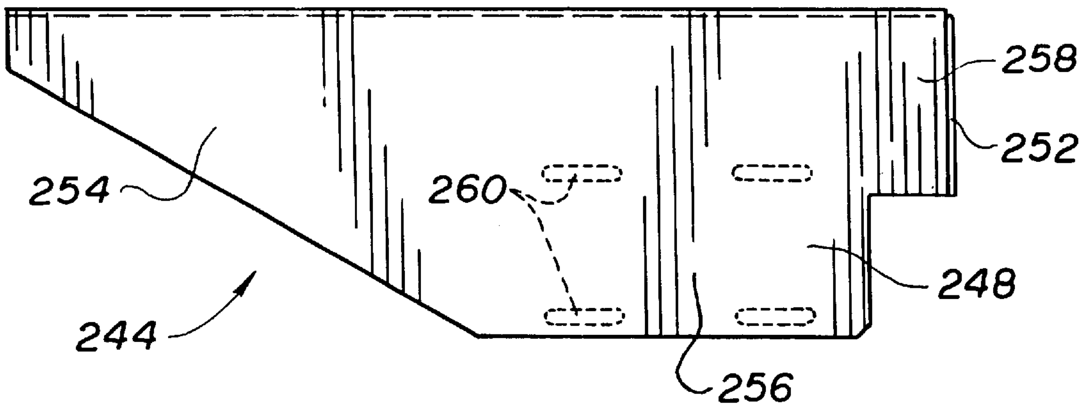
Figure 5:
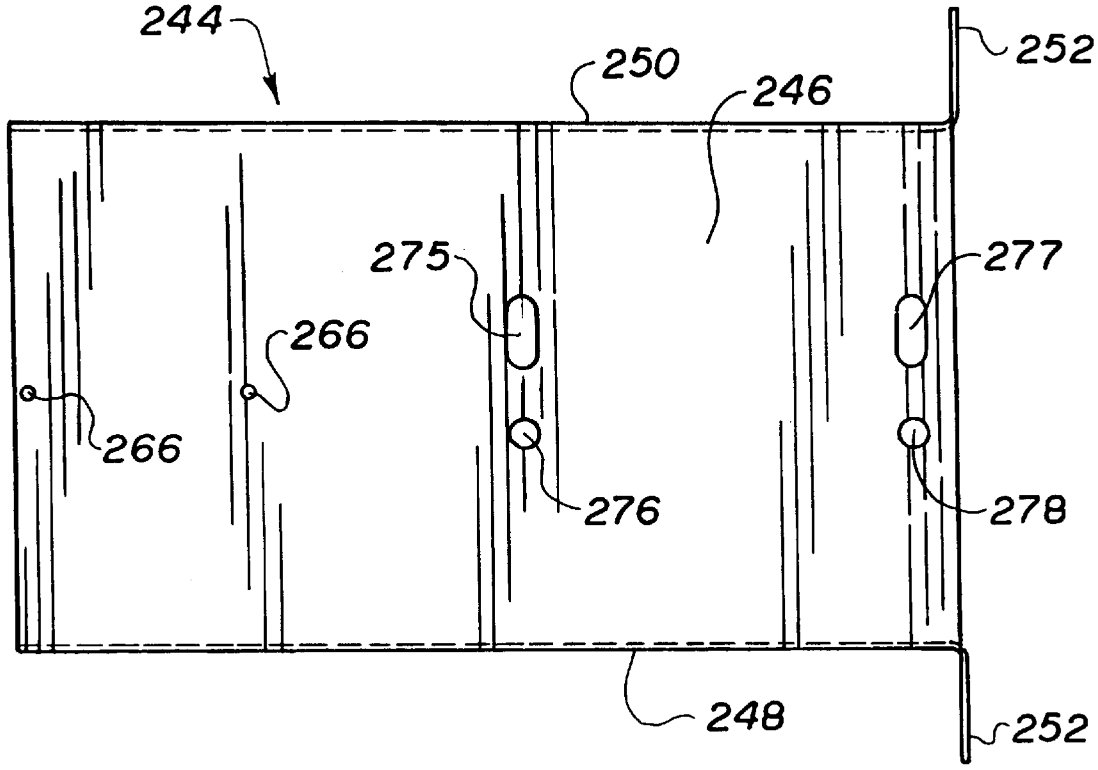
Figure 6:
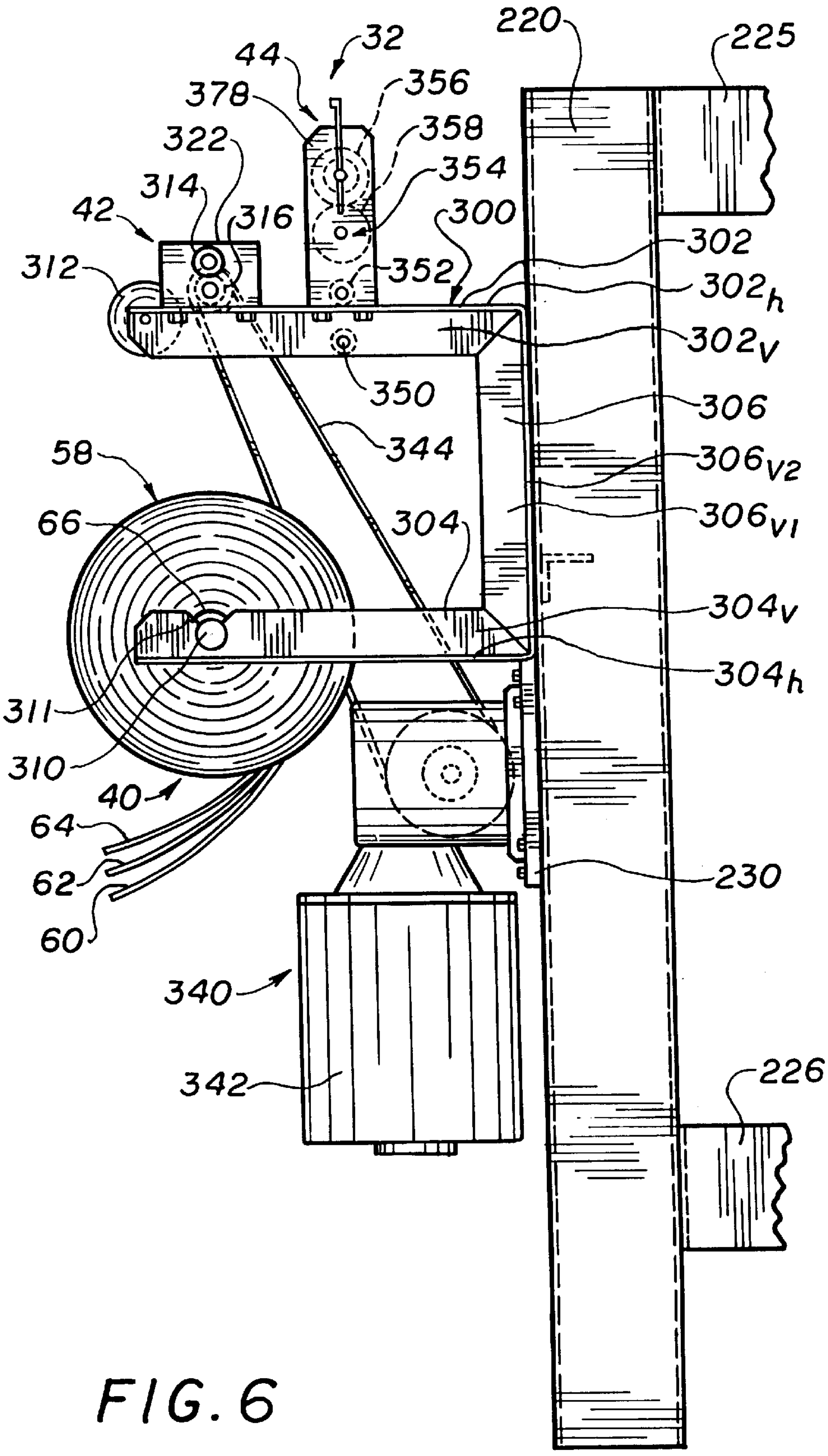
Figure 7:
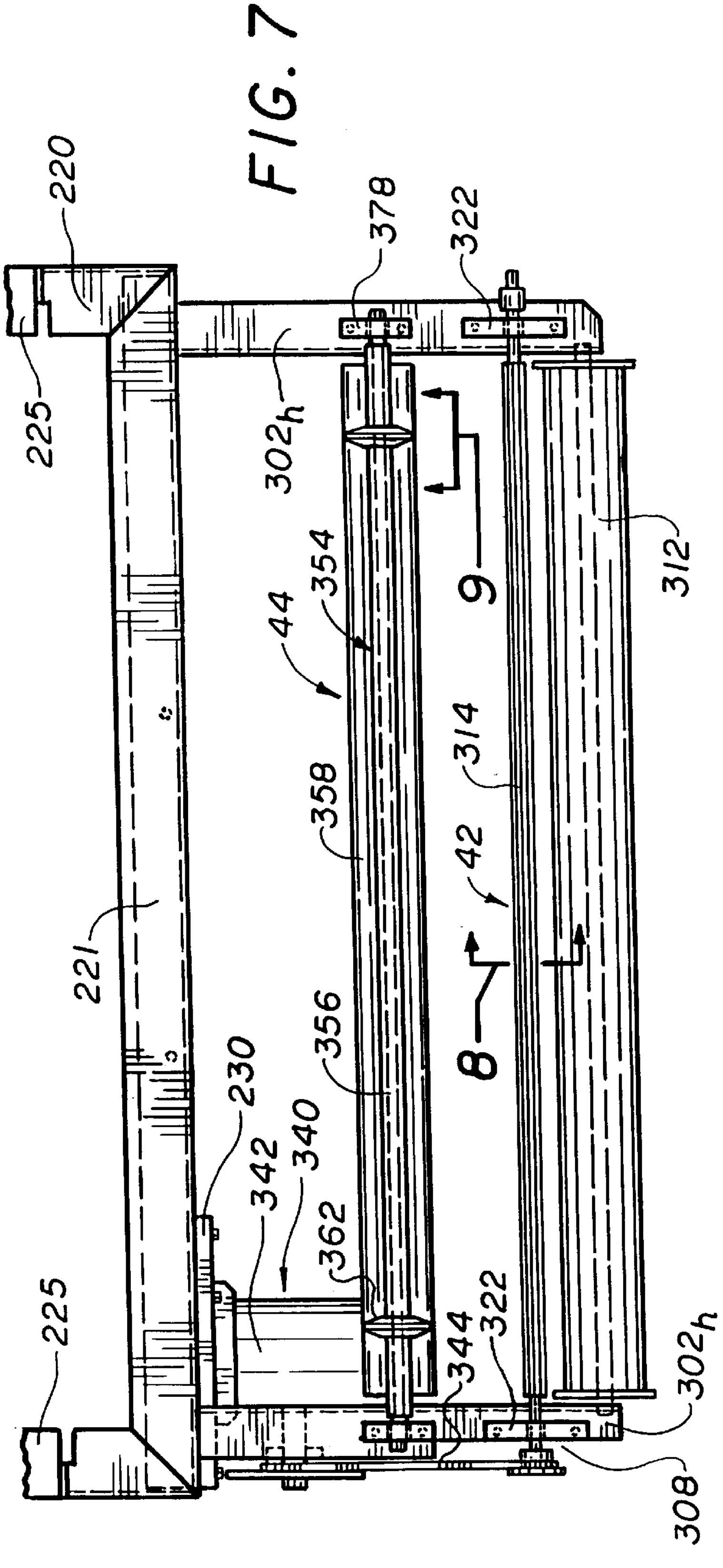
Figure 9:
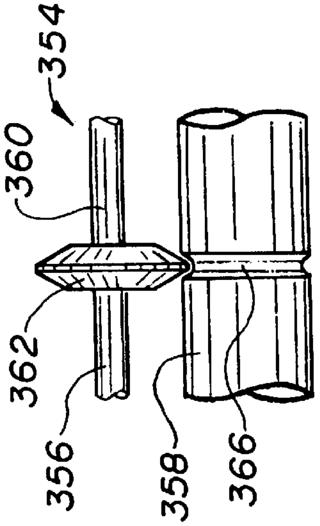
Figure 8:
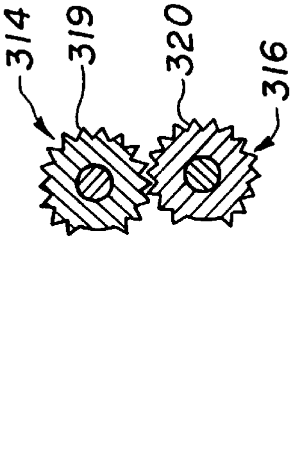
Figure 10:
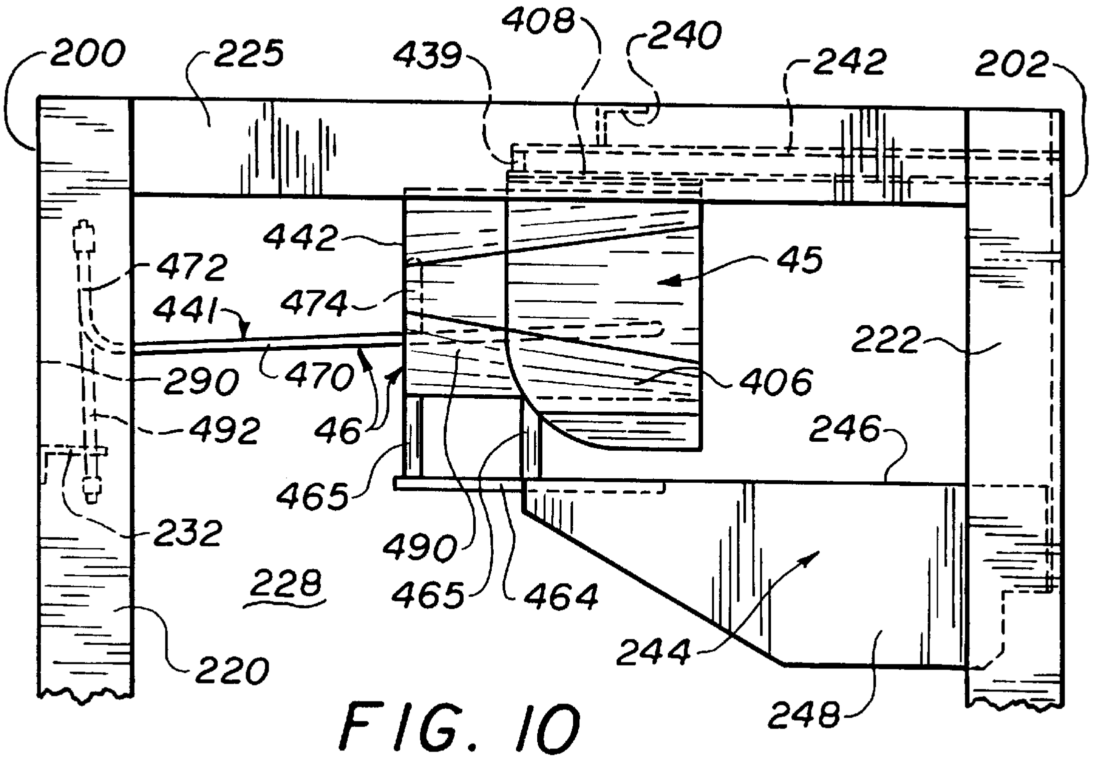
Figure 11:
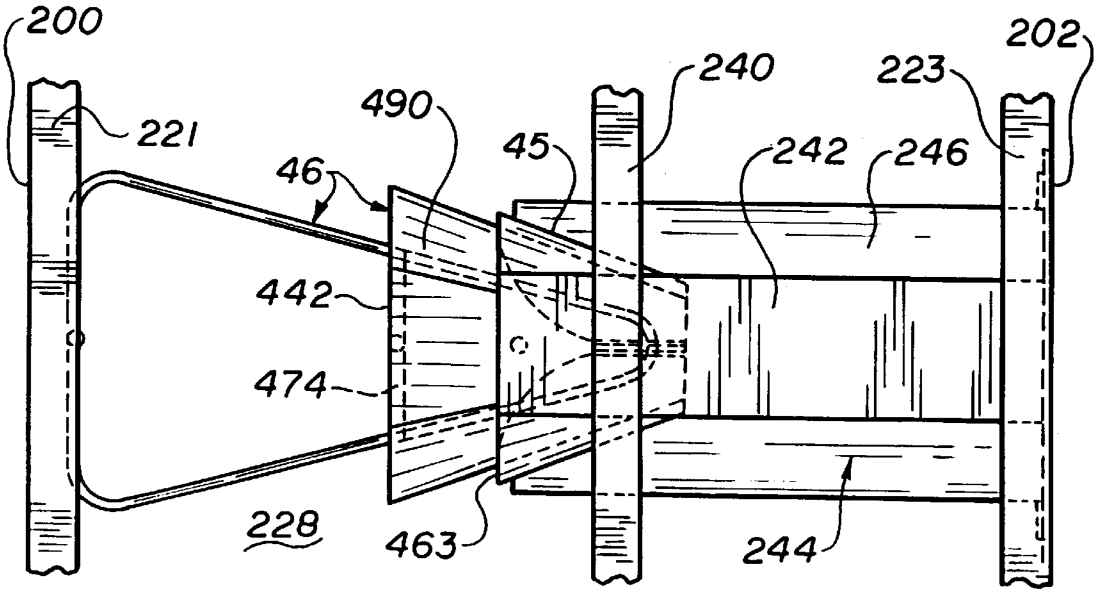
Figure 14:
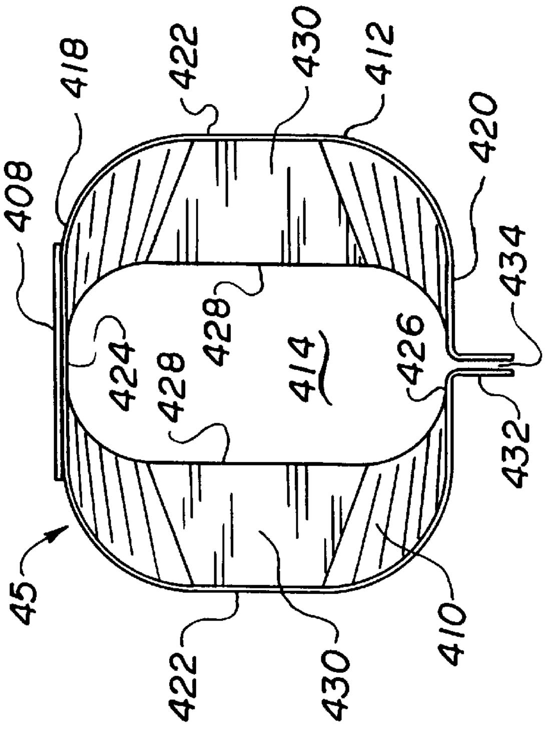
Figure 12:
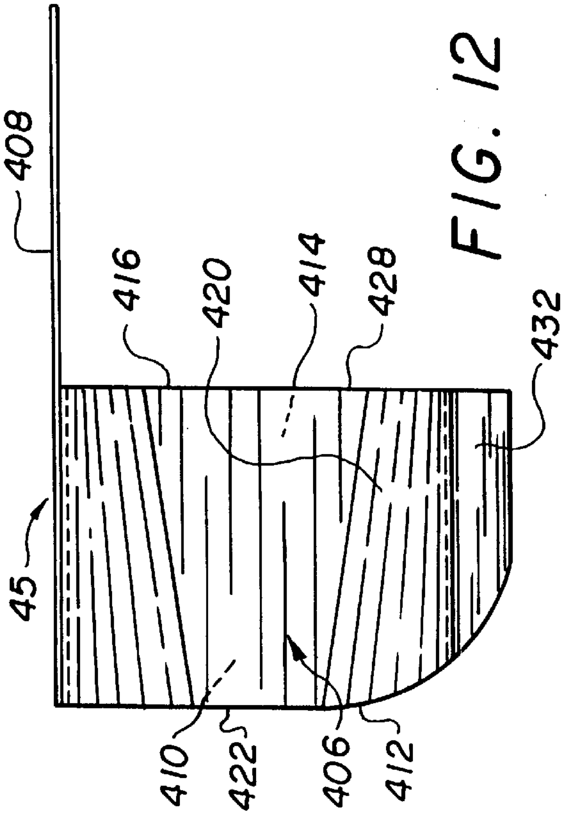
Figure 13:
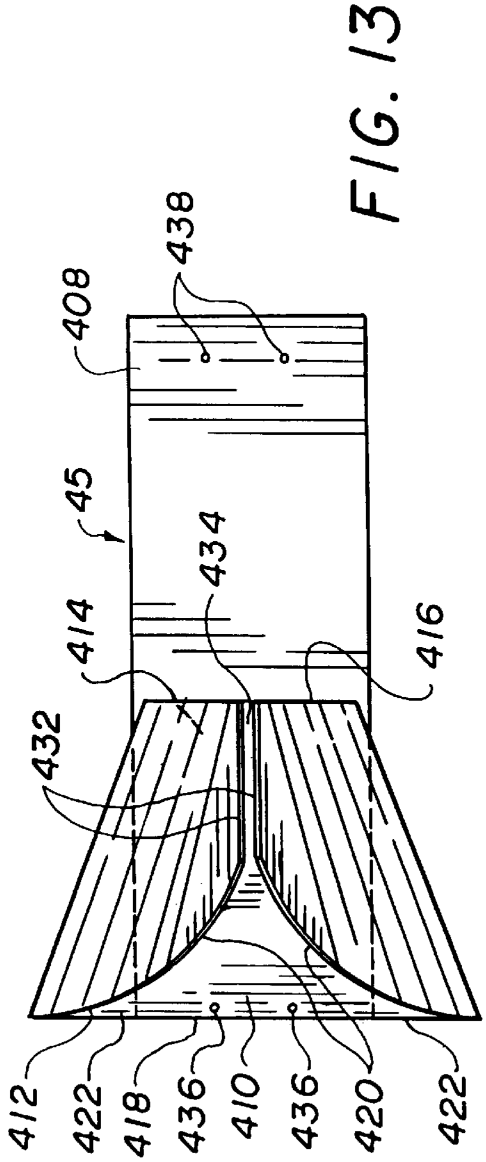
Figure 17:
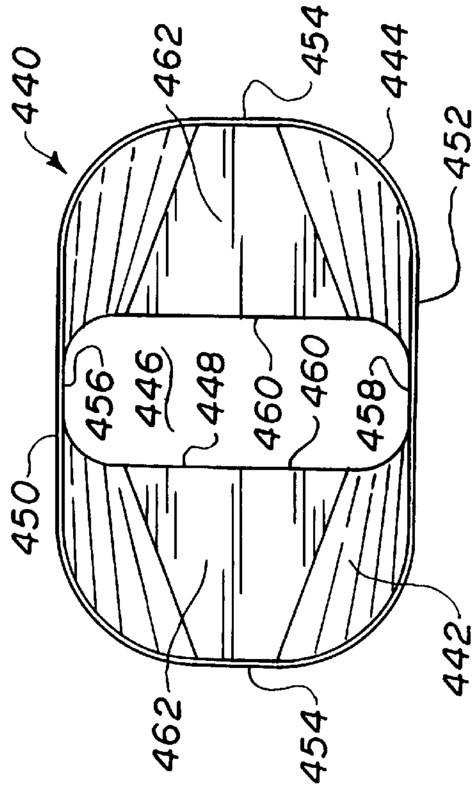
Figure 15:
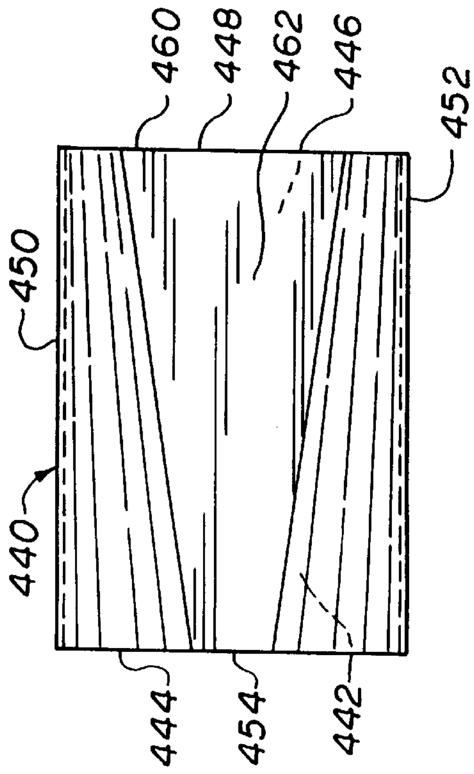
Figure 16:
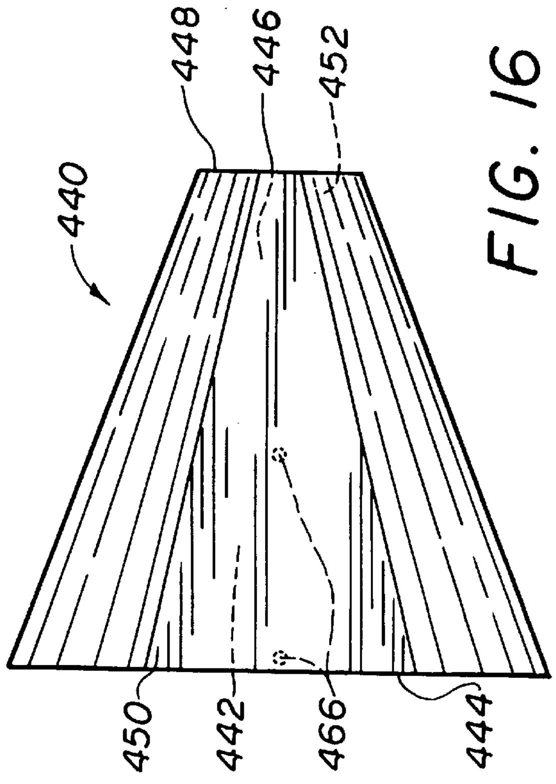
Figure 18:
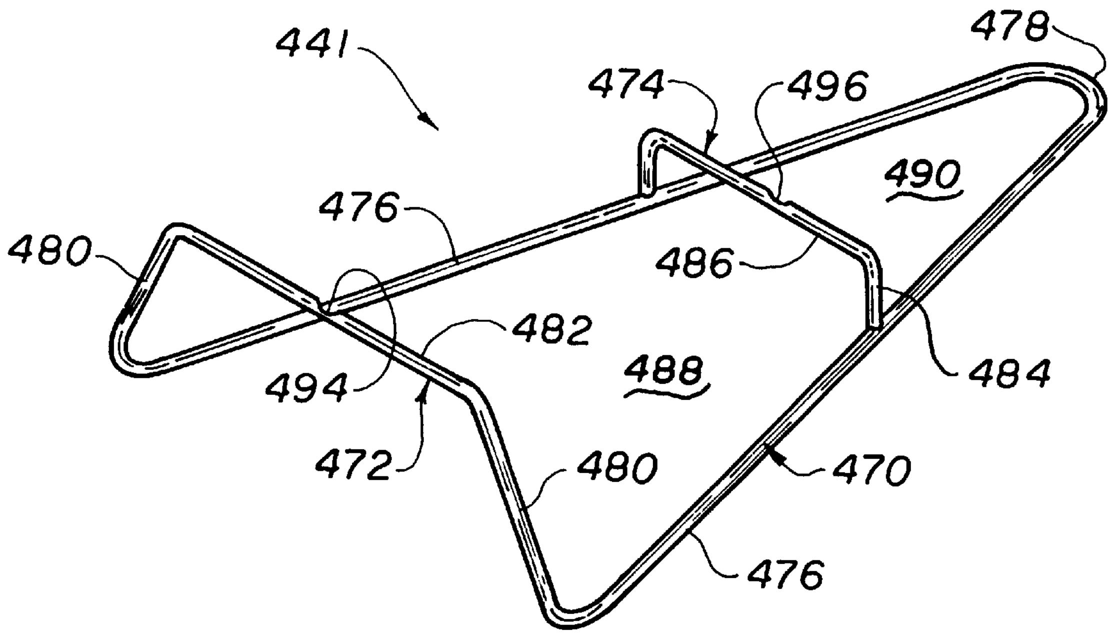
Figure 19:
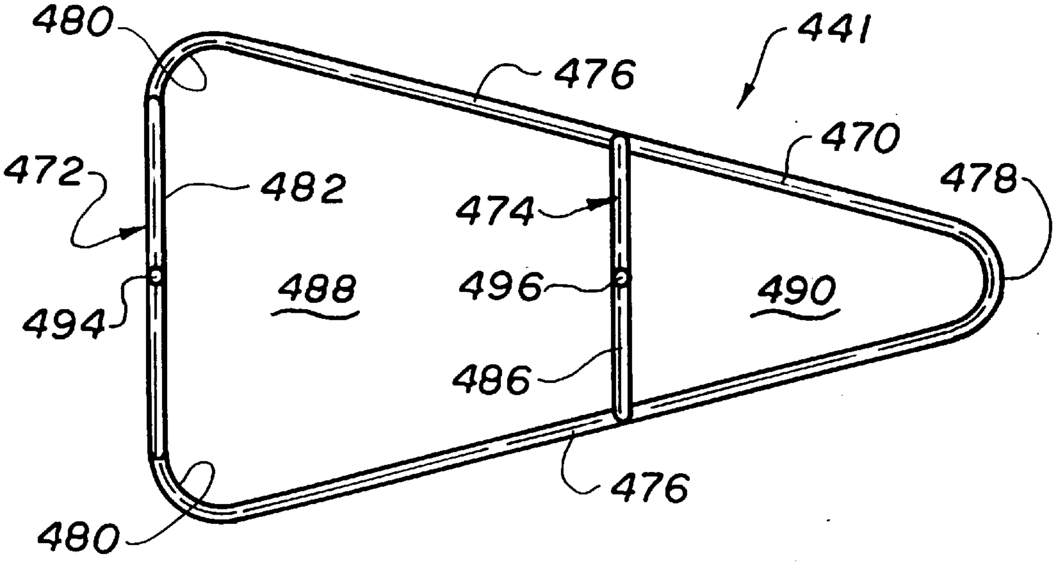
Figure 20:
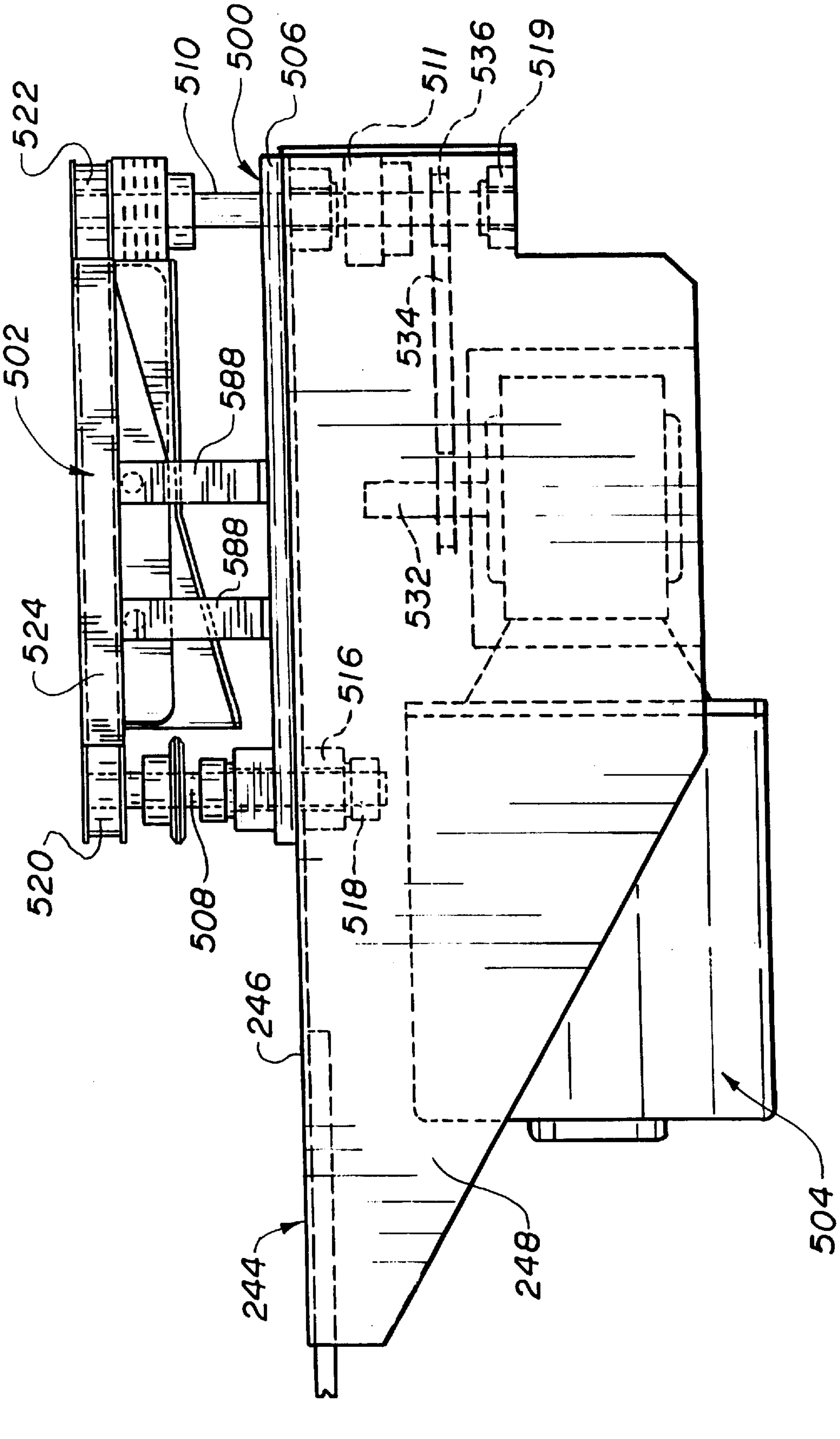
Figure 21:
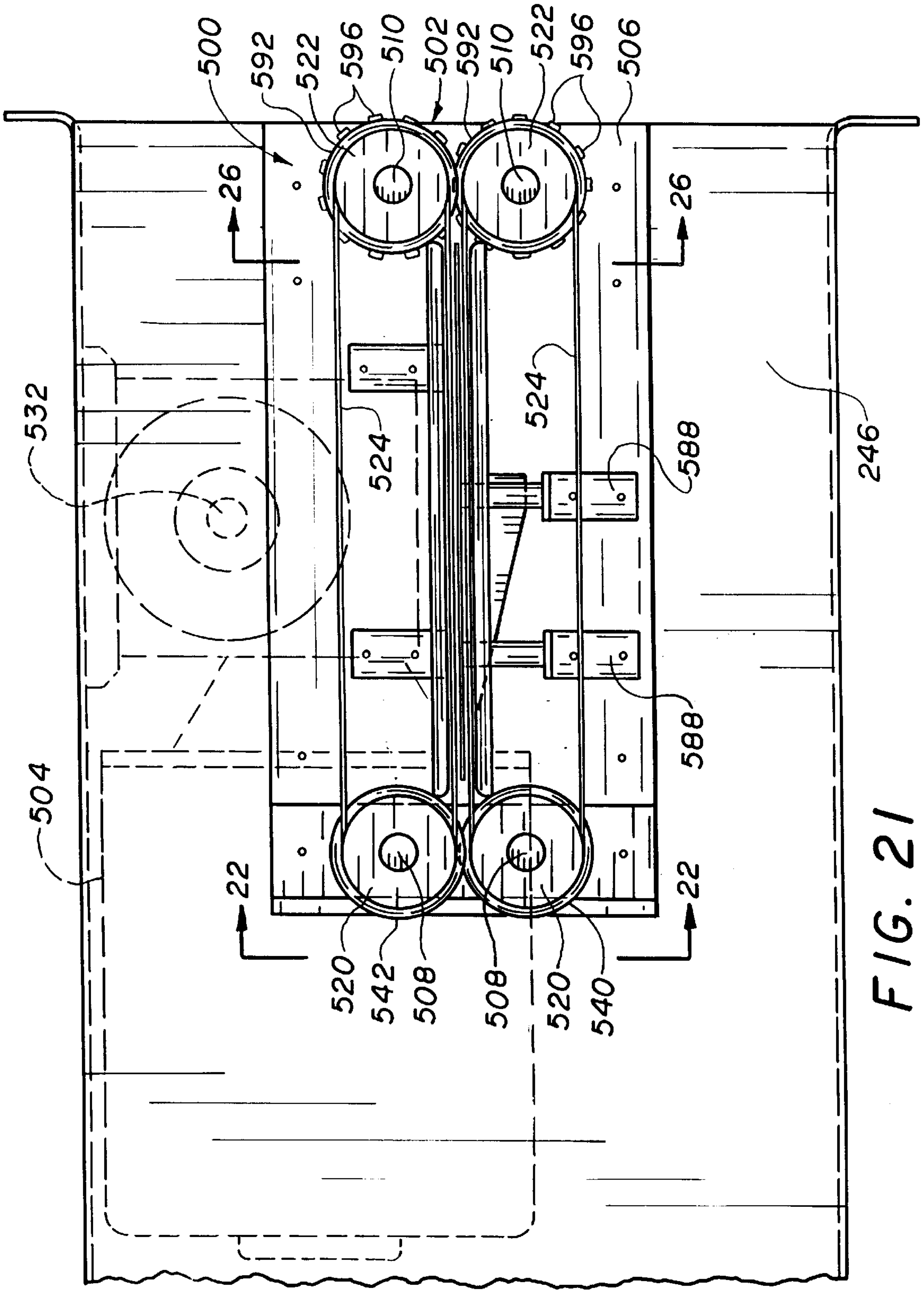
Figure 26:
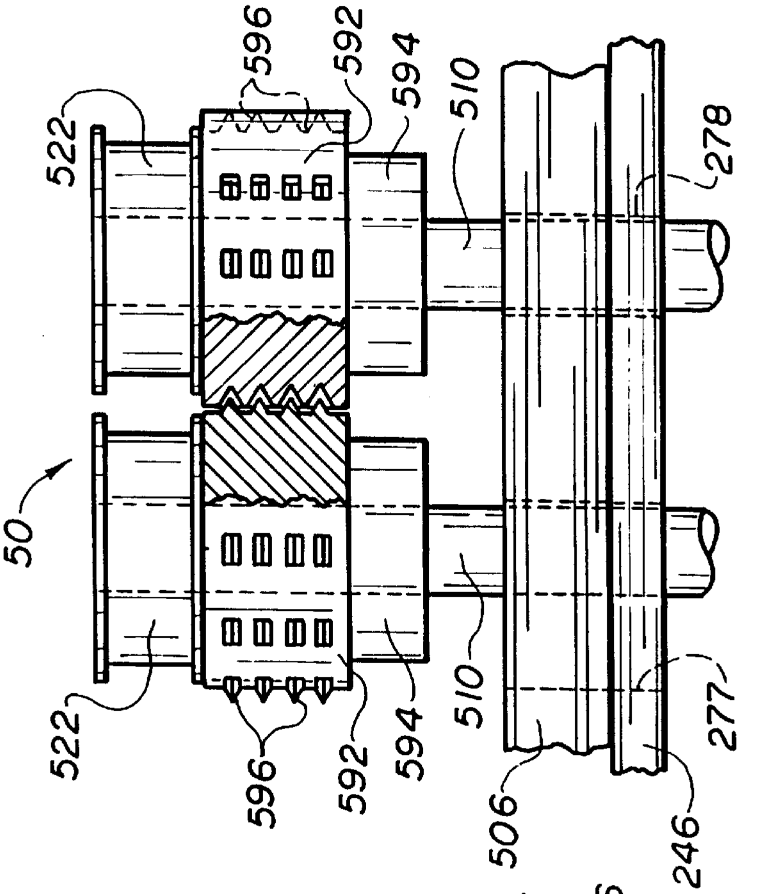
Figure 22:
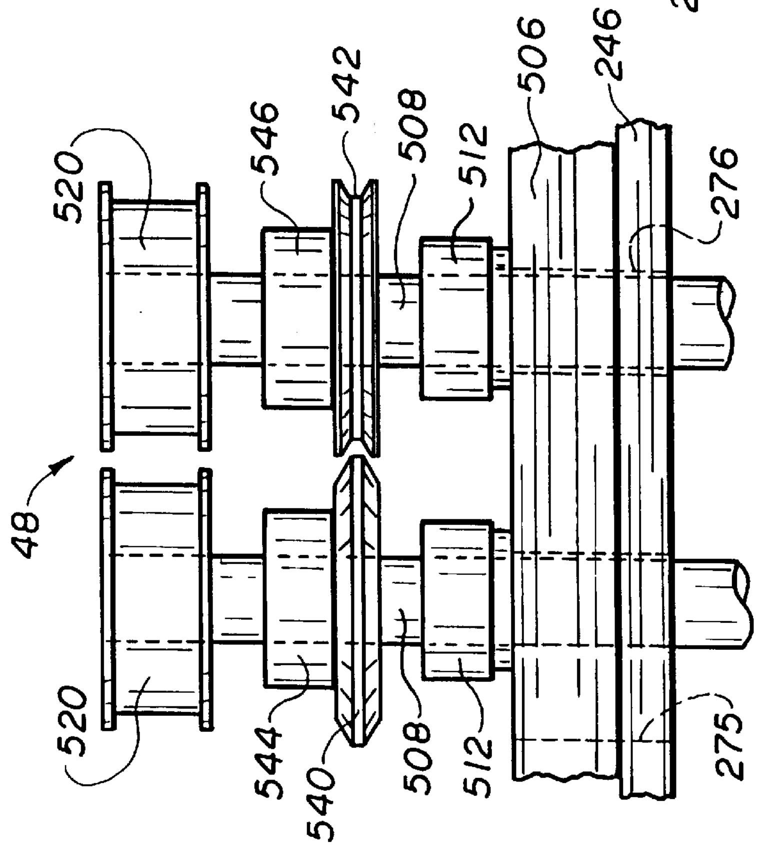
Figure 25:
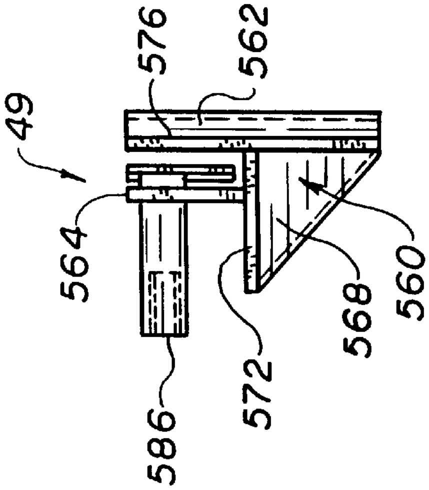
Figure 24:
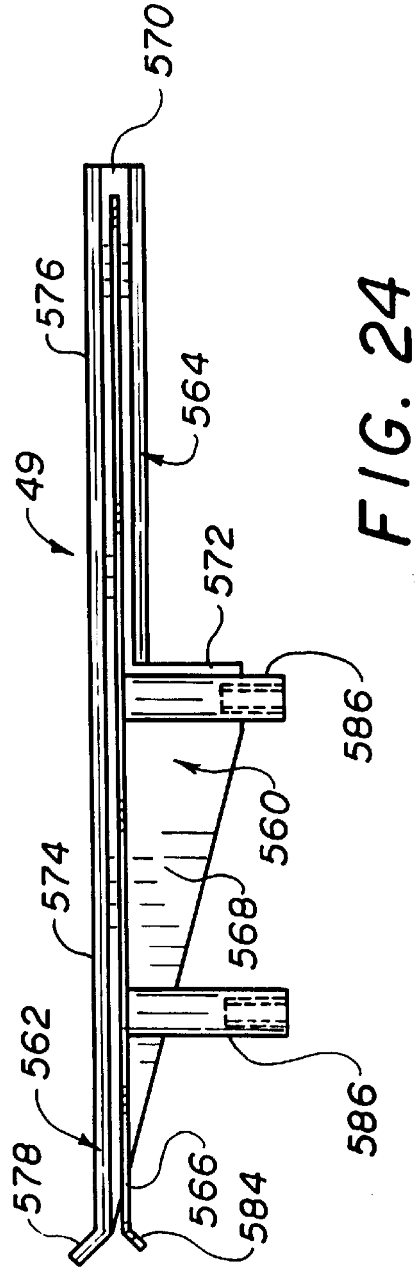
Figure 23:
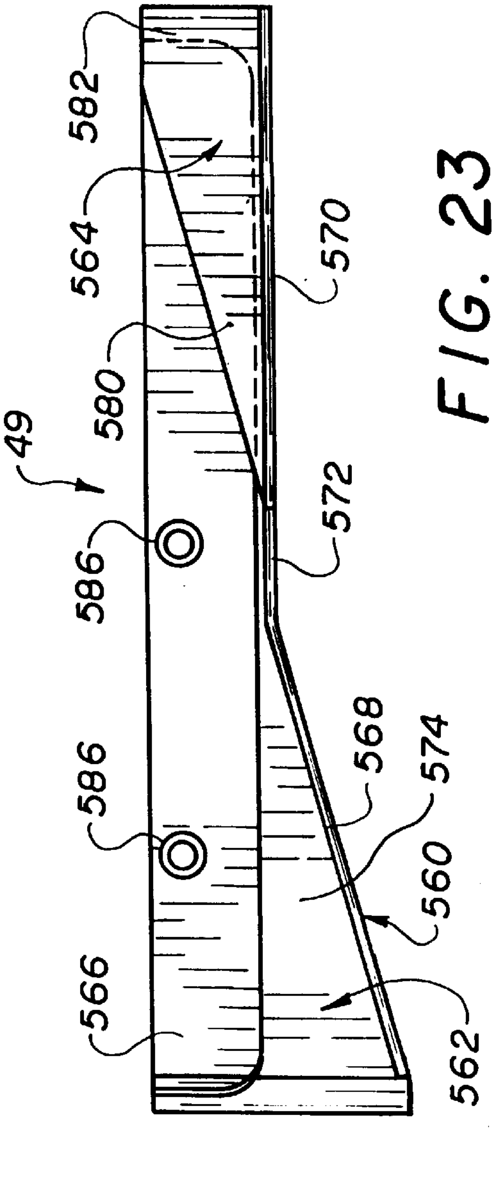
Figure 27:
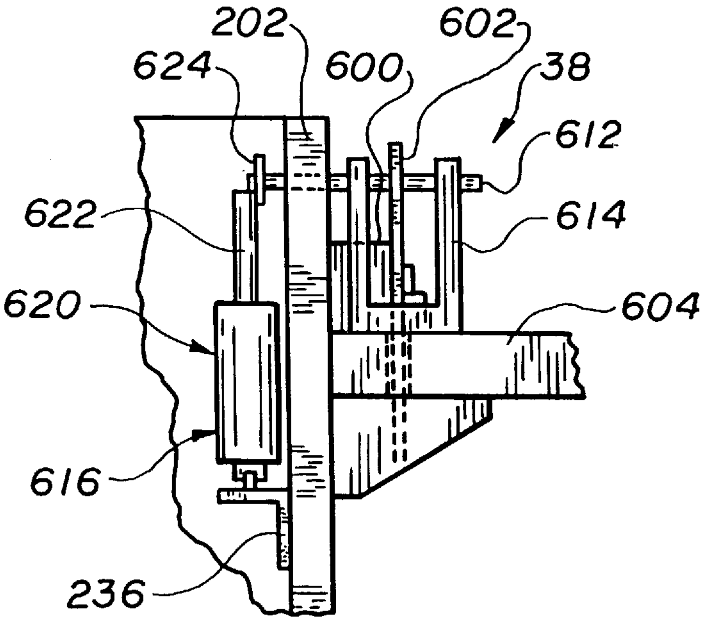
Figure 28:
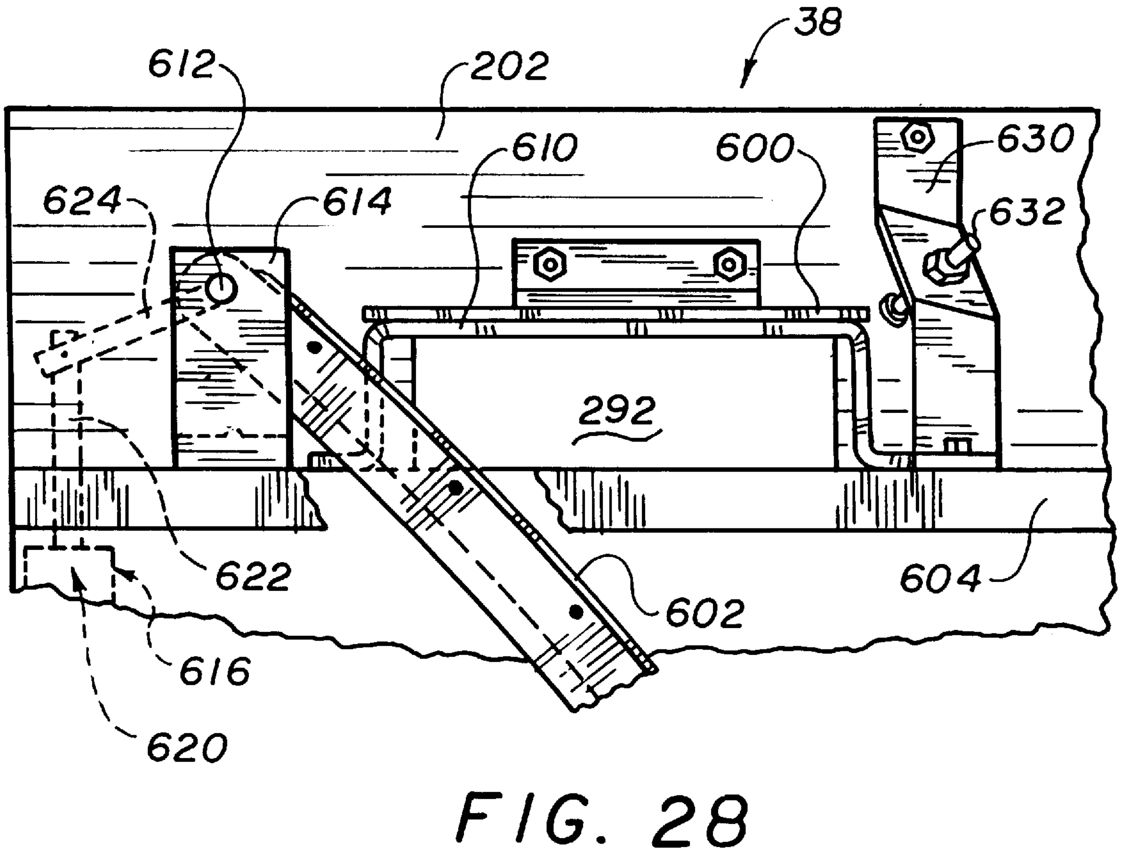

FIG. $\mathbf{3B_1}$ is a cross-sectional view of an embossing pattern created during the step of the method shown schematically in FIG. 3B;

FIG. $\mathbf{3C_1}$ is a cross-sectional view of crimping channels created during the step of the method shown schematically in FIG. 3C;

FIG. $\mathbf{3E_1}$ is a cross-sectional view of a crease groove created during the step of the method shown schematically in FIG. 3E;

FIG. $\mathbf{3F_1}$ is a cross-sectional view of a folded tab portion formed during the step of the method shown schematically in FIG. 3F;

FIG. $\mathbf{3G_1}$ is a cross-sectional view of a coining pattern created during the step of the method shown schematically in FIG. 3G;

FIG. $\mathbf{3G_2}$ is a front view of the coining pattern created during the step of this method shown schematically in FIG. 3G;

FIG. 4 is a side isolated view of a component of the frame assembly, namely a coupling shelf;

FIG. 5 is a top isolated view of the coupling shelf;

FIG. 6 is a side view of the stock-preparing assembly which includes a supplying device, an embossing device and a separating/crimping device, the assembly being shown loaded with stock material;

FIG. 7 is a top view of the stock-preparing assembly without stock material loaded therewith;

FIG. 8 is an enlarged sectional view of a component of the embossing device as seen along line 8—8 in FIG. 7;

FIG. 9 is an enlarged plan view of a component of. the separating/crimping device as seen along line 9—9 in FIG. 7;

FIG. 10 is an isolated side view of the stock-shaping assembly (which includes an outer shaping device and an inner shaping device) and relevant portions of the frame assembly;

FIG. 11 is an isolated top view of the stock-shaping-assembly and relevant portions of the frame assembly;

FIG. 12 is an isolated side view of the outer shaping device;

FIG. 13 is an isolated bottom view of the outer shaping device;

FIG. 14 is an isolated front view of the outer shaping device;

FIG. 15 is an isolated side view of a certain component of the inner shaping device, namely an inner funnel unit;

FIG. 16 is an isolated top view of the inner funnel unit;

FIG. 17 is an isolated front view of the inner funnel unit;

FIG. 18 is an isolated perspective view of another component of the inner shaping device, namely a bar-like shaping unit;

FIG. 19 is a top view of the bar-like shaping unit;

FIG. 20 is a side view of the tab-connecting assembly (which includes a pulling device, a creasing device, a folding device, and a connecting device) and relevant portions of the frame assembly;

FIG. 21 is a top view of the tab-connecting assembly and relevant portions of the frame assembly;

FIG. 22 is an enlarged front view of the creasing device and relevant portions of the pulling device and the frame assembly;

FIG. 23 is an enlarged isolated side view of the folding device;

FIG. 24 is an enlarged isolated top view of the folding device;

FIG. 25 is an enlarged isolated rear view of the folding device;

FIG. 26 is an enlarged rear view of the connecting device and relevant portions of the pulling device and the frame assembly;

FIG. 27 is a side view of the strip-cutting assembly and relevant portions of the frame assembly; and FIG. 28 is a rear view of the strip-cutting assembly and relevant portions of the frame assembly.

Figure 29:
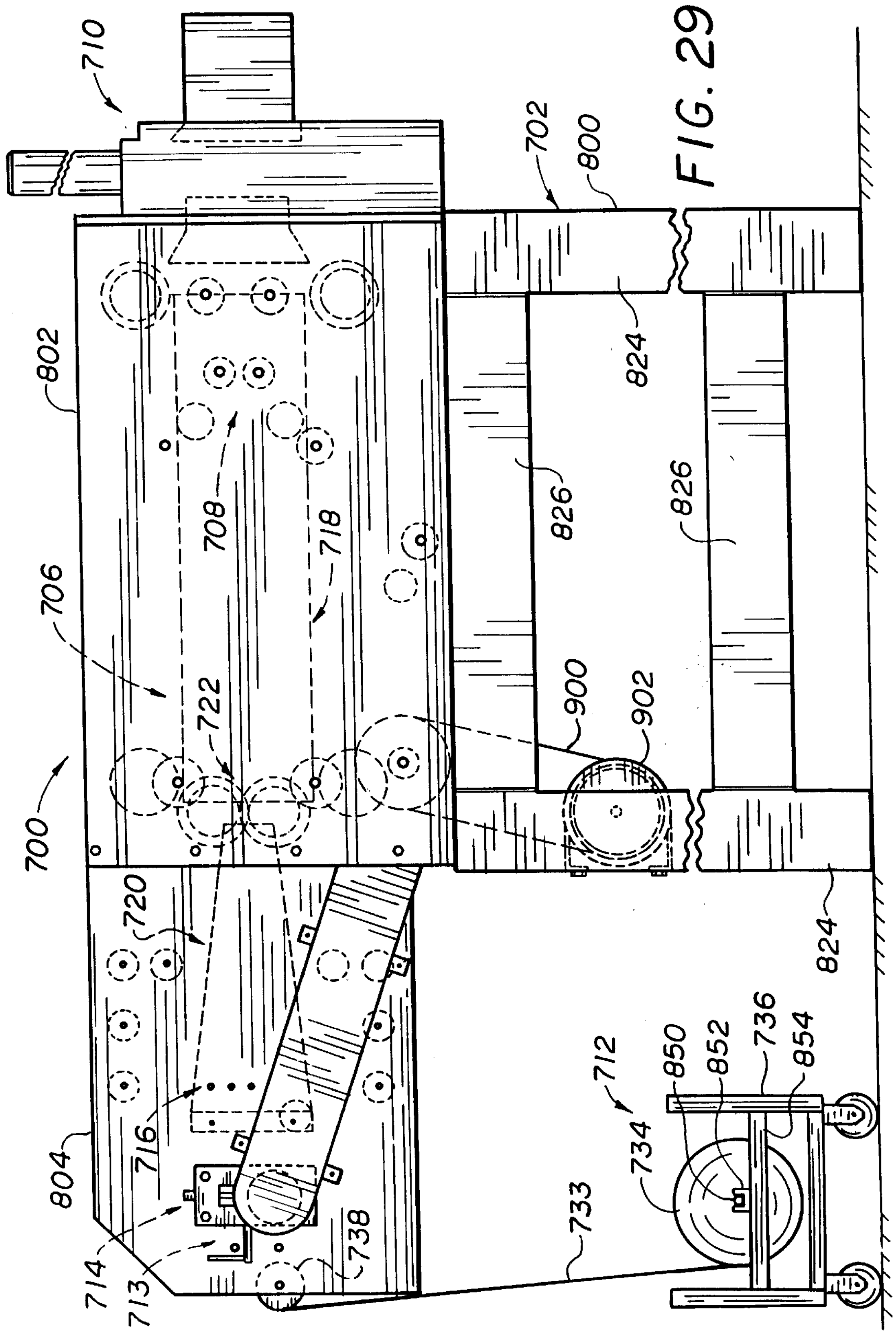
Figure 30A:
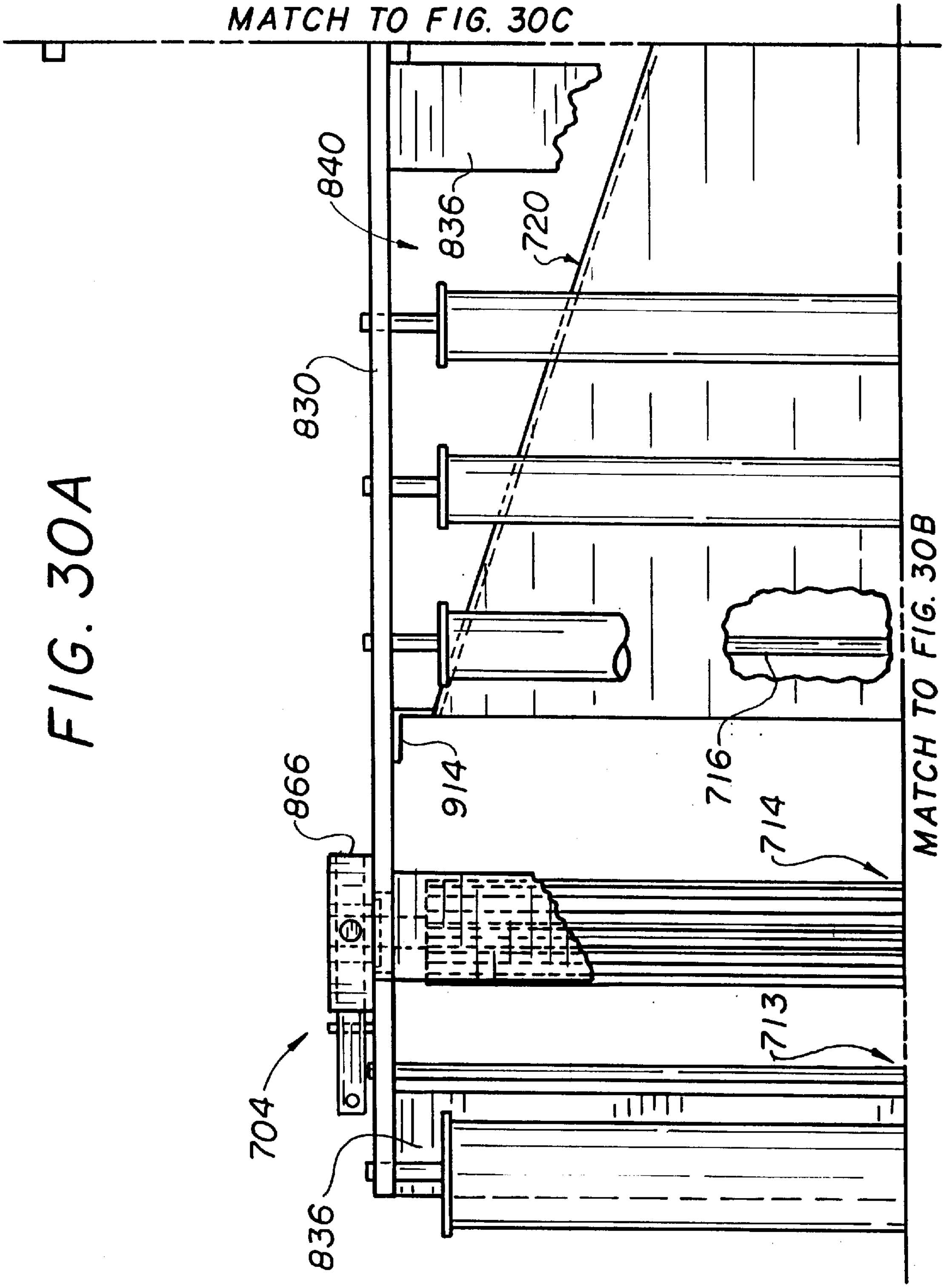
Figure 30B:
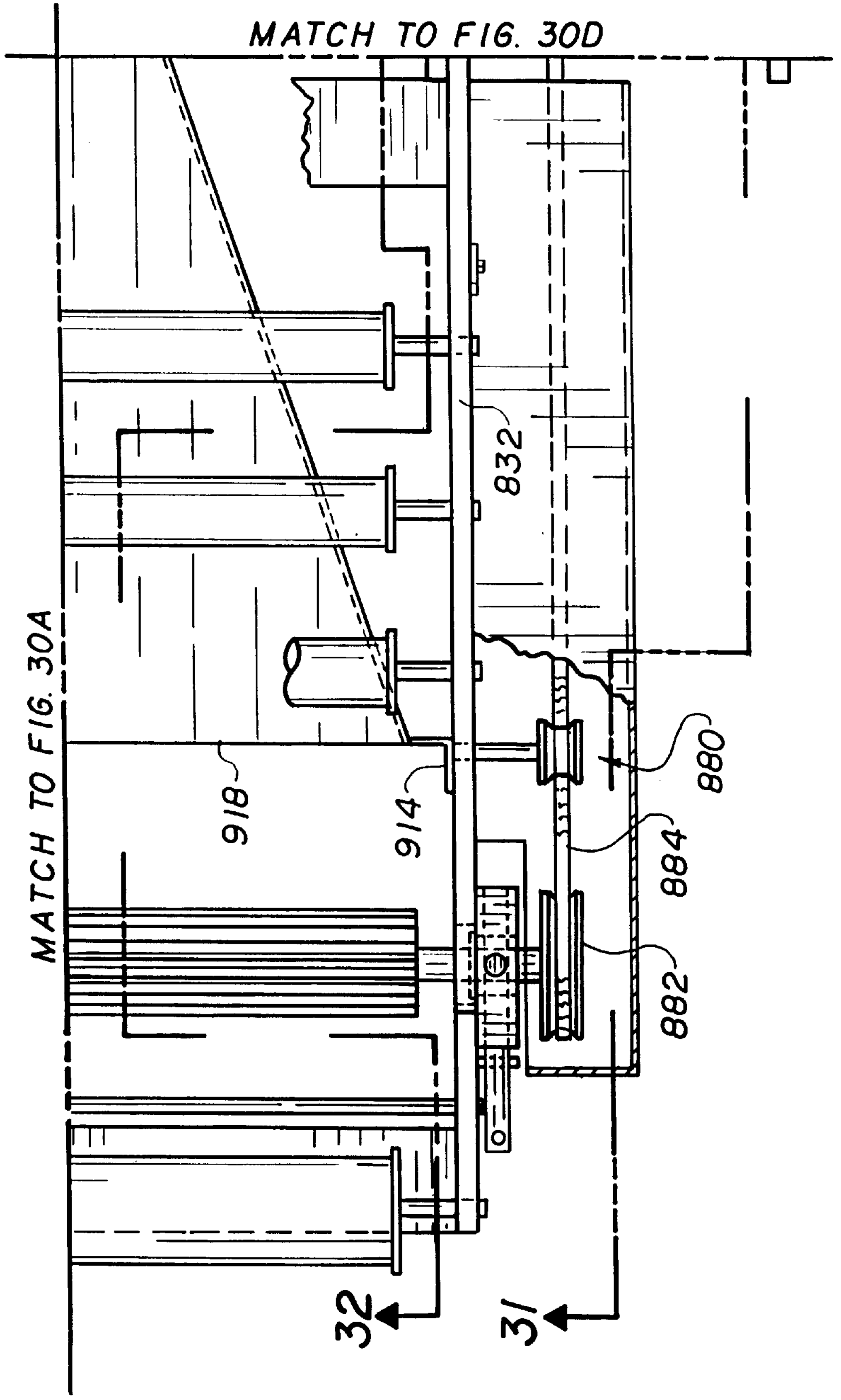
Figure 32A:
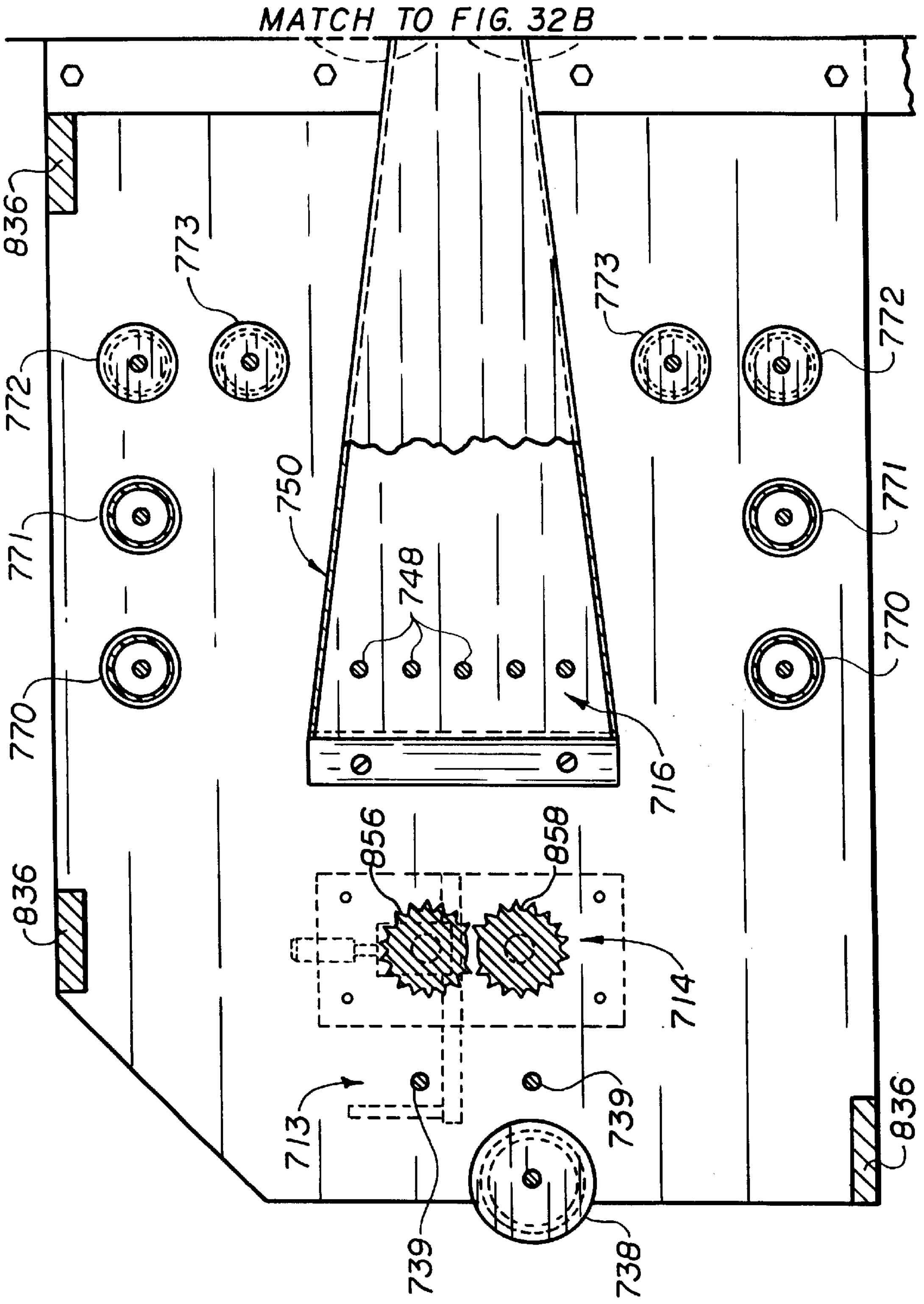
Figure 32B:
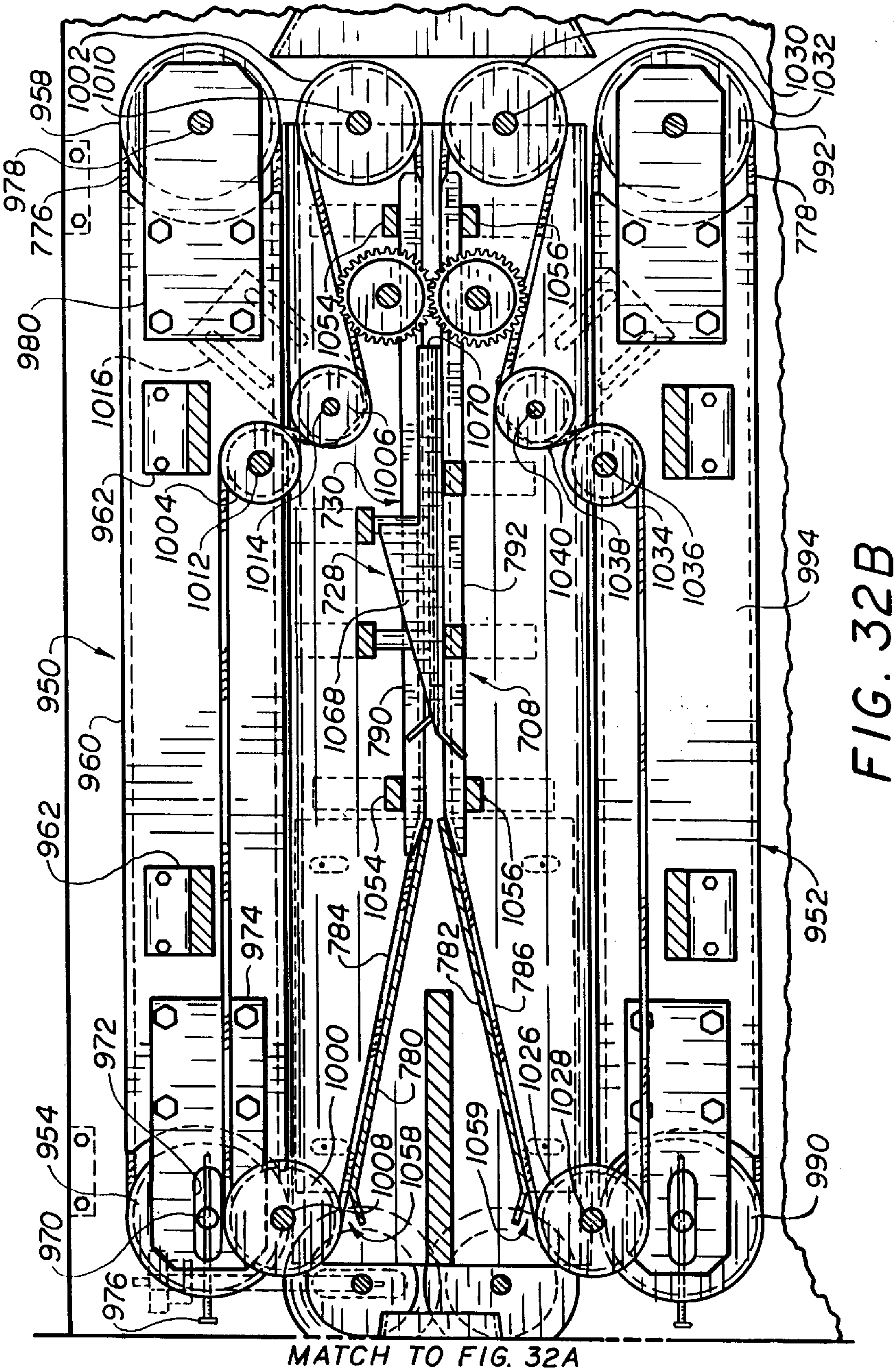
Figure 33:
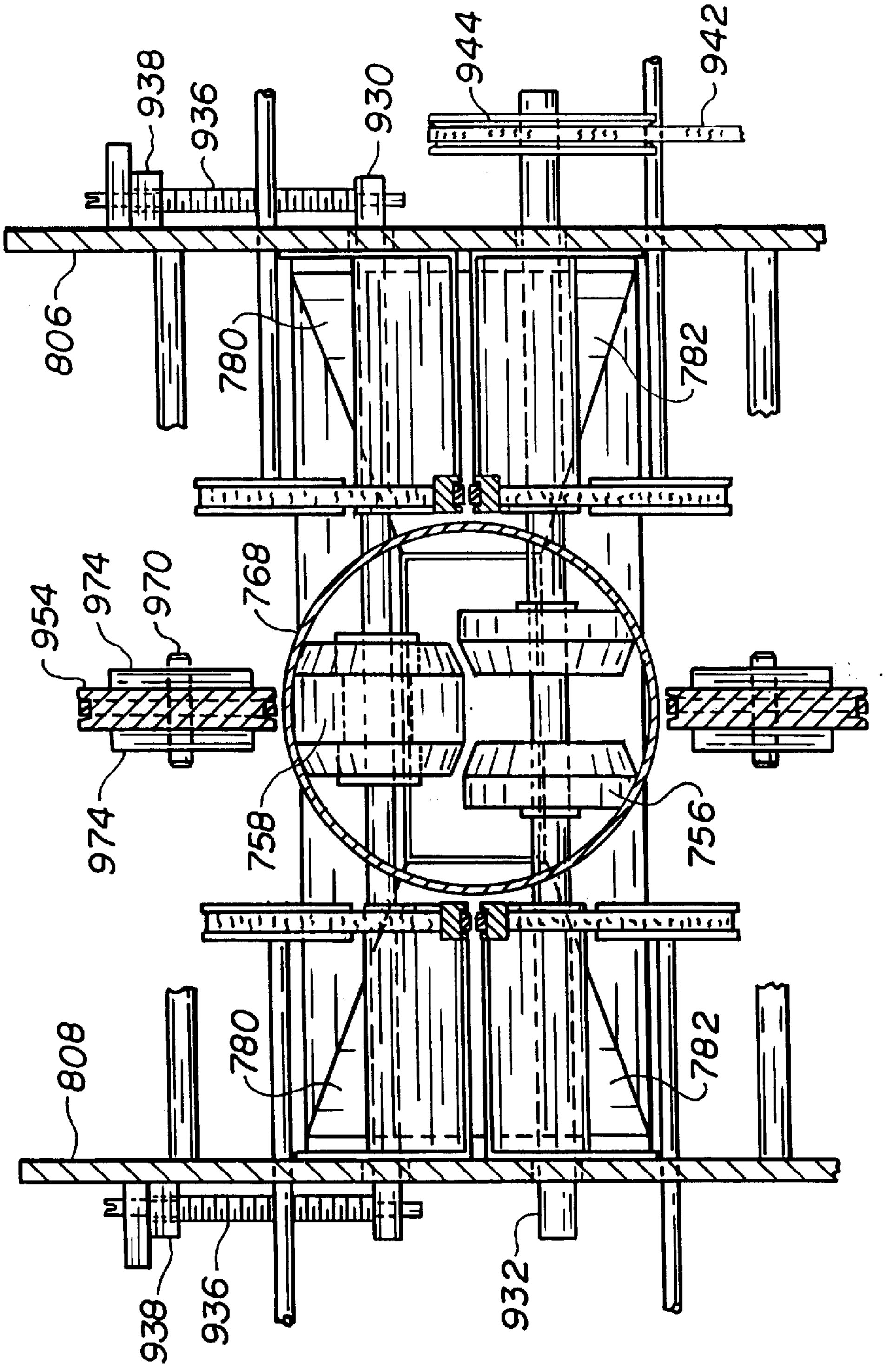

FIG. 29 is a side view of another embodiment of cushioning conversion machine according to the invention;

FIGS. 30A–30E are broken continuations of a top view of the cushioning conversion machine of FIG. 29;

FIGS. 31A–31D are broken continuations of a side elevational view, partly broken away in section, of the cushioning conversion machine of FIG. 29, taken along the line 31—31 of FIGS. 30A–30E;

FIGS. 32A and 32B are broken continuations of a cross-sectional view of the cushioning conversion machine of FIG. 29, taken along the line 32—32 of FIGS. 30A–30E;

FIG. 33 is a cross-sectional view taken along the line 33—33 of FIGS. 30A–30B, showing the feed crimping assembly of the cushioning conversion machine of FIG. 29.

Figure 34:
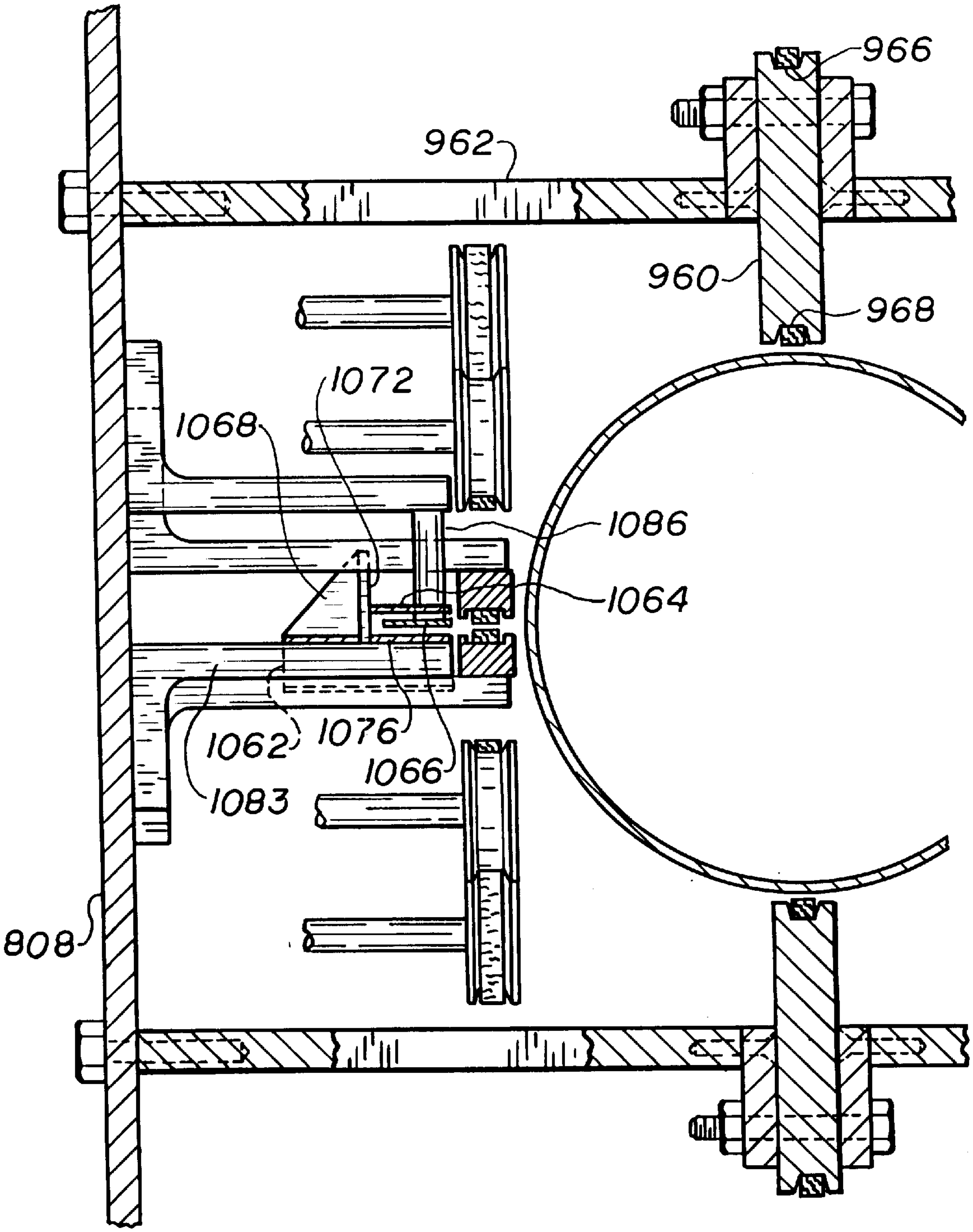

FIG. 34 is a cross-sectional view taken along the line 34—34 of FIGS. 30A–30B, showing various details of the stock shaping and tab connecting assemblies of the conversion assembly of the cushioning conversion machine of FIG. 29.

Figure 35:
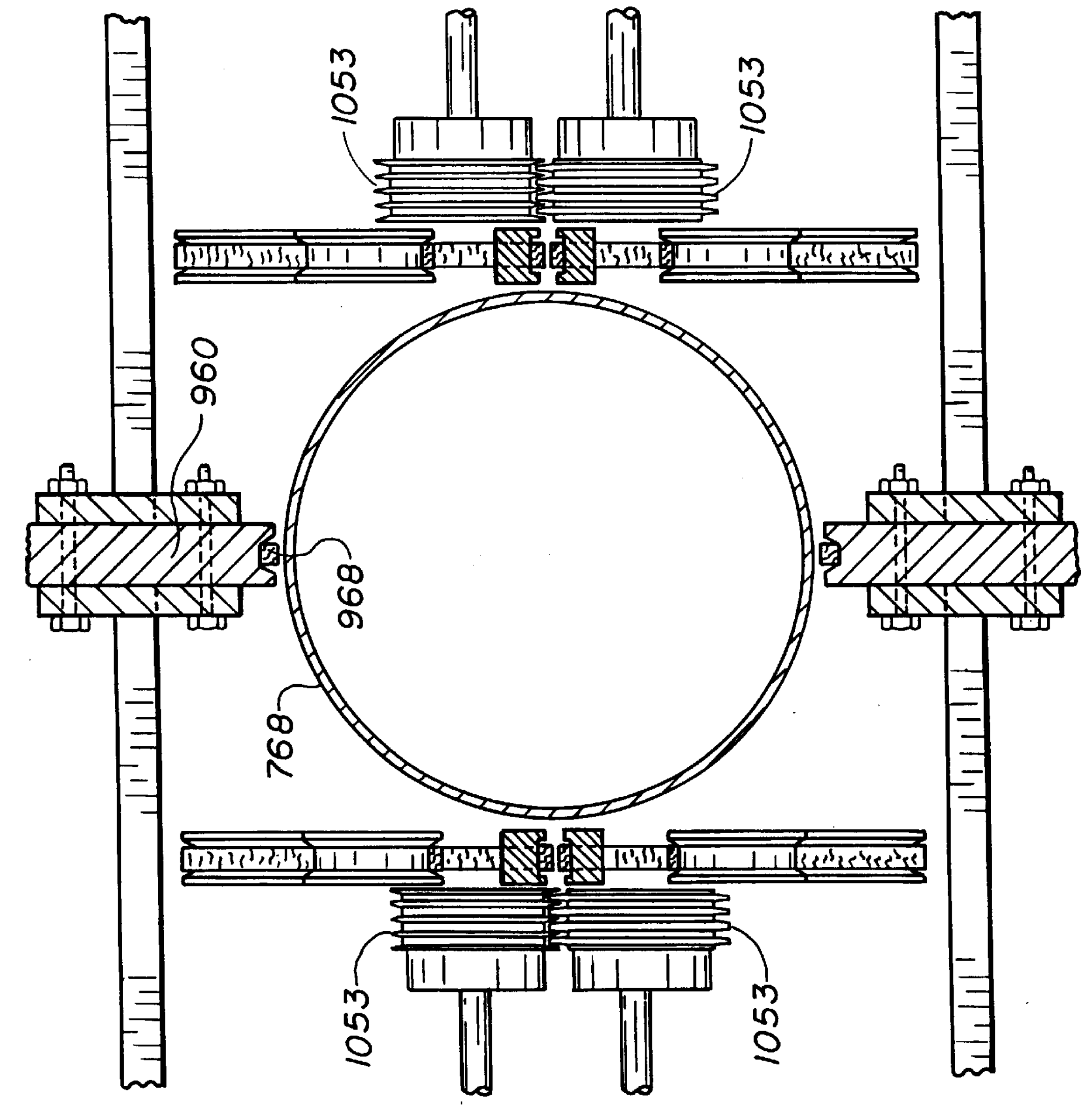

FIG. 35 is a cross-sectional view taken along the line 35—35 of FIGS. 30A–30B, showing further details of the stock shaping and tab connecting assemblies of the conversion assembly of the cushioning conversion machine of FIG. 29.

Figure 30C:
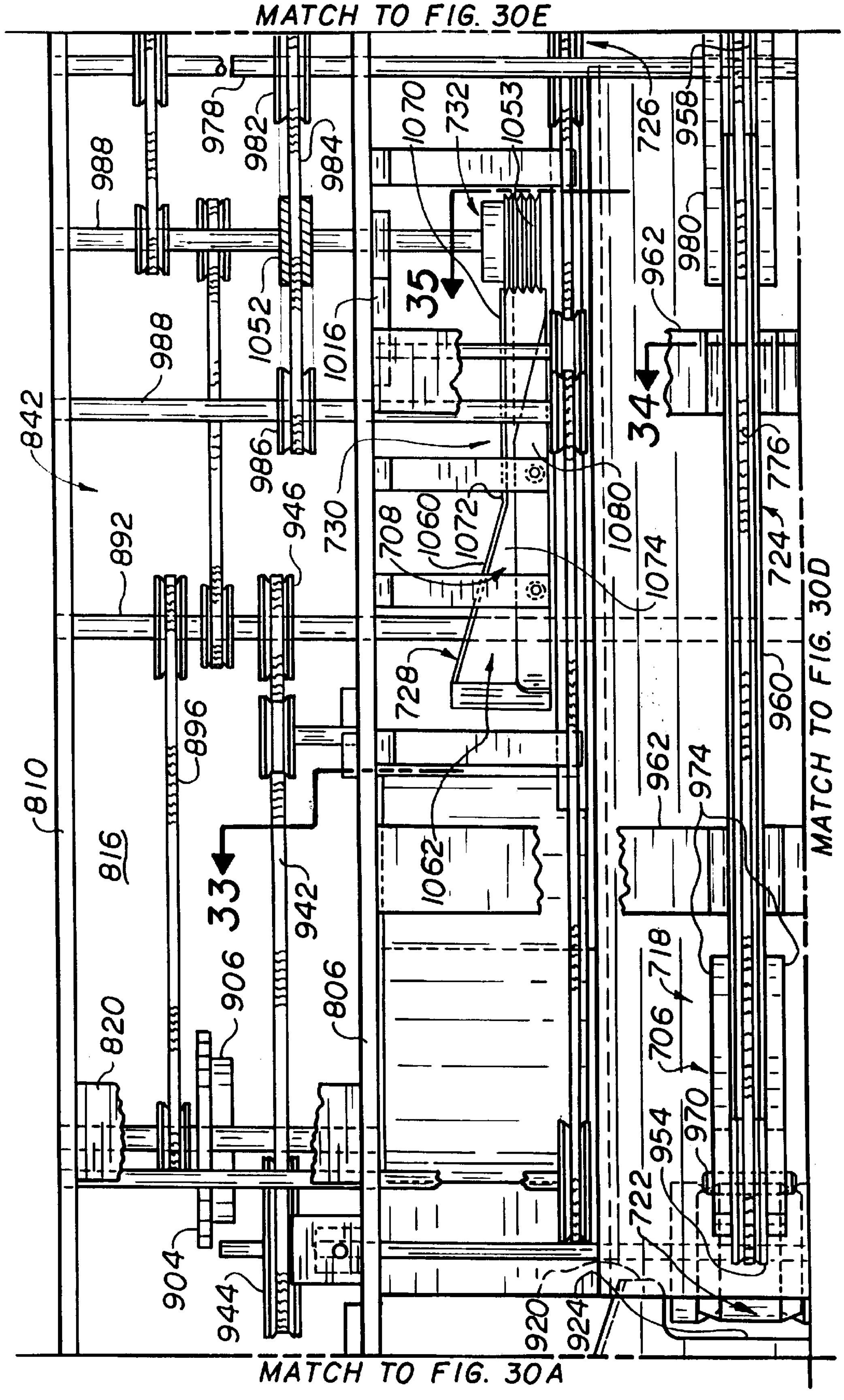
Figure 30D:
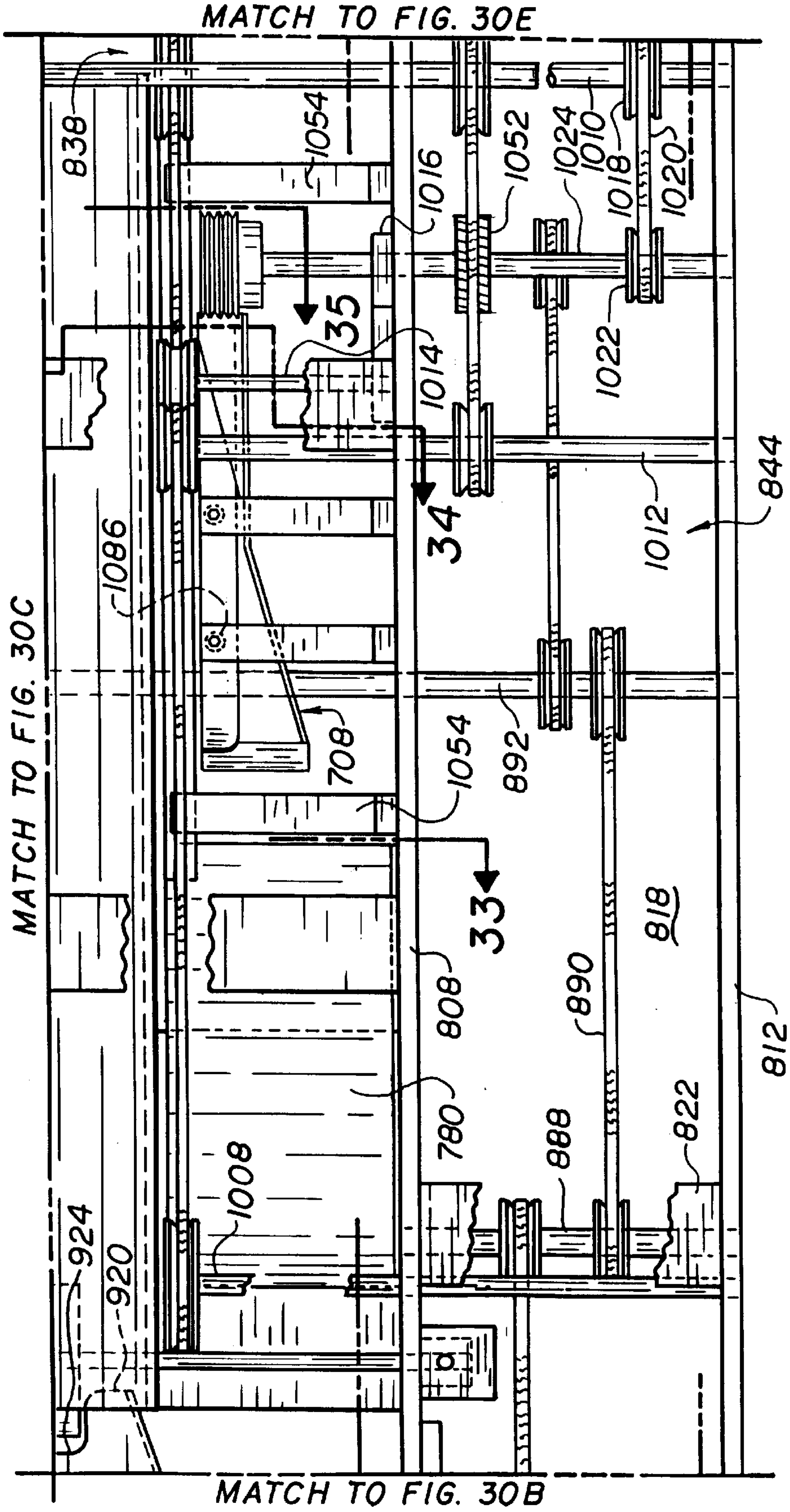
Figure 30E:
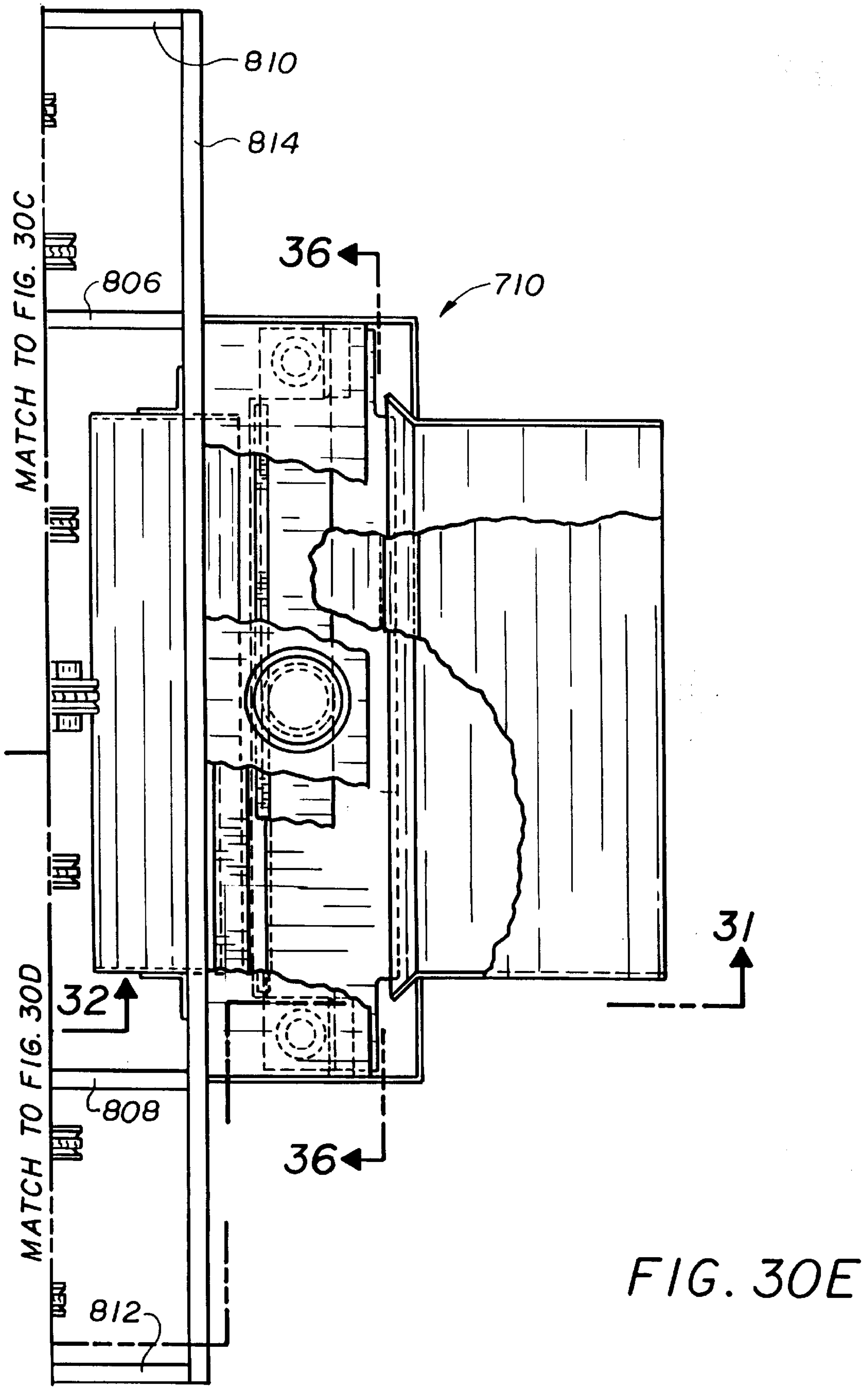
Figure 36:
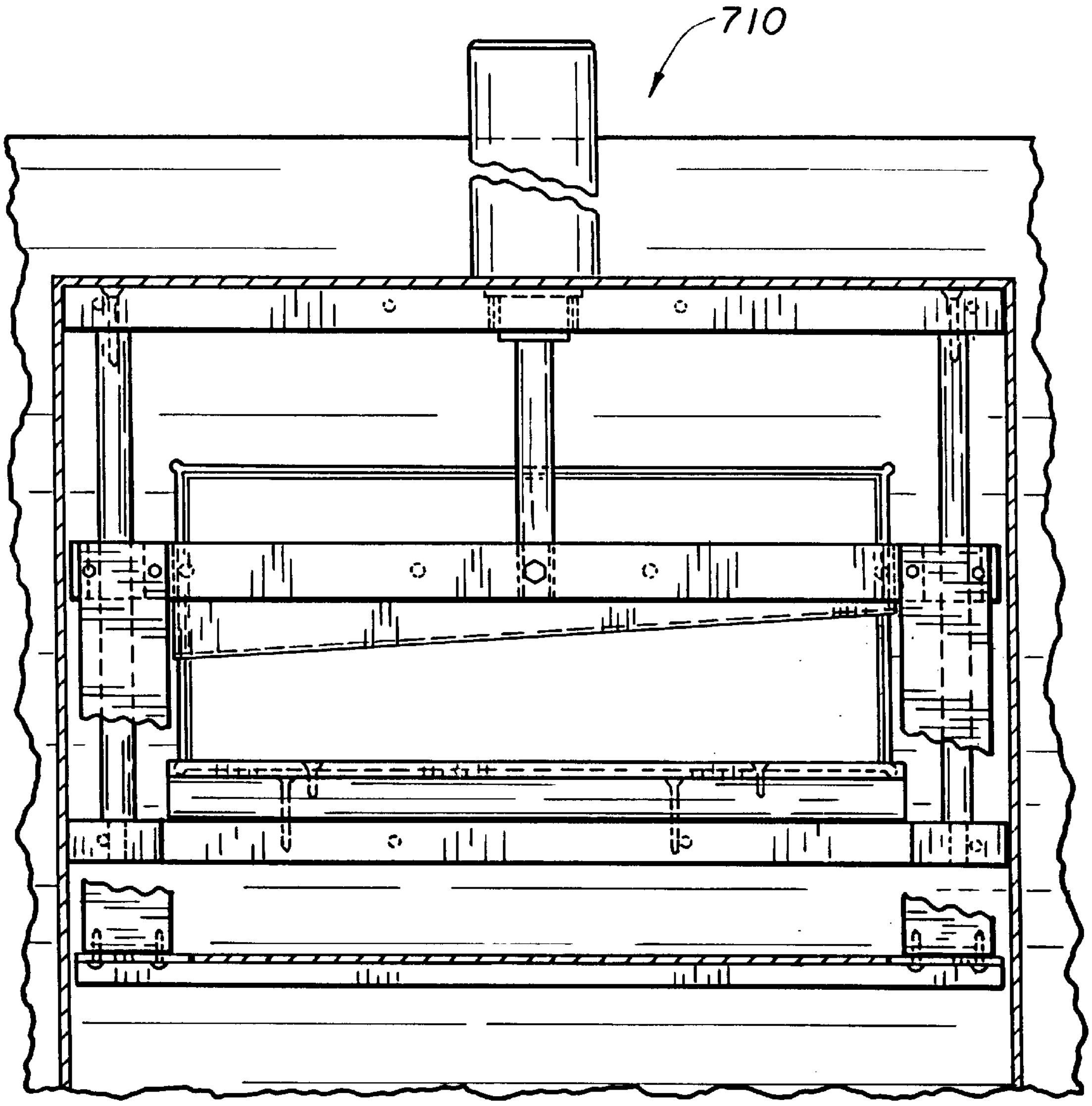

FIG. 36 is a cross-sectional view of cushioning conversion machine of FIG. 29, taken along the line 36—36 of FIG. 30E and showing the strip-cutting assembly and relevant portions of the frame assembly.

Figure 37:
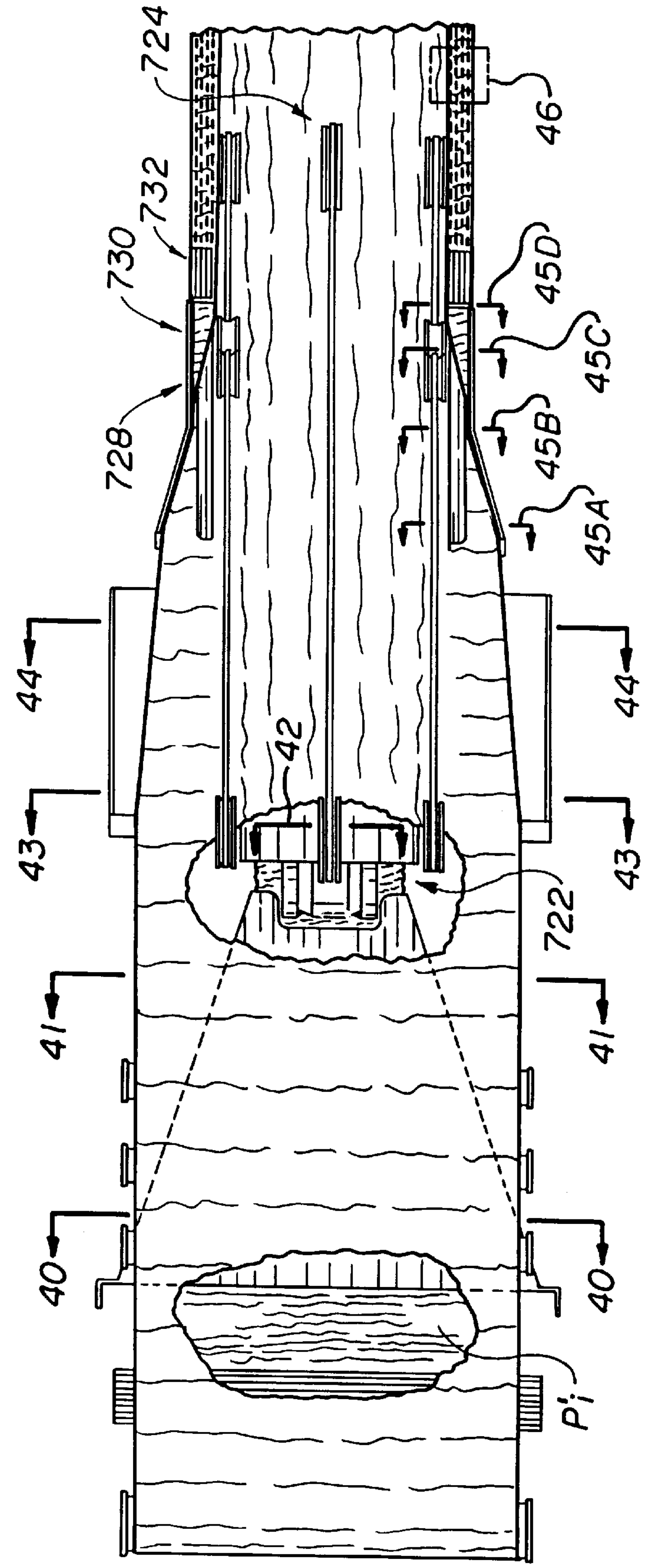
Figure 38:
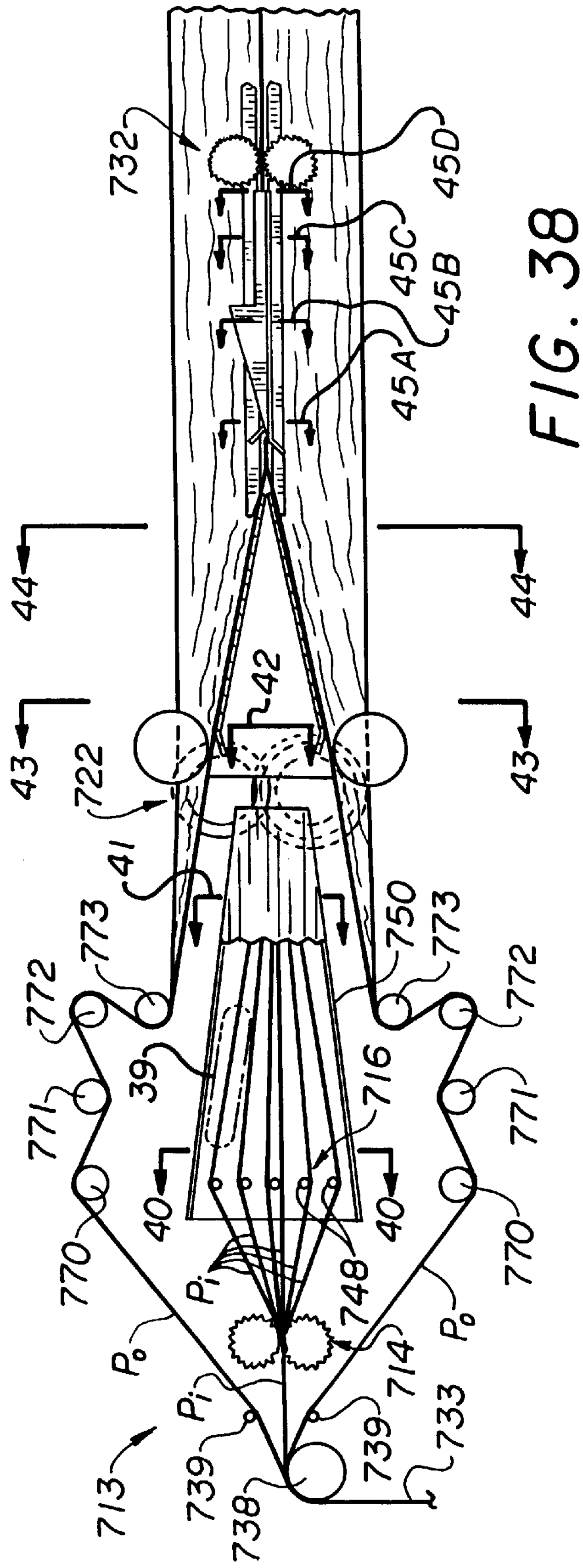
Figure 39:
Figure 47:
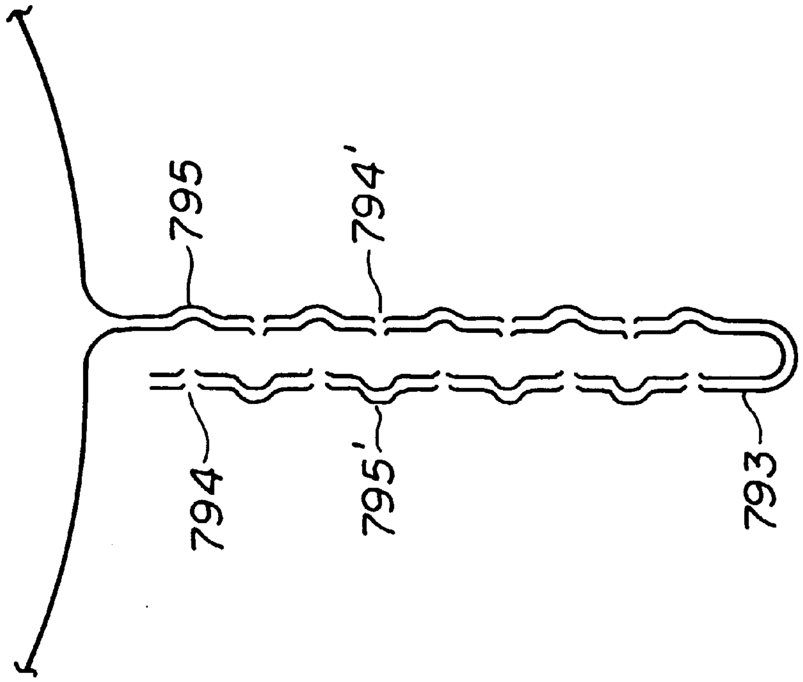
Figure 46:
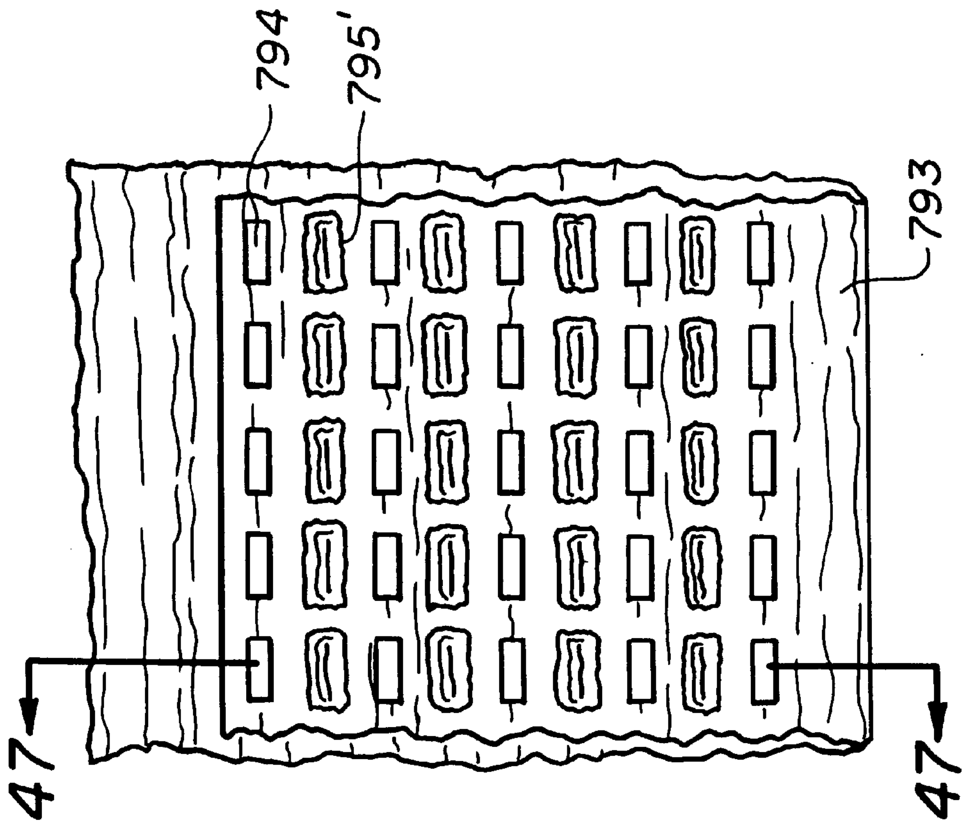
Figure 48:
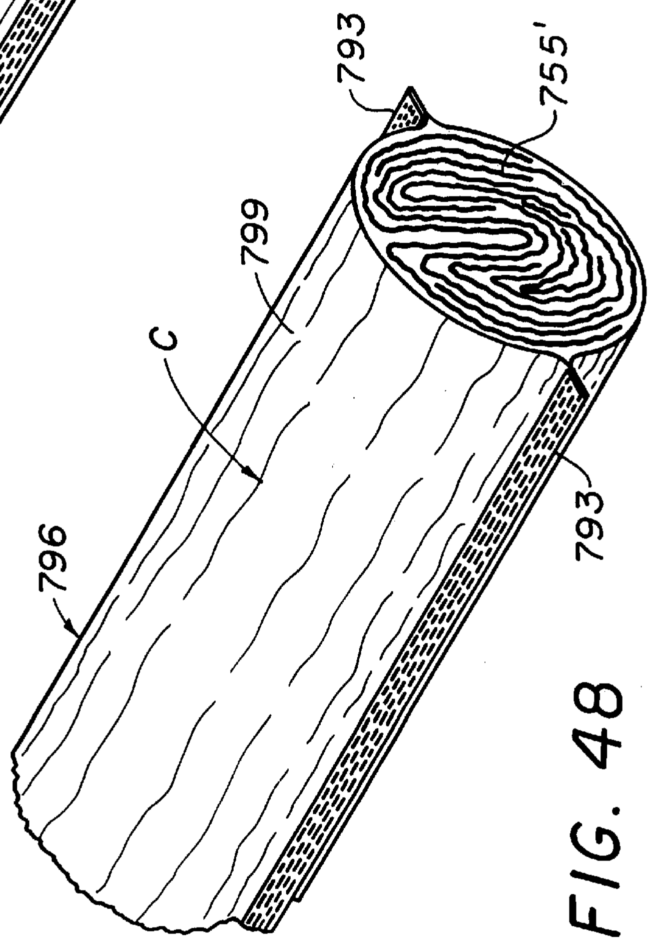

FIGS. 37 and 38 respectively are a plan view and side elevational view schematically showing the sheet-like stock material passing through the cushioning conversion machine of FIG. 29 for illustrating operation of machine and the method by which the sheet-like stock material is converted into a cushioning product according to the present invention;

FIG. 39 is a cross-sectional view of an embossing pattern created during the method;

FIGS. 40–44, 45A–45D and 46 are cross-sectional views taken along the lines 40—40, 41—41, and so on, of FIGS. 37 and 38, schematically the steps of the method of converting sheet-like stock material into a cushioning product according to the invention;

FIG. 47 is a cross-sectional view of a coining pattern created during the step of the method shown schematically in FIG. 46, taken along the line 47—47 of FIG. 46;

FIG. 48 is a perspective view of a strip of the cushioning product produced in accordance with the invention using the machine of FIG. 29.

Figure 49:
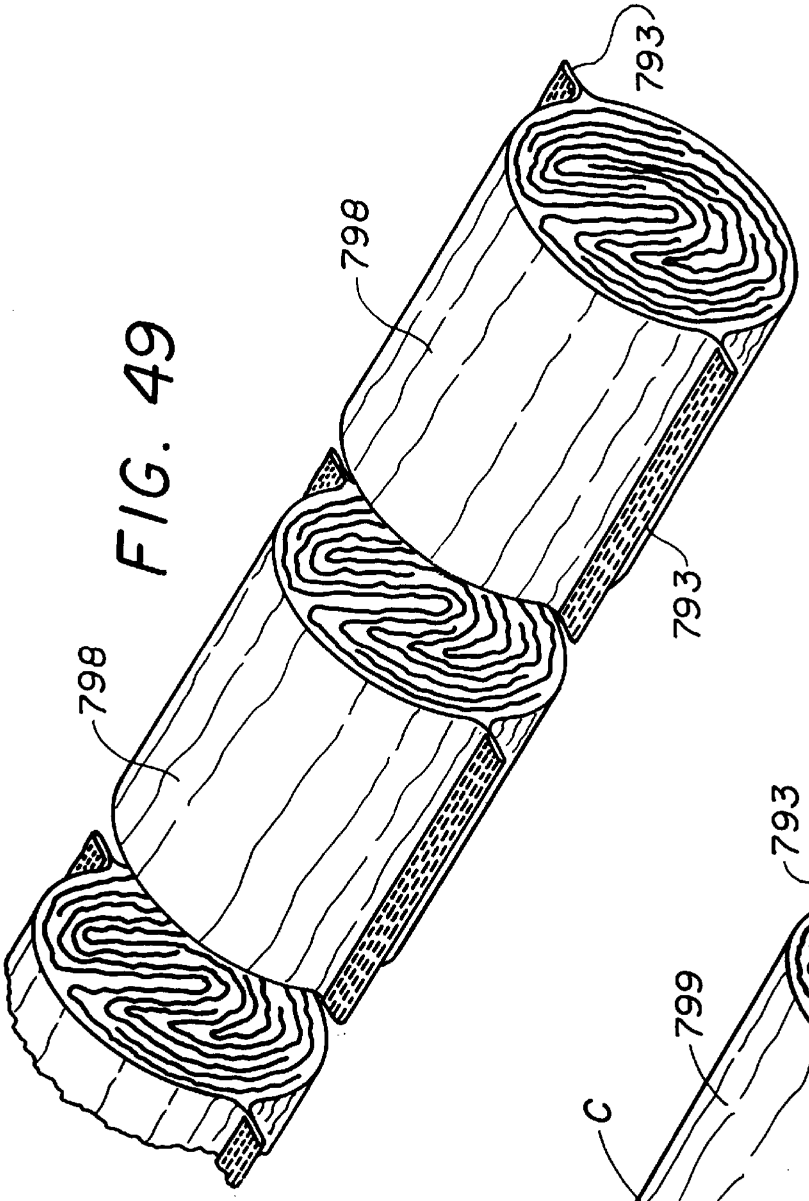

FIG. 49 is a perspective view showing the strip of cushioning product cut into sections.

Referring now in detail to the drawings, two embodiments of a cushioning conversion machine according to the present invention are illustrated in FIGS. 1–28 and 29–49, respectively. As is explained in more detail below, the cushioning conversion machines convert sheet-like stock material into a cushioning products. The construction of the cushioning products is such that the products' overall density is relatively low while at the same time the integrity of the products' cushioning qualities are maintained. Moreover, the cushioning products of the present invention may be, and preferably is, made of paper which is biodegradable, recyclable and renewable. Accordingly, the present invention provides an environmentally responsible alternative to plastic packaging products.

Figure 1:
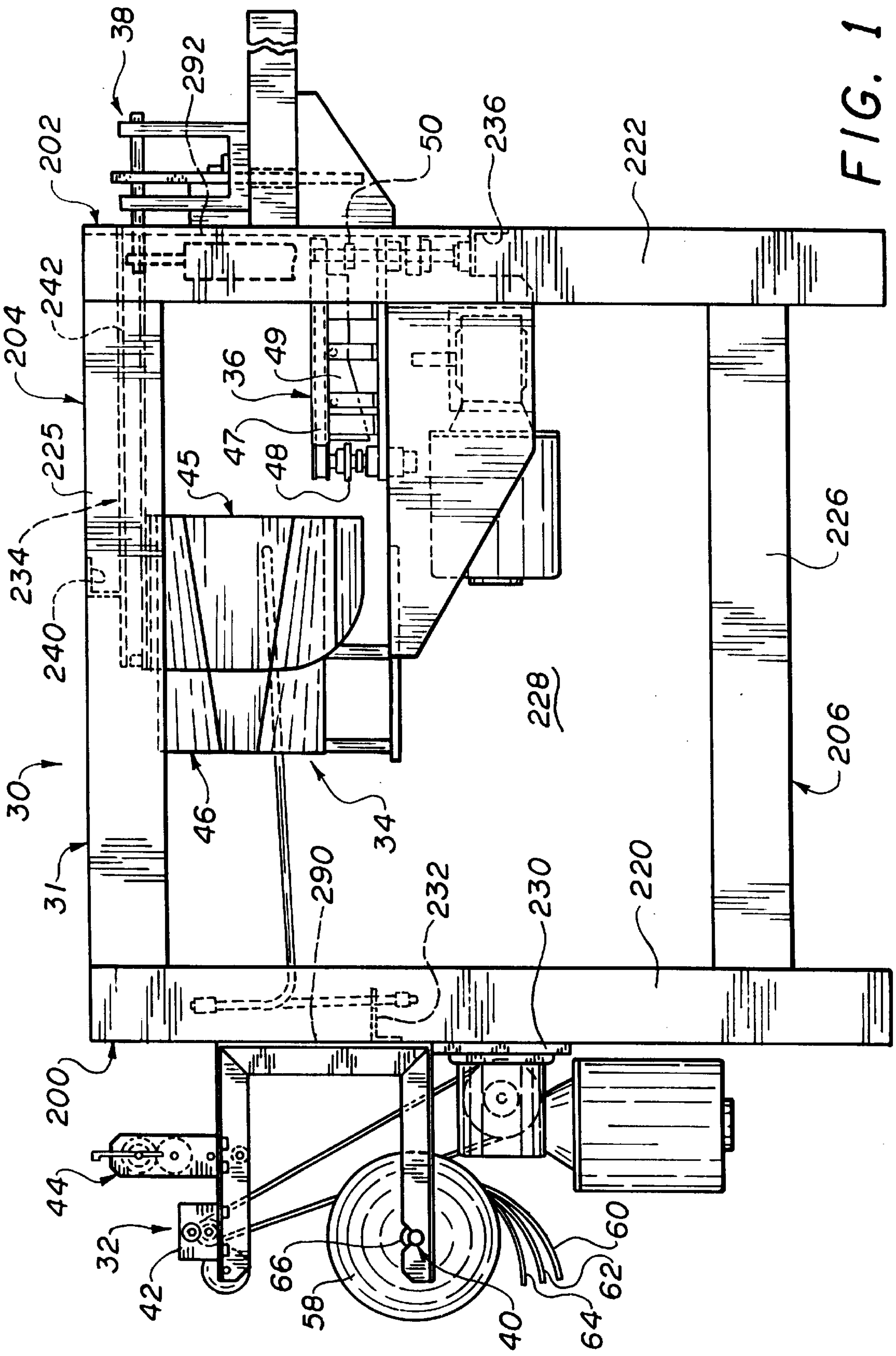
FIG. 1 is a side view of a cushioning conversion machine for converting sheet-like stock material into a cushioning product, the machine including a frame assembly, a stock-preparing assembly, a stock-shaping assembly, a tab-connecting assembly, and a strip-cutting assembly.
Figure 2:
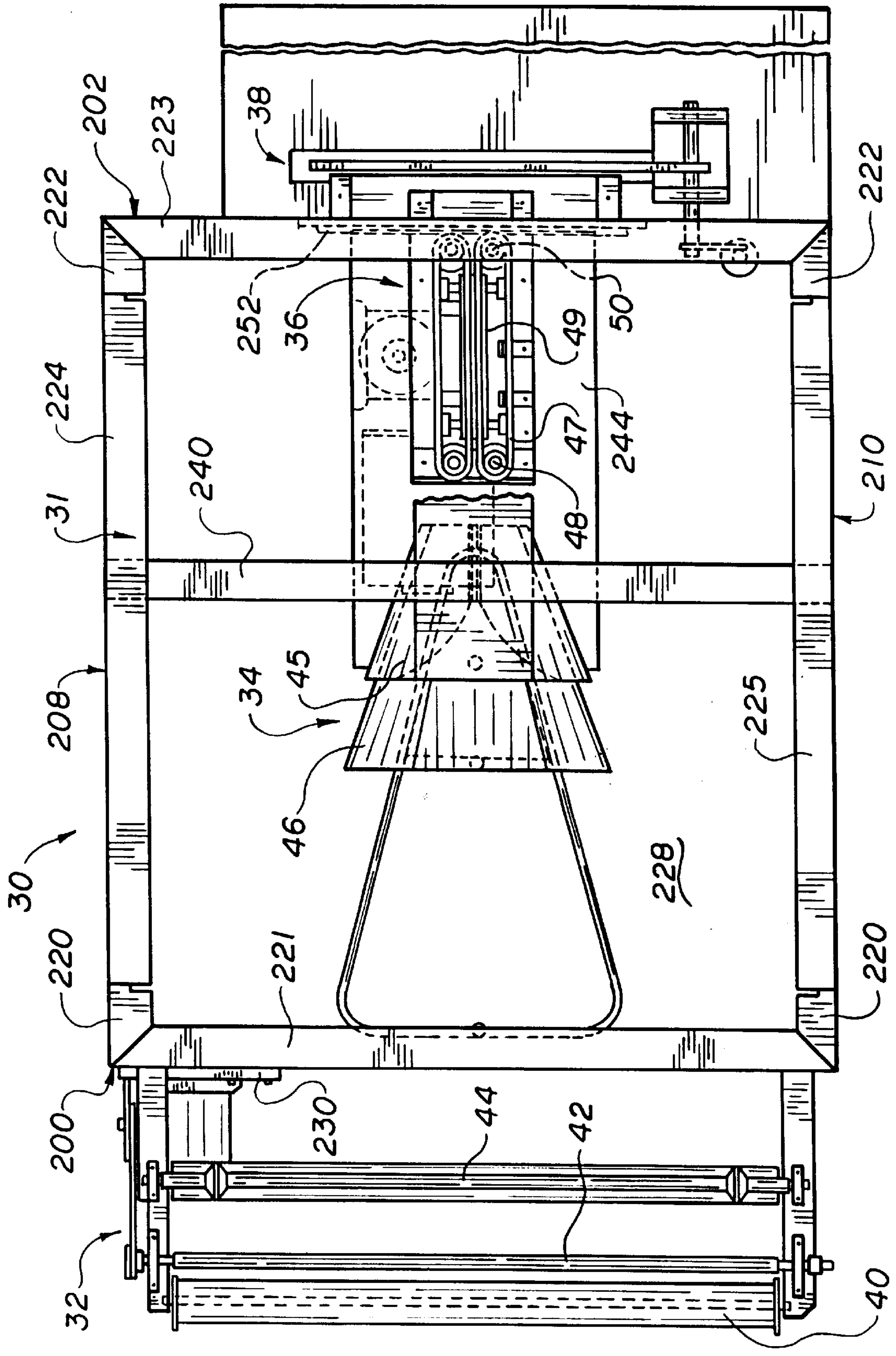
FIG. 2 is a top view of the cushioning conversion machine.

Referring now to FIGS. 1 and 2, a first embodiment of cushioning conversion machine is designated generally by reference numeral 30. The machine includes a frame assembly 31 which forms the structural skeleton for the conversion assemblies of the machine 30. The conversion assemblies include a stock-preparing assembly 32, a stock-shaping assembly 34, a tab-connecting assembly 36, and a strip-cutting assembly 38. These assemblies of the machine 30 coordinate to convert stock material into a cushioning product according to the present invention. To this end, the stock-preparing assembly 32 includes a supplying device 40, an embossing device 42, and a separating/crimping device 44; the stock-shaping assembly 34 includes an outer shaping device 45 and an inner shaping device 46; and the tab-connecting assembly 36 includes a pulling device 47, a creasing device 48, a folding device 49, and a connecting device 50. It should be noted at this point that, in the context of the present invention, the terms used to describe the herein-defined assemblies and devices correspond to any assembly/device which preforms the specified function of such an assembly/device, regardless of whether it is structurally equivalent to the disclosed embodiment.

In the preferred embodiment, the machine 30 is designed to convert multilayer stock material into a cushioning product. The roles the conversion components play in the creation of such a cushioning product is best explained by referring additionally to FIGS. 3A–3H in which a preferred method of converting stock material into a cushioning product is schematically illustrated. The steps of this conversion method may be viewed as including stock-preparation steps, stock-shaping steps, tab-connecting steps, and strip-cutting steps.

The stock-preparation steps of the conversion method begin with providing a stock material 58 which includes a plurality of layers. Preferably, the stock material 58 comprises three superimposed layers, namely an outer layer 60, an intermediate layer 62, and an inner layer 64. These layers are each preferably 30 inches wide, comprised of biodegradable, recyclable and reusable thirty-pound Kraft paper, and rolled onto a hollow cylindrical tube 66. (See FIG. 3A.)

In the initial stages of the stock-preparation steps, the stock material 58 is embossed (preferably by the embossing device 42) whereby the stock material 58 is transformed into embossed stock material 58'. (See FIG. 3B.) This embossing step results in an embossing pattern 68 being formed on the layers 60, 62, and 64 to create an embossed outer layer 60', an embossed intermediate layer 62', and an embossed inner layer 64'. In the preferred embodiment, the embossing pattern 68 comprises a series of sixteen equilateral triangular grooves 70 which are approximately 3/16 inch high and an approximately one inch flat section 71. (See FIG. $3B_1$.) This embossing pattern 68 is believed to enhance the cushioning characteristics of the resulting cushioning product, and the geometry of the embossing pattern may be altered if necessary, or desirable, for certain cushioning requirements.

The embossed stock material 58' is then separated and crimped (preferably by the separating/crimping device 44) to form prepared stock material 58" which is separated, crimped, and embossed. (See FIG. 3C.) More particularly, the embossed layers 60', 62' and 64' are separated from each other. Additionally, the outer embossed layer 60' is longitudinally crimped whereby two longitudinal crimping channels 74 are formed thereon. The crimping channels 74 are each approximately equilateral triangular in shape and each roughly ½ inch wide and ½ inch deep. (See FIG. $3C_1$.) The crimping channels 74 may be viewed as separating the outer prepared layer 60" into a central section 80 and two lateral end sections 82. (See FIG. 3C.) In the preferred embodiment, the central section 80 is approximately 26 inches wide and the two lateral end sections 82 are each approximately 1½ inches wide. Thus, the sum of the width of the central section (26 inches), the width of the two lateral end sections 82 (3 inches) and the width of the crimping channels 74 (1 inch) equals thirty inches.

Once the prepared stock material 58" has been created, the stock-shaping steps of the conversion method are initiated. In the stock-shaping steps, the prepared stock material 58" is shaped into a continuous strip 84 of cushioning material having a pillow-like portion 86 and a tab portion 88 projecting therefrom. (See FIG. 3D.) (For the sake of clarity, the pillow-like portion 86 is shown as having a pair of neat, uniform coils in the drawing. However, in an actual embodiment, these coils would be much more random.) Preferably, the central section 80 of the outer layer 60" forms the "casing" 89 of the pillow-like portion 86, while the intermediate layer 62" and the inner layer 64" form the "stuffing" 90 of the pillow-like portion 86. As is explained in more detail below, the casing 89 is preferably formed by the manipulation of the outer layer 60" by the outer shaping device 45 and the stuffing 90 is preferably formed by the manipulation of the intermediate and inner layers 62" and 64" by the inner shaping device 46.

The tab portion 88 of the continuous strip 84 is preferably formed from the lateral end sections 82 of the outer layer 60". Consequently, the height of the tab portion 88 will be approximately equal to the width of a lateral end section 82 (i.e. approximately 1½ inch in the preferred embodiment) and the crimping channels 74 will form transitions between the pillow-like portion 86 and the tab portion 88 of the continuous strip 84. As is explained in more detail below, the outer shaping device 45 is preferably also used to form the tab portion 88.

In relative relation to each other, the pillow-like portion 86 forms the major part of the continuous strip 84 and is substantially larger than the tab portion 88. More particularly, the width $W_{86}$ of the pillow-like portion 86 is substantially greater than the width $W_{88}$ of the tab portion 88. Preferably, the width $W_{86}$ is at least twice as great as the width $W_{88}$, more preferably the width $W_{86}$ is at least three times as great as the width $W_{88}$, and even more preferably the width $W_{86}$ is at least five times as great as the width $W_{88}$. Additionally, the height $H_{86}$ of the pillow-like portion 86 is preferably at least twice as great as the height $H_{88}$ of the tab portion 88, more preferably the height $H_{86}$ is at least three times as great as the height $H_{88}$, and even more preferably the height $H_{86}$ is at least six times as great as the height $H_{88}$.

After the stock-shaping steps have been completed, the tab-connecting steps are initiated to connect the lateral end sections 82 (which form the tab portion 88) so that the portion 86 will maintain its desired pillow-like geometry. In the tab-connecting steps, the continuous strip 84, or more particularly the tab portion 88, is first creased to form a creased continuous strip 84' having a creased tab portion 88'. (See FIG. 3E.) The creased tab portion 88' includes a crease groove 91 which is approximately equilateral triangular in shape and is about ¼ inch wide and ¼ inch deep. The groove 91 may be viewed as dividing the creased tab portion 88' into a distal section 92 and a proximate section 93.

The creased tab portion 88' is then loaded onto the folding device 49 which gradually folds the distal section 92 over the proximate section 93 whereby these sections overlap to form a folded tab portion 88".

The folded tab portion 88", or more specifically its proximate section, is then coined to form a continuous strip 84'" having a connected tab portion 88'". Thus, the tab portion 88'" includes a coining pattern 94. Preferably this coining pattern 94 includes a series of openings 95 in the tab's distal section 92 which mate with indentations 96 in the tab's proximate section 93; and a series of openings 97 in the tab's proximate section 93 which mate with indentations 98 in the tab's distal section 92. (See FIGS. $3G_1$ and $3G_2$.) In the preferred embodiment, this connecting step is performed by the connecting device 50.

After the connected strip 84'" has been formed, the strip-cutting steps of the conversion method are initiated. More particularly, the connected strip 84'" is cut (preferably by the strip-cutting assembly 38) at a desired length to form a cushioning product 100. In this manner, the cushioning product 100 may be varied depending on the desired application.

Thus, the cushioning product 100 according to the present invention is comprised of a stock material including at least a first layer and a second layer. The layers of the stock material form a pillow-like portion and at least one tab portion which projects form the pillow-like portion. The tab portion is connected whereby the pillow-like portion maintains its pillow-like geometry. Preferably, the stock material further comprises a third layer, and each of the layers is 30 inches wide, biodegradable, recyclable and reusable thirty-pound Kraft paper. The cushioning product preferably has a density in the range of 0.30–0.50 pounds/foot$^3$ and more preferably approximately equal to 0.35–0.40 pounds/foot$^3$.

As was indicated above, in the preferred embodiment the steps of the conversion method are performed by the stock-preparing assembly 32, and stock-shaping assembly 34, the tab-connecting assembly 36, and the strip-cutting assembly 38. Also, as was indicated above, these conversion assemblies are all mounted on the frame assembly 31. Each of these assemblies is discussed separately below.

Referring now to FIGS. 1 and 2, it may be seen that the frame assembly 31 forms the structural skeleton of the machine 30. The frame assembly 31 comprises a number of primary structural members which form a generally cubical shape and which together define an upstream end 200, a downstream end 202, a top side 204, a bottom side 206, and two lateral sides 208 and 210. "Upstream" and "downstream" in this context correspond to the direction of flow of the stock material 58/58'/58''' and the continuous strip 84/84'/84''' through the machine 30 during the conversion process. In the illustrated embodiment this direction of flow is from the left to the right.

For ease in explanation, the upstream and downstream ends 200 and 202 will be viewed as defining the axial ends of the frame assembly 31. Additionally, the sides 204, 206, 208 and 210 have been modified by the terms "top", "bottom", and "lateral" because these modifiers match the illustrated orientation of the machine 30. In accordance with this convention and the illustrated embodiment, the height of the frame assembly 31 will correspond to the vertical distance between top side 204 and the supporting surface or floor (not specifically shown) below the bottom side 206, and axial length of the frame assembly 31 will correspond to the horizontal distance between the axial ends 200 and 202, and the width of the frame assembly 31 will correspond to the horizontal distance between the lateral sides 208 and 210.

Although the illustrated embodiment reflects the preferred orientation of the machine 30, other orientations are possible with, and contemplated by, the present invention. Consequently, the use of specific modifiers (such as top, bottom, lateral, vertical and/or horizontal) and dimensional definitions (such as height, width and/or length) do not reflect any necessity to strictly adhere to the illustrated orientation. Instead these terms should be interpreted as referring to the arrangement of the frame assembly 31 relative to the other components of the machine 30. It should be noted for future reference that similar definitions will be applied when explaining the other assemblies of the machine 30, and the machine 30 itself, and these definitions should be similarly interpreted, regardless of the orientation of an actual working embodiment.

The primary structural members of the frame assembly 31 comprise a pair of upstream vertical members 220 which are joined by a connecting member 221 and a pair of downstream vertical members 222 which are joined by a connecting member 223. Each upstream vertical member 220 is also joined with the corresponding downstream vertical member 222 by top horizontal members 224 and 225 and bottom horizontal members 226. These members together form a "table-like" structure defining an inner machine cavity 228 in which certain conversion assemblies, namely the stock-shaping assembly 34 and the tab-connecting assembly 36, are located. (See FIG. 1.) Although not expressly shown in the drawings, bottom bracing members may be provided between each pair of upstream/downstream vertical members for additional reinforcement.

The frame assembly 31 further includes other coupling members which coordinate with the conversion assemblies of the machine 30 to couple them to the primary structural members. These coupling members include an embosser-motor coupling member 230, an inner-shaping coupling member 232, an outer-shaping coupling member 234, and a tab-connecting coupling member 236. (See FIG. 1.) As is best seen in FIG. 2, the embosser-motor coupling member 230 is attached to the upstream end 200 of the frame assembly 31. The inner-shaping coupling member 232 is attached to, and extends horizontally between, the upstream vertical members 220. The outer-shaping coupling member 234 includes a horizontal cross bar 240 and a coupling panel 242 projecting from an edge thereof. The cross bar 240 is attached to, and extends across, central sections of the top horizontal members 224 and 225, while the coupling panel 242 extends in a downstream direction and is attached at its distal end to the downstream connecting member 223. Regarding the tab-connecting coupling member 236, it is attached to, and extends horizontally between, the downstream vertical members 222.

The coupling members of the frame assembly 31 additionally include a coupling shelf 244 which is shown isolated from the other components of the assembly 31 in FIGS. 4 and 5. The coupling shelf 244 is designed to coordinate with certain components of the stock-shaping assembly 34 and the tab-connecting assembly 36 for coupling the same to the primary structural members of the frame assembly 31. To this end, the shelf 244 includes a horizontal panel 246, vertical side walls 248 and 250 extending downward from the panel 246, and flanges 252 extending outwardly from the vertical side walls 248 and 250. As is best seen in FIG. 4, the side walls 248 and 250 each include an upstream roughly triangular portion 254 which tapers downward to join with an approximately rectangular portion 256 which in turn is joined to a downstream rectangular tab 258.

The coupling shelf 244 is provided with appropriate openings through which fasteners may be inserted in the coupling of the conversion assemblies/devices to the frame assembly 31. For example, the side wall 248 includes a set of four elongated slots 260 in its rectangular portion 256. (See FIG. 4.) As explained in more detail below, these slots 260 are used in the coupling of certain components of the pulling device 47 to the frame assembly 31. The horizontal panel 246 is also provided with appropriate openings, the geometry and arrangement of which are best described by referring to FIG. 5. As illustrated, the upstream portion of the panel 246 is provided with a pair of circular apertures 266 which, as explained in more detail below, are used in the coupling of a certain component of the inner shaping device 46 to the frame assembly 31. Additionally, an elongated slot 275 and a circular aperture 276 are positioned downstream from the openings 266 and, an essentially identical elongated slot 277 and a circular aperture 278 and positioned even further downstream along the downstream edge of the panel 246.

As is best seen by referring briefly back to FIG. 2, the flanges 252 are used to secure the coupling shelf 244 to the primary structural components of the frame assembly 31. More particularly, the flanges 252 are secured to a cross member (not specifically numbered) which is attached to, and extends between, the downstream vertical members 222 whereby the remaining portions of the coupling shelf 244 extend inwardly in a cantilever fashion into the machine cavity 228. In this manner, the appropriate conversion components may be mounted on the coupling shelf 244 whereby they may interact with the prepared stock material 58'' and/or the continuous strip 84/84'/84''.

Thus the frame assembly 31 is designed to support the conversion assemblies of the machine 30 in an arrangement consistent with the preferred method of converting the sheet-like stock material 58 into the cushioning product 100. More particularly, as is best seen in FIGS. 1 and 2, the stock-preparing assembly 32 extends outwardly from the upstream end 200 of the machine frame assembly 31; the stock-shaping assembly 34 is positioned in upstream portions of the inner machine cavity 228 and thus downstream from the stock-preparing assembly 32; the tab-connecting assembly 36 is positioned in downstream portions of the inner machine cavity 228 whereby it is located downstream from the stock-shaping assembly 34; and the strip-cutting assembly 38 extends outwardly from the downstream end 202 of the machine frame assembly 31 and thus is located downstream of the tab-connecting assembly 38.

The illustrated arrangement of the conversion assemblies allows the prepared stock material 58" to travel from the stock-preparing assembly 32, through an inlet opening 290 formed in the upstream end 200 of the frame assembly 31 and through the stock-shaping assembly 34 to form the continuous strip 84. The continuous strip 84 may then travel through the tab-connecting assembly 36 to form the connected strip 84'", through an outlet opening 292 in the downstream end 202 of the frame assembly 31, to the strip-cutting assembly 38 to form the cushioning product 100. Thus, these conversion assemblies coordinate to form the desired cushioning product as is explained in more detail below.

Referring now additionally to FIGS. 6 and 7, the stock-preparing assembly 32 is shown in detail. As was indicated above, the stock-preparing assembly 32 includes a supplying device 40, an embossing device 42, and a separating/crimping device 44. These stock-preparing devices coordinate to prepare the stock material 58 for the preceding stages of the conversion process. To this end, they are positioned adjacent the upstream end 200 of the frame assembly 31, and more particularly are appropriately coupled thereto by a pair of mounting units 300.

The mounting units 300 are each basically shaped Uke a backwards square "C" and each include a top leg 302, a bottom leg 304, and a connecting leg 306 therebetween. Each of the legs is preferably made of pieces of steel angle material whereby each includes a pair of perpendicular flanges. More particularly, the top leg 302 includes a vertical flange $302_v$ and a horizontal flange $302_h$, the bottom leg 304 includes a vertical flange $304_v$ and a horizontal flange $304_h$, and the connecting leg 306 includes a vertical flange $306_{v1}$ which is positioned parallel to the lateral sides 208 and 210 of the machine frame assembly 31 and another vertical flange $306_{v2}$ which is positioned perpendicular to these lateral sides. The, flanges $302_v$, $304_v$ and $306_{v1}$ are located in substantially the same vertical plane and the flanges $302_h$, $304_h$ and $306_{v2}$ project outwardly therefrom towards the respective lateral sides 208 and 210 of the machine frame assembly 31. (See FIG. 6.) The flange $302_h$ which is positioned adjacent the lateral side 210 includes a rectangular cutout 308 for accommodating certain components of the embossing device 42. (See FIG. 7.)

The mounting units 300 are coupled to the frame assembly 31 by securely attaching the flanges $306_{v2}$ of the connecting legs 306 to the upstream vertical frame members 220 whereby the lege 302 and 304 extend outwardly from the upstream end 200 of the machine frame assembly 31. (See FIG. 6.) In this manner, the supplying device 40, the embossing device 42, and the separating/crimping device 44 may be mounted on the top and bottom mounting legs 302 and 304. These stock-preparing devices are strategically arranged on these mounting legs so that the stock material 58 smoothly travels from the supplying device 40 to the embossing device 42 and so that the embossed stock material 58' smoothly travels from the embossing device 42 to the separating/crimping device 44. Additionally, the mounting units 300 are attached at a level whereat the prepared stock material 58" may smoothly travel from the separating/crimping device 44, through the inlet opening 290, and into the stock-shaping assembly 34.

Turning now to the supplying device 40, it includes a supply rod 310 which is cradled in open slots 311 in the distal ends of the bottom vertical legs 304, or more particularly the flanges $304_{v1}$ of the mounting units 300. The supply rod 310 is sized to extend relatively loosely through the hollow cylindrical tube 66 of the stock material 58. In this manner, as the stock material 58 is pulled through the cushioning conversion machine 30, the tube 66 will freely rotate thereby dispensing stock material. A pin (not shown) may be provided through one or both ends of the supply rod 310 to limit or prevent rotation of the rod itself.

The supplying device 40 further includes a constant-entry bar 312 which is rotatably mounted on the distal ends of the flanges $302_v$ of the top mounting legs 302. The constant-entry bar 312 provides a non-varying point of entry for the stock material 58 into the embossing device 42, regardless of the diameter of the roll of the stock material 58. Thus, when a different diameter roll is used and/or as dispensation of the stock material 58 from the roll decreases its diameter, the point of entry of the stock material 58 into the embossing device 42 remains constant. This consistency is believed to facilitate uniform production of the cushioning product 100. Details of a "roller member" or a "bar member" similar to the constant-entry bar 312 are set forth in U.S. Pat. No. 4,750,896.

The primary function of the embossing device 42 is to imprint the desired embossing pattern 68 onto the layers 60, 62, and 64 of the stock material 58. To this end, the embossing device 42 includes a top embosser roller 314 and a bottom embosser roller 316 which are concentrically attached to respective shafts in a vertically aligned manner and between which the layers 60, 62, and 64 travel. The design of the embosser rollers 314 and 316 understandably corresponds to the desired embossing pattern 68. Consequently, in the preferred embodiment, the embosser rollers 314 and 316 each have a two inch outer diameter and a 1⅝ inch inner diameter. The embosser roller 314 includes sixteen teeth 319 and an "untoothed" portion equivalent to two teeth; the embosser roller 316 includes sixteen teeth 320 and an "untoothed" portion equivalent to two teeth. (See FIG. 8.)

The respective shafts of the embosser rollers 314 and 316 are mounted to the mounting units 300 by a pair of embosser-mounting blocks 322. These embosser-mounting blocks 322 project upwardly from the top horizontal flanges $302_h$ and are secured thereto by appropriate fasteners which are shown but not specifically numbered in the drawings. (See FIG. 6.) The embosser-mounting blocks 322 are positioned slightly downstream from the constant entry bar 312, and upstream from the separating/crimping device 44. (See FIGS. 6 and 7.) Additionally, one of the mounting blocks 322 is positioned immediately adjacent the rectangular cutout 308, while the other mounting block 322 is positioned centrally relative to the respective flange $302_h$.

The embossing device 42 further includes an embosser-drive unit 340 which rotates the bottom embosser roller 316 in a first direction to thereby rotate the top embosser roller 314 in the opposite direction. The rotational direction of the respective embosser rollers is chosen so that the stock material 58 travels between the rollers 314 and 316, and the embossed stock material 58' is urged towards the separating/crimping device 44. In FIG. 6, this direction would be counterclockwise for the upper embosser roller 314 and clockwise for the lower embosser roller 316.

The embosser-drive unit 340 preferably includes an embosser-motor 342 and an embosser-drive belt 344 which operatively couples the motor 342 to the bottom embosser roller 316. The embosser-motor 342 is mounted to the upstream end 200 of the machine frame assembly 31 via the embosser-motor coupling member 230. This mounting arrangement results in the embosser-motor 342 being located adjacent the lateral side 208 of the machine frame assembly 31 whereby the motor 342 is positioned on the same side of the machine 30 as the rectangular cutout 308. (See FIG. 7.) Additionally, the embosser-motor 342 is positioned below the bottom legs 304 of the mounting units 300. (See FIG. 6.) In this manner, the embosser-drive belt 344 may extend from the embosser-motor 342 to the bottom embosser roller 316 without interfering with other components of the stock-preparing assembly 32 and/or the stock material 58/58'/58".

As was explained above, the embossed stock material 58' travel from the embossing device 42 to the separating/crimping device 44. The separating/crimping device 44 performs the dual function of separating the embossed layers 60', 62', and 64' from each other and crimping the outer embossed layer 60' prior to their passage to the stock-shaping assembly 34. To this end, the device 44 includes an inner separating unit 350, an intermediate separating unit 352, and an outer separating/crimping unit 354.

The separating units 350, 352 and 354 coordinate to separate the layers 60', 62', and 64' from each other prior to their passing to the stock-shaping assembly 34. The number of separating units, namely three, corresponds to the number of layers of the stock material 58, and thus this number may be increased/decreased depending on the make-up of the stock material. This "pre-separation" is believed to improve the loft of the cushioning product 100. Details of another separating mechanism (which does not include a crimping feature) are set forth in U.S. Pat. No. 4,750,896.

The inner and intermediate separating units 350 and 352 essentially consist of cylindrical rods which are non-rotatably mounted to the support units 300. However, the design of the outer separating/crimping unit 354 is somewhat more complicated due to the fact that this unit must, in addition to separating the outer embossed layer 60' from the layers 62' and 64', form the crimping channels 74 in the outer embossed layer 60'. To form these crimping channels 74, the outer separating/crimping unit 354 includes an upper crimping member 356 and a lower crimping member 358.

The upper crimping member 356 includes a shaft 360 on which a pair of crimping-rollers 362 are mounted, and the lower crimping member 358 includes a shaft 364 in which a pair of mating grooves 366 are formed. (See FIG. 9.) The geometry and location of the crimping rollers 362 and grooves 366 corresponds to the desired geometry and location of the crimping channels 74 on the outer embossed layer 60'. Thus, in the preferred embodiment, the crimping rollers 362 include a circumferential edge which has a cross-sectional shape approximating that of an equilateral triangle having ½ inch sides and the grooves 366 possess a complimentary shape. (See FIG. 9.) Additionally, the rollers 362 and the grooves 366 are positioned approximately 26½ inches apart to produce lateral end sections 82 of the desired dimensions.

As was alluded to above, the separating units 350, 352 and 354 are mounted to the mounting units 300. More particularly, the inner separating unit 350 is directly and non-rotatably coupled to, and extends between the vertical flanges $302_v$ of the top mounting leg 302. Rather than being directly coupled to the mounting units 300, the intermediate separating unit 352 and the outer crimping/separating unit 354 are coupled to the mounting units 300 via a pair of crimping/separating mounting blocks 378. The mounting blocks 378 are attached to the horizontal flanges $302_h$ of the top mounting leg 302 by appropriate fasteners which are shown but not numbered in the relevant drawings. These separator-mounting blocks 378 are located upstream of the embpsser-mounting blocks 322 and transversely aligned therewith. (See FIG. 7.)

The intermediate separating unit 352 is non-rotatably mounted on, and extends between, proximate portions of the mounting blocks 378. Regarding the outer separating/crimping unit 354, the lower crimping member 358 is rotatably mounted on, and extends between, central portions of the mounting blocks 378. The upper crimping member 356 is non-rotatably mounted, and extends between, distal portions of the mounting blocks 378.

Thus, when the machine 30 is used to convert the sheet-like stock material 58 into the cushioning product 100, the stock material 58 is dispensed from the supplying device 40 and then travels to the embossing device 42. The embossing device 42 embosses the stock material to form the embossed stock material 58'. The embossed stock material 58' is then separated and crimped by the separating/crimping device 44 to form prepared stock material 58" which is separated, crimped, and embossed. The prepared stock material 58" then travels to the stock-shaping assembly 34 which shapes the prepared stock material 58" into the continuous strip 84 which has the pillow-like portion 86 and a tab portion 88 projecting therefrom.

Directing attention now to FIGS. 10 and 11, the stock-shaping assembly 34 is shown along with the relevant components of the frame assembly 31. As was indicated above, it includes an outer shaping device 45 and an inner shaping device 46. These devices coordinate to shape the prepared stock material 58" into the continuous strip 84. More particularly, the outer shaping device 45 forms the tab portion 88 and the outer casing 89 of the pillow-like portion 86, while the inner shaping device 46 forms the inner stuffing 90 of the pillow-like portion 86.

Referring additionally to FIGS. 12, 13 and 14, the outer shaping device 45 is illustrated isolated from the other components of the machine 30. As shown, the outer shaping device 45 includes an outer funnel unit 406 and a mounting panel 408 coupled thereto. These components of the outer shaping device 45 are preferably made of ⅛ inch thick polyvinylchloride (PVC) and are preferably bonded together in the initial fabrication of the outer shaping device 45.

The geometry of the outer funnel unit 406 is best explained by referring to the relevant drawings. As shown in FIGS. 12–14, the outer funnel unit 406 includes an inlet 410 which is defined by an inlet edge 412 and an outlet 414 which is defined by an outlet edge 416. The inlet 410 and the outlet 412 are approximately concentric with each other and the machine inlet opening 290 and/or the machine outlet opening 292.

While the shape of the inlet 410 appears roughly elliptical when viewed from the upstream end 200 of the machine frame assembly 31 (see FIG. 14,), its shape is probably more accurately described as a "rounded corner" rectangle. More particularly, when viewed in this prospective, the inlet edge 412 includes substantially straight top and bottom sections 418 and 420, respectively, and substantially straight side sections 422. These sections of the inlet edge 412 are joined together by curved corner sections. The outlet 414 also appears roughly elliptical in shape when viewed from either axial end 200 or 202 of the frame assembly 31. While the shape of the outlet 414 more closely resembles that of a true ellipse, the outlet edge 416 also includes straight top and bottom side sections 424 and 426, respectively, and straight side sections 428, all of which are joined together by curved corner sections. As is best seen in FIGS. 10 and 12, the corresponding straight side sections 422 and 428 of the inlet and outlet edges 412 and 416 are joined by substantially flat trapezoidal portions 430.

When viewing the funnel unit 406 from the bottom side 206 of the frame assembly 31, such as is shown in FIG. 13, it may be seen that all of the sections of the outlet edge 416 are positioned substantially in the same vertical plane. Certain sections of the inlet edge 412 (namely the top straight section 418, the straight side sections 422, and the curved corner sections therebetween) are also positioned in substantially the same vertical plane. However, the bottom straight section 420 (which is actually comprised of two semi-sections), and the curved corner sections adjacent thereto, extend inwardly from the straight side sections 422 towards an imaginary point representing approximately the axial and lateral center of the outer funnel unit 406. At this imaginary point, the semi-sections of the section 420 each join with a bottom edge 432 of the outer funnel unit 406. As is explained in more detail below, these bottom edges 432 define a tab-forming slot 434 which is instrumental in forming the tab portion 88 of the continuous strip 84 during the conversion process.

As is best shown in FIGS. 13 and 14, the width of the outer funnel unit 406 substantially narrows from its inlet 410 to its outlet 414. In the preferred embodiment, the inlet 410 is approximately 11½ inches wide and approximately 9¾inches high. The top straight section 418 of the inlet edge 412 is approximately 5 inches wide, while the bottom section 420 appears this wide when viewed from the upstream end 200 of the machine frame assembly 31. (See FIG. 14.) The side sections 422 are approximately 3¼ inches in height.

The outlet 414 is approximately 5¼ inches wide and approximately 9¾ inches high. The top and bottom sections 424 and 426 of the outlet edge 416 are each approximately 2 inches wide, while its straight side sections 428 are approximately 5½inches high. Because the outlet side sections 428 are greater in height than the inlet side sections 422 (5½ inches to 3¼ inches) the trapezoidal portions 430 widen outwardly from the inlet 410 to the outlet 414, in contrast to the overall geometry of the outer funnel unit 406.

The length of the outer funnel unit 406 is preferably approximately 8 inches whereby the bottom section 420 of the inlet edge 412 joins the bottom edges 432 at a point approximately 4 inches from either axial end of the outer funnel unit 406. Regarding the tab-forming slot 434, its dimensions will correspond to the desired shape of the tab portion 88 of the continuous strip 84. Consequently, in the preferred embodiment, the tab-forming slot 434 will be approximately ¼ inch wide and 1½ inches high.

Turning now to the mounting panel 408, it serves to mount the outer funnel unit 406 in the appropriate position relative to the other conversion components of the machine 30 and it essentially consists of a rectangular plate. As is best seen in FIGS. 12 and 13, the mounting panel 408 is positioned adjacent the upper surface of the outer funnel unit 406 in such a manner that its upstream lateral edge is basically aligned with the top section 418 of the inlet edge 412. The width of the mounting panel 408 is preferably chosen so that it is slightly greater than the length of the top section 418. More particularly, when used with a shaping unit of the preferred dimensions, it is preferably approximately 6 inches wide. The mounting panel 408 extends in the downstream direction substantially beyond the outlet edge 416 of the outer funnel unit 406, and is preferably approximately 17⅜ inches long.

The mounting panel 408 is provided with openings 436 and 438 in its upstream and downstream edges, respectively. (See FIG. 13.) When coupling the outer shaping device 45 to the machine frame assembly 31, these openings coordinate with appropriate fasteners 439 to mount the device 45 to the outer-shaping coupling member 234 of the frame assembly 31. (See FIG. 10.) As is best seen in FIG. 1, this positions the outer funnel unit 406 concentrically with the machine inlet and outlet openings 290 and 292. Additionally, the bottom edges 432 of the unit are elevated above the coupling shelf 244 of the frame assembly 31 and this elevation appropriately aligns the tab-forming slot 434 with the creasing device 48.

Referring now additionally to FIGS. 15–19, the components of the inner shaping device 46 are shown in detail. The inner shaping device 46 includes an inner funnel unit 440 which is shown in FIGS. 15–17 and a bar-like shaping unit 441 which is shown in FIGS. 18–19. The inner funnel unit 440 and the bar-like shaping unit 441 coordinate to inwardly roll or coil the intermediate end inner layers 62" and 64" of the prepared stock material 58" to form the stuffing 90 for the pillow-like portion 86 of the continuous strip 84.

Addressing initially the inner funnel unit 440, this unit is preferably made of ⅛ inch thick polyvinyl chloride (PVC) and its geometry is best explained by referring to FIGS. 15–17. The inner funnel unit 440 includes and inlet 442 which is defined by an inlet edge 444 and an outlet 446 which is defined by an outlet edge 448. The inlet 442 and the outlet 446 are approximately concentric with each other, the inlet 410 and the outlet 414 of the outer funnel unit 406, and the machine inlet opening 290 and/or the machine outlet opening 292. (See FIG. 1.) As is best seen in FIGS. 15 and 16, all of the sections of the outlet edge 448 are positioned in substantially the same vertical plane. Additionally, and in contrast to the inlet edge of 412 of the outer funnel unit 406, all of the sections of the inlet edge 444 are positioned in substantially the same vertical plane.

The shape of the inlet 442 appears roughly elliptical when viewed from the upstream end 200 of the machine frame assembly 31. (See FIG. 17.) However, much like the analogous component of the outer funnel unit 406, its shape is probably more accurately described as a "rounded corner" rectangle. More particularly, when viewed in this prospective, the inlet edge 444 includes substantially straight top and bottom section 450 and 452, respectively, and substantially straight side sections 454, and these sections are joined together by curved corner sections.

The outlet 446 also appears roughly elliptical in shape when viewed from either axial end 200 or 202 of the machine frame assembly 31. (See FIG. 17.) It also includes straight top and bottom side sections 456 and 458, respectively, and straight side sections 460, with adjacent sections being joined together by curved corner sections. The respective inlet side sections 454 and outlet side sections 460 are joined by flat trapezoidal portions 462. (See FIGS. 15 and 17.)

In the preferred embodiment, the inner funnel member 440 is preferably approximately 12⅜ inches long, whereby it is substantially 4⅜ inches longer than the outer funnel unit 406. Additionally, the width of the inner funnel unit 440 substantially tapers towards its outlet 446. (See FIG. 16.) More particularly, the inlet 442 is preferably approximately 13¼ inches wide and approximately 8½ inches high. The top and bottom sections 450 and 452 of the inlet edge 444 and 6¾ inches wide and the straight side sections 454 are approximately 2 inches high.

Thus, in comparison, the inlet 442 of the inner funnel unit 440 is approximately 2¼ inches wider, and approximately 1¼ inches shorter, than the inlet 410 of the outer funnel unit 406. Additionally, the top and bottom inlet sections 450 and 452 of the inner funnel unit 440 are each approximately 1¾ inches narrower than the comparable sections of the outer funnel 406, while the inlet side sections 454 are each approximately 1¼ inches shorter than the inlet side sections 422 of the outer funnel unit 406.

The outlet 446 of the inner funnel unit 440 is preferably approximately 4 inches wide and approximately 8½ inches high whereby it is approximately 1¼ inches narrower and shorter than the outlet 414 of the outer funnel unit 406. The top and bottom outlet sections 456 and 458 are approximately 2 inches wide while the side outlet sections 460 are approximately 6¾ inches high. Thus, the top and bottom outlet sections 456 and 458 of the inner funnel unit 440 are approximately 1½ inches wider than these sections of the outer funnel unit 406, and the outlet side sections 460 are approximately 3½ inches shorter than the outlet side sections 428 of the outer funnel unit 406.

Due to the dimensional relationship between the inlet and outlet side sections 454 and 460 (2 inches versus 5½ inches) the trapezoidal portions 462 widen outwardly from the inlet 442 to the outlet 446 of the inner funnel unit 440, in contrast to the overall shape of this unit. It should also be noted at this point that the trapezoidal portions 430 of the outer funnel unit 406 and the trapezoidal portions 462 of the inner funnel unit 440 are "geometrically similar" in shape. In other words, the angles between the connecting sides of the trapezoidal portions 430 are equal to the angles between corresponding connecting sides of the trapezoidal portions 462.

As is best seen in FIG. 11, the inner funnel unit 440 is inserted into the outer funnel unit 406 in such a manner that the outlets 414 and 446 of these units are aligned in the same vertical plane. Consequently, because the inner funnel unit 440 is longer than the outer funnel unit 406, the upstream regions of the inner funnel unit 440 extend outwardly (this extension being approximately 4⅜ inches long in the preferred embodiment) from the inlet 410 of the outer funnel unit. Additionally, when properly positioned within the outer funnel unit 406, the inner funnel unit 440 will be concentrically arranged with the outer funnel unit 406 if the tab-forming slot 434 is temporarily ignored.

The funnel units 406 and 440 are designed so that their overlapping regions are similarly shaped, with the parametric dimensions of the inner funnel unit 440 being less than the overlapping parametric dimensions of the outer funnel unit 406. The differential between the overlapping parametric dimensions is approximately equal for most of the overlapping regions of the funnel units 406 and 440. However, the corresponding regions of the respective trapezoidal portions 430 and 462 are essentially exactly aligned with teach other whereby the dimensional differentials adjacent these portions may vary slightly. The sizing of the funnel units 406 and 440, and their concentric positioning relative to each other, results in the creation of the annular passageway 463 between these units which communicates with the tab-forming slot 434. (See FIG. 11.) In the preferred embodiment, this annular space 463 is approximately ⅜ inch thick.

To position the inner funnel unit 440 in this manner, it is coupled to the machine frame assembly 31 by a coupling plate 464 and coupling blocks 465. (See FIG. 10.) The coupling plate 464 is attached to the upstream section of the horizontal panel 246 of the coupling shelf 244 via appropriate fasteners (not shown) inserted through the circular apertures 266. The coupling blocks 465 extend between the bottom surface of the inner funnel unit 440 and the coupling plate 464. To this end, the bottom surface of the inner funnel unit 440 is provided with circular apertures 466 (See FIG. 16) to receive appropriate fasteners (not shown). It may be noted for future reference that the coupling blocks 465 are located upstream from the tab-forming slot 434 of the outer funnel unit 406.

Referring now additionally to FIGS. 18 and 19, the bar-like shaping unit 441 is shown isolated from the other components of the machine 30. The shaping unit 441 comprises a V-shaped member 470, a first or upstream U-shaped member 472, and a second or downstream U-shaped member 474. These members 470, 472, and 474 coordinate to form a three-dimensional structure which, in combination with the inner funnel unit 440, coordinate to inwardly roll the lateral edges of the intermediate and inner layers 62" and 64" during the conversion process. Details of a similar bar-like shaping unit or "forming frame" (which is positioned in an opposite, up-side-down, orientation) are set forth in U.S. Pat. No. 4,750,896.

The V-shaped member 470 includes two substantially axially extending legs 476 and a vertex 478 therebetween. The vertex 478 is preferably rounded, rather than angular, and preferably has a radius of curvature approximately equal to 1¼ inches. These components of the V-shaped member 470 are preferably designed to that the member is approximately 24 inches long and approximately 14 inches wide at its upstream end.

The first or upstream U-shaped member 472 includes two side legs 480 and a top leg 482 extending therebetween. (See FIG. 18.) The distal or bottom ends of the side legs 480 are attached to the distal or upstream ends of the legs 476 of the V-shaped member 470 and they extend upwardly, and inwardly, therefrom. The height of each of the side legs 480 is preferably approximately 5¾ inches and the width of the top leg 482 is preferably approximately 10 inches.

The second or downstream U-shaped member 474 is similar in shape to the first U-shaped member 472 and consequently it includes vertical side legs 484 and a top let 486 extending therebetween. The distal, or bottom, ends of the vertical side legs 484 are attached to downstream laterally aligned points on the axially extending legs 476 of the V-shaped member 470. Thus, the U-shaped member 474 may be viewed as dividing the V-shaped member 470 into an upstream portion 488 and a downstream nose portion 490.

In the preferred embodiment, the vertical side legs 484 of the second or downstream U-shaped member 474 are approximately 2¾ inches high and the top leg 486 is approximately 5 inches wide. The vertical side legs 484 are connected to the V-shaped member 470 at points approximately 10⅞ inches upstream from its vertex 478. In this manner, the upstream portion 488 of the V-shaped member 470 is approximately 13⅛ long and the downstream nose portion 490 is approximately 10⅞ inches long.

The V-shaped member 470, and the U-shaped members 472 and 474, are preferably made from a suitable rod-like material having a circular cross-section, such as ⅜ inch diameter steel rod. In the illustrated embodiment, the second or downstream U-shaped member 474 comprises a separate component which is secured to the V-shaped member 470 in any suitable manner, such as by welding. However, the V-shaped member 470 and the first or upstream U-shaped member 472 are preferably formed integrally with each other and the transitions therebetween preferably comprise rounded corners. (See FIG. 18.) The circular cross-sections of the members 470, 472, and 474, and the specified rounded transition corners, are believed to facilitate movement of the prepared stock material 58" through the stock-shaping assembly 34. The transitions between the second or downstream U-shaped member 474 and the V-shaped member 470 need not be rounded due to their location in the stock-shaping assembly 34.

The positioning of the bar-like shaping unit 441 relative to the other components of the stock-shaping assembly 34 is illustrated in FIGS. 10 and 11. As shown, the first or upstream U-shaped member 472 is positioned in the machine cavity 228 adjacent the upstream end 200 and the inlet opening 290 of the machine frame assembly 31 and the V-shaped member 470 extends downstream therefrom. The first U-shaped member 472 is positioned in a generally vertical plane, however, it is preferably slightly upwardly sloped at an approximately 10° angle.

The downstream nose portion 490 of the V-shaped member 470 projects into the inner funnel unit 440 and the second or downstream U-shaped member 474 is also positioned within the inner funnel unit 440 just downstream of its inlet 442. Preferably, the points on the legs 476 of the V-shaped member 470 which are aligned with the inlet 442 are positioned approximately 2 inches from the bottom surface of the inner funnel unit 440 and the vertex 478 is positioned approximately 2½ inches from the bottom surface of the inner funnel unit 440. It may be noted that when the preferred dimensions are used for the stock-shaping assembly 34, downstream regions of the V-shaped member 470 are overlapped by both the outer and inner funnel units 406 and 440.

To position the bar-like shaping unit 441 in this manner, it is coupled to the machine frame assembly 31 by a coupling rod 492 projecting vertically upwardly from the inner-shaping coupling member 232 of the frame assembly 31. (See FIG. 10.) The top leg 482 of the first or upstream U-shaped member 472 is provided with a central opening 494 (see FIGS. 18 and 19) so that an appropriate fastener may secure the upper end of the coupling rod 492 to the shaping unit 441. Although not specifically shown in the drawings, a similar coupling arrangement may be used with the second or downstream U-shaped member 474. More particularly, an appropriately sized second coupling rod (not shown) would project upwardly from the bottom surface of the inner funnel unit 440 and a suitable fastener would be inserted through a central opening 496 in the top leg 486 of the second U-shaped member 474 (see FIGS. 18 and 19) to secure the unit 441 to the second coupling rod.

In the stock-shaping steps of the conversion process, the prepared stock material 58" travels through the machine inlet opening 290 and the three layers 60", 62" and 64" pass over the top of the first or upstream U-shaped member 472 of the bar-like shaping member 441. The outer layer 60" then travels though the annular passageway 463 formed between the outer and inner funnel units 406 and 440 and also through the tab-forming slot 434 of the outer funnel unit 406. More specifically, the central section 80 of the outer layer 60" is wrapped around the outer surface of the inner funnel unit 440 whereby it generally conforms to the geometry thereof to form the outer casing 89 of the pillow-like portion 86. The lateral end sections 82 are gradually threaded through the tab-forming slot 434 via the adjacent tapered geometry of the bottom inlet section 426 of the outer funnel unit 406. The crimping channels 74 formed in the outer layer 60" by the separating/crimping device 44 play a key role in encouraging insertion of the lateral end sections 82 into the tab-forming slot 434 by directing the lateral end sections 82 downward from the central section 80 of the outer layer 60".

At the same time the outer layer 60" is being converted into the tab portion 88 and the outer casing 89 of the pillow-like portion 86, the intermediate and inner layers 62" and 64" are being converted by the inner shaping device 46 into the stuffing 90 for the pillow-like portion 86. More particularly, the lateral edges of these layers 62" and 64" are rolled or coiled inwardly by the inner funnel unit 440 and the bar-like shaping unit 441 whereby two twin spirals are formed. The basic functioning of these units is essentially similar to the analogous components disclosed in U.S. Pat. No. 4,750,896.

The outer layer 60" then exits the outer funnel unit 406 via its outlet 414 and the intermediate and inner layers 62" and 64" exit the inner funnel unit 440 via its outlet 446. Once this exiting has occurred, the central section 80 of the outer layer 60" will surround and encase the intermediate and inner coiled layers 62" and 64" whereby the pillow-like portion 86 of the continuous strip 84 is formed. More particularly, the central section 80 of the outer layer 60" will form the outer casing 89 of the pillow-like portion 86 and the intermediate and the inner coiled layers 62" and 64" will form the inner stuffing 90 of the pillow-like portion 86. Additionally, the lateral end sections 82 of the outer layer 60" will form the tab portion 88 of the continuous strip 84.

In the preferred method of converting the sheet-like stock material 58 into the cushioning product 100, three layers 60", 62" and 64" of the prepared sheet-like stock material 58" are used. Additionally, the outer casing 89 of the pillow-like portion 86 and the tab portion 88 is formed solely by the outer layer 60" whereby the inner stuffing 90 of the pillow-like portion 86 is formed by the remaining layers 62" and 64" of the stock material 58". However, this method may be modified if necessary or desired for certain applications. For example, the number of "stuffing" layers could be increased or decreased to alter the density of the pillow-like portion 86. Additionally or alternatively, multiple layers could be used to form the tab portion 88 and the outer casing 89 of the pillow-like portion 86. These and other modifications are possible with, and contemplated by, the present invention.

However, regardless of what combination is chosen for the constitution of the continuous strip 84, it is important that the tab portion 88 be connected in some manner in the later stages of the conversion process. This importance stems from the fact that, in order for the continuous strip 84, and more particularly the pillow-like portion 86, to optimally maintain its cushioning qualities, the inner stuffing 90 must be relatively contained by the outer casing 89. Without some sort of connection between the lateral end sections 82 forming the tab portion 88, the resiliency of the inner stuffing 90 will encourage these lateral end sections 82 to separate from each other thereby possibly releasing the inner stuffing 90. For this reason, the continuous strip 84 next travels through the tab-connecting assembly 36 which is discussed in detail below.

Turning now to FIGS. 20–26, the tab-connecting assembly 36 is shown along with relevant components of the frame assembly 31. As was indicated above, the tab-connecting assembly 36 includes a pulling device 47, a creasing device 48, a folding device 49, and a connecting device 50. These devices, which are shown in an assembled condition in FIGS. 20 and 21, coordinate to connect the tab portion 88 of the continuous strip 84.

Addressing initially the pulling device 47, it generally includes a mounting unit 500, a pulley unit 502, and a motor unit 504. The mounting unit 500 comprises a plate member 506, a pair of upstream shaft members 508, a pair of downstream shaft members 510, and a pair of gears 511 to transfer motion between the downstream shaft members 510. As is explained in more detail below, the mounting unit 500, and specifically the upstream and downstream shaft members 508 and 510, form a mounting base for the pulley unit 502. Additionally, the mounting unit 500 forms a mounting base for the creasing device 48, the folding device 49, and the connecting device 50. More particularly, the components of the creasing device 58 are mounted on the upstream shaft members 508, the components of the folding device 49 are mounted on the plate member 506, and the components of the connecting device 50 are mounted on the downstream shaft members 510.

The plate member 506 is welded or otherwise suitably secured to the horizontal panel 246 of the coupling shelf 244 and the shaft members 508 and 510 are rotatably secured thereto. Specifically, the upstream shaft members 508 extend vertically through appropriate openings (not specifically shown) in the plate member 506 and through the openings 275 and 276 in the horizontal panel 246. Preferably the openings in the plate member 506 are similar to those in the coupling shelf 244 (i.e. one opening constitutes an elongated slot) whereby adjustment of the lateral difference between the upstream shaft members 508 is possible. Bearings 516 are provided above and below the panel 246 and the shaft members 508 are locked in place by a suitable component, such as a locking collar 518. As best seen in FIG. 20, the shaft members 508 extend only slightly below the panel 246, providing just enough length for the bearings 516 and the collars 518.

The downstream shaft members 510 likewise extend vertically through appropriate and preferably laterally adjustable openings (not specifically shown) in the plate member 506 and through the openings 277 and 278 in the horizontal panel 246. Bearings 516 are provided below the panel 246 and the shaft members 510 are locked in place by suitable components, such as locking collars 518. The downstream shaft members 510 are substantially longer than the upstream shaft members 508 and extend substantially below the locking collar 518. (See FIG. 20.) The lower distal end of the downstream shaft members 510 are secured to the tab-connecting coupling member 236 (see FIG. 1) by suitable coupling members, such as bearing blocks 519. (See FIG. 20.)

As was indicated above, the pulley unit 502 is mounted on the mounting unit 500, and specifically on upstream and downstream shaft members 508 and 510. The pulley unit 502 particularly comprises an upstream pair of pulleys 520, a downstream pair of pulleys 522, and a pair of continuous belts 524. The upstream pulleys 520 are fixedly (i.e. non-rotatably) mounted to the upper distal ends of the upstream shaft members 508 and the downstream pulleys 522 are mounted to the upper distal ends of the downstream shaft members 510.

The continuous belts 524 wrap around, and extend between, each set of axially aligned upstream/downstream pulleys 520/522. A slight channel is created between the continuous belts 524 which is aligned with the centerline of the machine 30. (See FIG. 21.) It may be noted for future reference that the belts 524 are positioned just vertically above the folding device 49. (See FIG. 20.)

The pulley unit 502 serves to translate motion from the motor unit 504 to the shaft members 508 and 510, and thus to the creasing device 48 and the connecting device 50. The motor unit 504 includes a gear motor 530, a shaft member 532, a continuous belt member 534, and a shaft-transition member 536. The gear motor 530 is mounted to the coupling shelf 244, and more particularly to the vertical side wall 248, via appropriate fasteners (not shown) extending through the elongated slots 260. The shaft-transition member 536 is mounted to a lower portion of one of the downstream shaft members 510, and the continuous belt 534 extends between the shaft member 532 and the shaft-transition member 536.

The gear motor 530 provides rotational motion to the shaft member 532 which in turn transfers the rotational motion to the shaft-transition member 536 via the continuous belt member 534. The downstream pulley 522 attached to the same downstream shaft as the shaft-transition member 536 is thus rotated in the appropriate direction, which would be counterclockwise in the illustrated embodiment. The continuous belt 524 attached to this downstream pulley 522 then transfers rotational motion to the aligned upstream pulley 520. Additionally, the motion-transferring gears 511 transfer rotational motion to the idle downstream shaft 510.

Turning now to the creasing device 48, which is shown in detail in FIG. 22, it includes crease-forming members 540 and 542 and support members 544 and 546, all of which are roughly disk-shaped. One of each of these components is non-rotatably mounted to an upstream shaft member 508 whereby rotational motion of the shaft member will result in rotational motion being transferred thereto.

The crease-forming members 540 and 542 are designed and positioned to create the desired crease in the tab portion 88 of the continuous strip 84. Thus, in the preferred embodiment, the geometry of the creasing members 540 and 542 correspond to the preferred form of the crease groove 91. More particularly, the radial edge of the crease-forming member 540 has an equilateral triangle cross-sectional shape which is about ¼ inch wide and ¼ inch deep and the radial edge of the crease-forming member 542 defines a groove of a complimentary geometry. Additionally, the crease-forming members 540 and 542 are positioned on the upstream shaft members 508 to correctly contact the tab portion 88 as it emerges from the tab-forming slot 434 of the stock-shaping assembly 34. Specifically, in the preferred embodiment, the crease-forming members 540 and 542 are positioned approximately ¾ inch from the lower end of the tab-forming slot 434. The support members 544 and 546 are mounted just above the crease-forming members 540 and 542, and serve to hold the crease-forming members in the desired vertical orientation.

Referring now additionally to FIG. 23–25, the folding device 49 is shown isolated from the other components of the tab-connecting device 36. The folding device 49 comprises a bottom wall 560, an outer side wall 562, another outer wall 564, and a central wall 566. Preferably, the bottom wall 560, and the outer side walls 562 and 564 are integrally formed, with the central wall 566 being a separate component. In any event, these walls are shaped and arranged to fold the creased tab portion 88' to form the folded tab portion 88".

In the illustrated and preferred embodiment, the bottom wall 560 projects perpendicularly from the outer side wall 562 and includes an upstream section 568, a downstream section 570, and an intermediate section 572 therebetween.

The upstream section 568 is triangular in shape (see FIG. 24) and slopes upward towards the downstream end of the folding device 49 (see FIGS. 23 and 25). The intermediate section 572 is essentially a level, rectangular extension of the base of the triangular section 568 (see FIGS. 23 and 24), while the downstream section 570 is basically a substantially thinner rectangular extension of the intermediate section 572.

The outer side wall 562 includes an upstream section 574 and a downstream section 576. The upstream section 574, which is coextensive with the upstream and triangular section 568 of the bottom wall 560, is shaped like a right trapezoid and tapers upwardly towards the downstream end of the folding device 49. (See FIG. 23.) Additionally, the upstream section 574 includes an outwardly flared upstream edge 578. The downstream section 576, which is coextensive with the downstream and intermediate sections 570 and 572 of the bottom wall 560, forms a rectangular extension of the narrower, proximate, end of the upstream section 574.

The other side wall 564 is coextensive with, and extends perpendicularly from, the edge of the downstream section 570 of the bottom wall 560. The outer side wall 564 includes an upstream section 580, which is triangular in shape and which slopes upwardly towards the downstream end of the folding device 49, and a downstream section 582 which is rectangular in shape and which extends from the base of the triangular section 580.

As was indicated above, the bottom wall 560 and the side walls 562 and 564 are preferably integrally formed. As was also indicated above, the plate member 506 forms a base for the folding device 49. Particularly, this integral collection of walls 560, 562 and 564 is attached to the plate member 506 by attachment members 588. (See FIG. 21.)

The central wall 566 is rectangular (with rounded bottom corners) in shape (see FIG. 23) and includes an outwardly flared upstream edge 584 (see FIG. 24). The wall 566 is horizontally positioned centrally between the outer side walls 562 and 564 (see FIG. 24) and vertically positioned slightly above the downstream and intermediate sections 570 and 572 of the bottom wall 560 (see FIGS. 23 and 25). Attachment members 586 and suitable brackets 588 are provided to couple the central wall 566 to the plate member 506 and position it in the desired orientation relative to the other components of the folding device 49.

The folding device 49 is dimensioned and arranged to receive the creased tab portion 88'. Specifically, the device is arranged so that the bottom edge of the central wall 566 is just slightly above the crease-forming members 540 and 542. Additionally, the dimensions of the downstream sections of the bottom wall 560 and the outer side walls 562 and 564 correspond to the dimensions of the desired folded tab portion 88".

In the preferred folding process, the upper sections of the proximate section 93 of the creased tab portion 88' will initially be received between the outer side wall 562 and the central wall 566. The flared upstream edges 578 and 584 of the outer wall 562 and the central wall 566, respectively, aid in this receipt. As the creased tab portion 88' travels downstream, the distal section 92 is gradually urged upward by the upwardly sloping geometry of the upstream triangular section 568 of the bottom wall 560. When the creased tab portion 88' reaches the intermediate level section 572 of the bottom wall 560, the distal tab section 92 will be extending perpendicularly from the proximate tab section 93. The crease groove 91 in the tab portion 88' (created previously by the creasing device 48) forms the "corner" of this perpendicular arrangement.

As the creased tab portion 88' travels further downstream, the upwardly sloped geometry of the upstream triangular section 580 of the outer side wall 564 gradually folds the distal tab section 92 over the proximate tab section 93 to form the folded tab portion 88".

Referring now to FIG. 28, the connecting device 50 is shown in detail. The device 50 includes connecting, or coining, members 592 which are positioned on the downstream shaft members 510 to receive the folded tab portion 88" as it exits the folding device 49. In the illustrated embodiment, this position is immediately below the downstream pulleys 522. Coupling members 594 are provided to lock the coining members 592 in the desired position on the shaft members 510.

The coining members 592 each include radially aligned, but axially offset teeth 596 which are designed to form the preferred coining pattern 94 in the folded tab portion 88". Thus, the connecting device 50 forms the continuous strip 84'" having the connected tab portion 88'".

Referring now additionally to FIGS. 27 and 28, the strip-cutting assembly 38 is shown along with the relevant sections of the machine frame assembly 31. As was explained above, the strip-cutting assembly 38 is preferably used to cut the continuous strip 84'" at a desired length to form a cushioning product 100. In this manner, the length of the cushioning product 100 may be varied depending on the intended application. The construction and operation of the strip-cutting assembly 38 is not essential to the present invention, and the following explanation is for exemplary purposes only. (The described cutting assembly is set forth in more detail in U.S. Pat. No. 4,699,609.)

The illustrated strip-cutting assembly 38 includes a stationary blade 600, a swinging blade 602, and a cantilevered mounting platform 604. The stationary blade 600 and the swinging blade 602 are positioned to coact with each other to cut the continuous strip 84'" in a guillotine fashion. To this end, the stationary blade 600 is positioned just above the machine outlet opening 292 via an inverted U-shaped bracket 610 straddling the outlet opening 292 and resting on the mounting platform 604. The swinging blade 602 is fixedly attached to a rotatable shaft 612 extending outwardly from the downstream end 202 of the frame assembly 31. The shaft 612 is supported by a U-shaped (in plan) bracket 614 (see FIG. 27) mounted on the platform 604 adjacent to the machine outlet 292 (see FIG. 28) and extends through the downstream end 202 of the frame assembly 31 (see FIG. 27.)

The illustrated strip-cutting assembly 38 also includes an activating unit 616 which includes an electric solenoid 620 pivotally mounted (i.e., by a clevis connection) to the coupling member 236 of the frame assembly 31. The solenoid 620 shown in the drawings is a single acting spring-loaded solenoid, having a plunger 622 movably coupled to a lever 624. The lever 624 is in turn connected to the shaft 612 so that upon inward or retracting movement of the plunger 622, the shaft 612 is cased to rotate with respect to the bracket 614. Because the swinging blade 602 is fixedly attached to the rotatable shaft 612, upon inward movement of the plunger 622, the swinging blade 602 is caused to pivot upwardly into a coacting cutting relationship with the stationary cutting blade 600. A bumper unit 630 including a bumper stop 632 may be provided to limit the upward pivotal movement of the swinging blade 602.

Referring now to FIGS. 29 and 30A–30E, another embodiment of cushioning conversion machine according to the invention is designated generally by reference numeral 700. The machine 700 includes a frame assembly 702 which supports a stock-preparing assembly 704, a stock-shaping assembly 706, tab-connecting assemblies 708, and a strip-cutting assembly 710. These assemblies of the machine 700, like the major assemblies of machine 30 (FIGS. 1–28), cooperate to convert stock material into a cushioning product according to the present invention.

The stock-preparing assembly 704 includes a supplying device 712, an outer separating device 713, an inner layer embossing device 714, and an inner separating device 716. The stock-shaping assembly 706 includes an outer shaping device 718, an inner shaping device 720, an inner pulling device 722 and an outer pulling device 724. The tab-connecting assemblies 708 each include a pulling device 726, a creasing device 728, a folding device 730, and a connecting device 732.

The machine 700 is designed to convert multi-layer sheet-like stock material into a cushioning product. The roles the conversion components play in the creation of such a cushioning product is best illustrated in FIGS. 37 and 38 and the following FIGS. 39–49 in which a preferred method of converting stock material into a cushioning product is schematically illustrated, while FIGS. 29–36 show details of the machine's preferred construction. The steps of this conversion method may be viewed as including stock-preparation steps, stock-shaping steps, tab-connecting steps, and strip-cutting steps. The following references to "upstream" and "downstream" are again used in relation to the direction of flow of the stock material and the continuous strip through the machine 700 during the conversion process. In FIGS. 37 and 38, this direction of flow is from left to right.

With reference to FIG. 38, the stock-preparation steps of the conversion method begin with providing a stock material 733 which includes a plurality of layers. Preferably, the stock material 733 comprises three or more superimposed plies or layers, namely two outer plies or layers $P_o$, and one or more inner layers $P_i$. These layers are each preferably about 15 inches wide, comprised of biodegradable, recyclable and reusable thirty-pound Kraft paper, and supplied as a roll 734 (FIG. 29). In the machine 700, the roll 734 of multi-ply stock material is supported on a cart 736 provided as part of the supplying device 712. The cart 736 can be conveniently rolled beneath a cantilevered upstream portion of the frame assembly 702 in which the stock-preparing assembly 704 is mounted, as shown in FIG. 29.

The stock material 733 passes from the stock roll 734 over an entry roller 738 to the outer separating device 713. The outer separating device includes a pair of vertically spaced apart separator members 739. The separator members have trained thereover respective outer layers $P_o$ which separate from the inner layers $P_i$ that pass to the inner layer embossing device 714.

The inner layer embossing device 714 functions to emboss the inner layers $P_i$ whereby the inner plies are transformed into embossed inner plies $P'_i$. In the preferred embodiment, the embossing pattern, depicted in FIG. 39, comprises a series of equilateral triangular grooves or pleats 744 which are approximately 3/16 inch high and an approximately one inch flat section 746. This embossing pattern is believed to enhance the cushioning characteristics of the resulting cushioning product, and the geometry of the embossing pattern may be altered if necessary, or desirable, for certain cushioning requirements.

The embossed inner layers $P'_i$ are then separated by the inner separating device 716. The inner separating device includes a plurality of vertically spaced apart separator members 748 which are interposed between relatively adjacent embossed inner layers $P'_i$. Typically, the number of separator members that are needed will be one less than the number of inner layers. In the illustrated preferred embodiment, there are six inner layers being separated by five separator members. As will be appreciated, the number of inner layers may be varied as desired for varying the cushioning characteristics of the end cushioning product.

Figure 40:
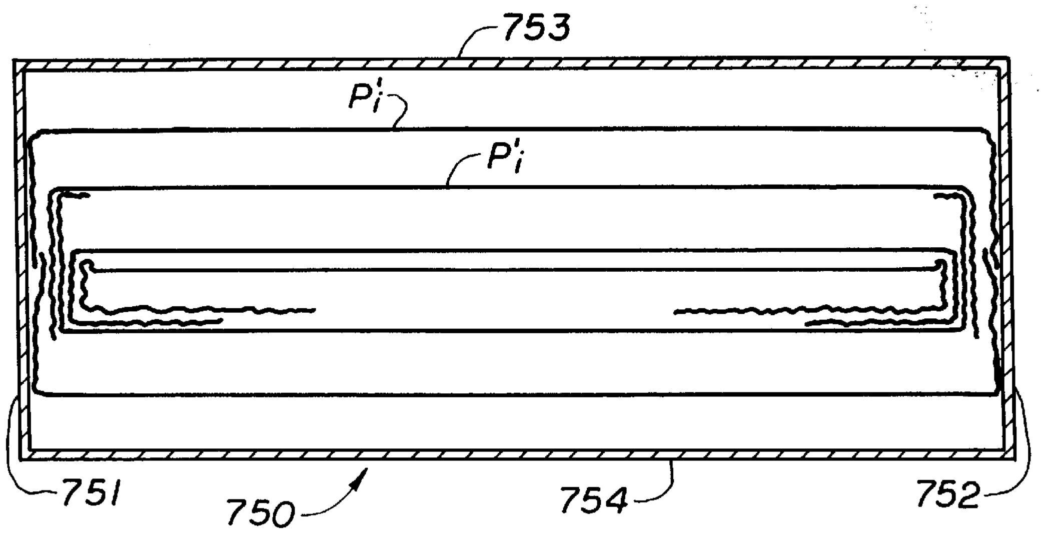
Figure 41:
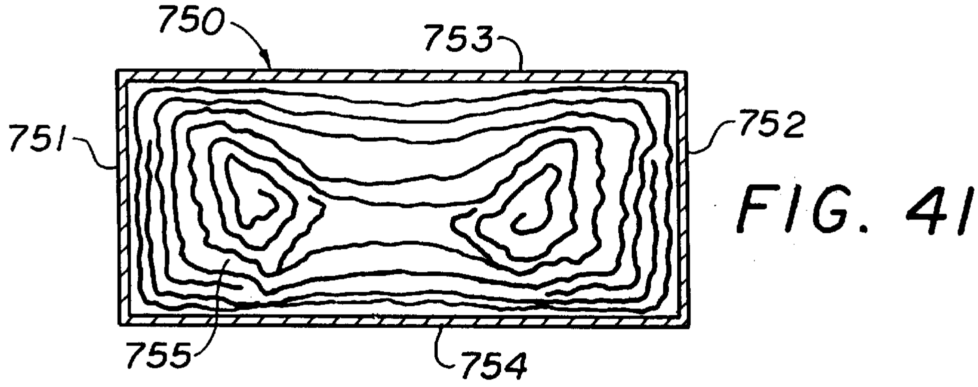

The separated embossed inner layers $P'_i$ are fed into a funnel-like (converging) chute 750 having converging side walls 751 and 752 and converging top and bottom walls 753 and 754 (FIGS. 40 and 41). In the chute 750, the embossed inner layers are folded onto themselves to form a crumpled, relatively low density pre-form stuffing or cushioning strip 755 of generally rectangular cross-section near the exit end of the chute, as shown in FIG. 41. Although this pre-form stuffing 755 is shown as having relatively uniform coils and folded edge portions, in the finished product these coils and edge portions would usually be much more random.

Figure 42:
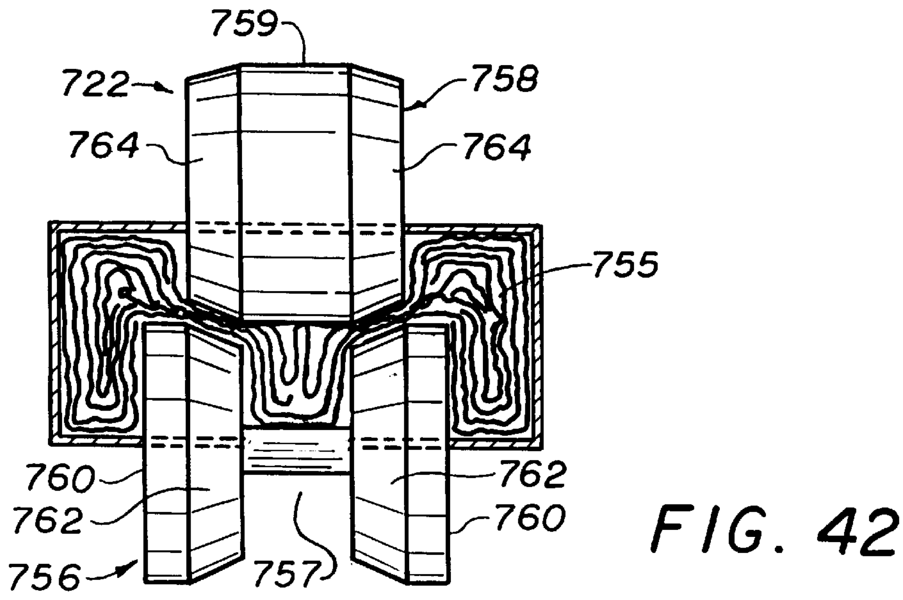

The pre-form stuffing 755, and thus the embossed inner layers $P'_i$, are pulled through the chute 750 by the inner pulling device 722. As shown in FIG. 42, the inner pulling device includes a pair of cooperating rotatably driven rollers, one 756 of which includes a central annular recess or groove 757 and the other 758 a central annular raised portion or rib 759 which projects into the groove 757. In the illustrated embodiment, the grooved roller 756 is formed by two axially spaced apart roller sections 760 having axially inner sides thereof tapered to match the tapered sides 764 of the rib on the other roller 758. Preferably the base of the groove is substantially deepened to loosely accommodate therein the pre-shaped stuffing 755 with laterally adjacent portions thereof being pinched between the correspondingly tapered groove and rib surfaces 762 and 764. By reason of such cooperating groove and rib configuration, the rollers cooperate to engage the pre-shaped stuffing for pulling the same through the chute and pushing it into a post-shaping chute 768 for final shaping. Also, the rollers form therebetween a generally U-shape passage for the pre-form stuffing and in conjunction therewith cooperate to pull the stuffing (or the plies forming the stuffing) towards the center. The cooperating rib and groove may also function to offset a central portion of the pre-shaped cushioning strip relative to adjacent side portions of the strip, thereby to produce interlocking structure restricting lateral shifting movement of adjacent layers in the region of the offset.

Figure 43:
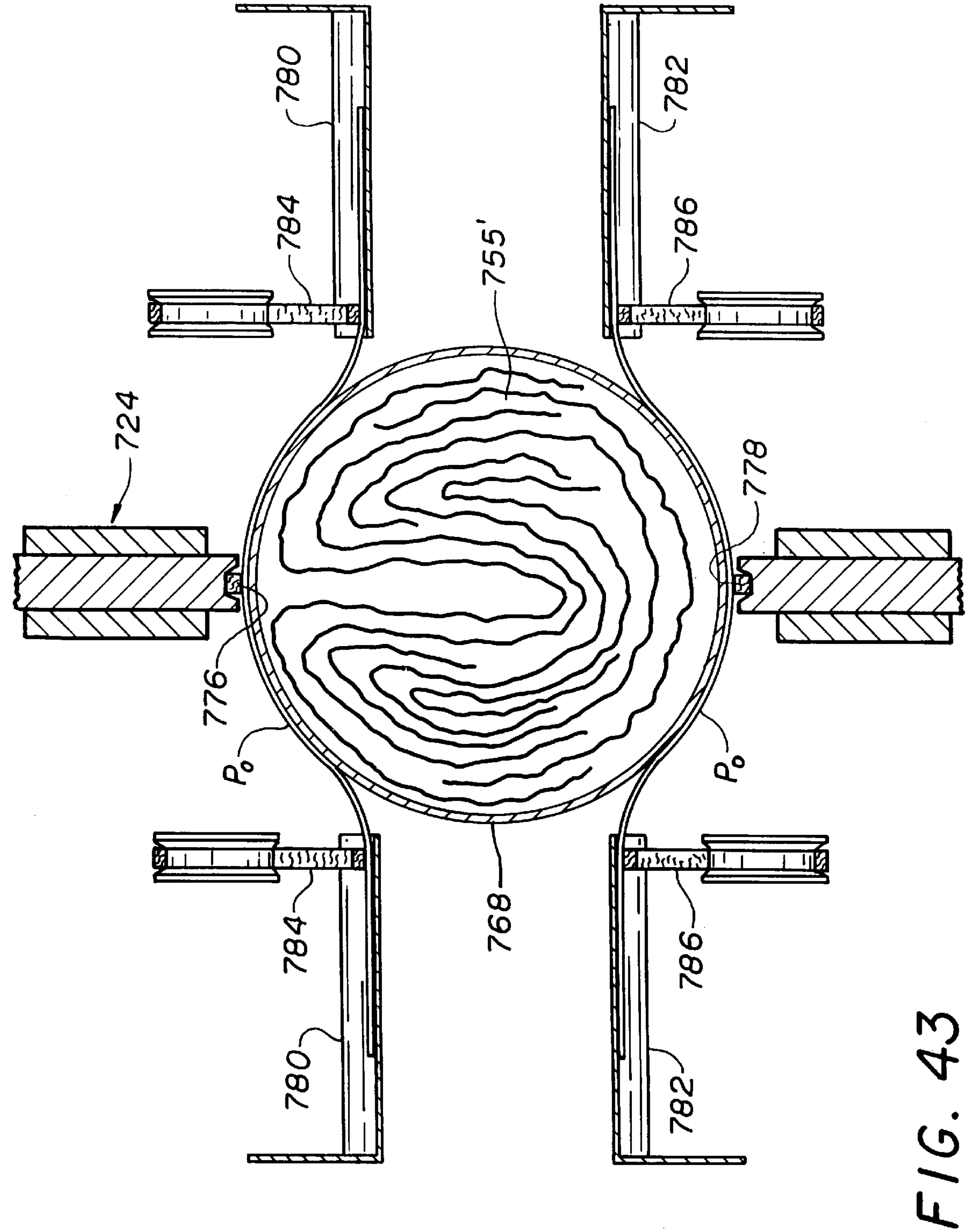

As the pre-shaped stuffing is pushed into the chute 768 it is free to expand and to fill and assume the cross-sectional shape of the chute which in the illustrated embodiment is circular as shown in FIG. 43. The expanded stuffing 755' is pushed along the chute by stuffing successively pushed into the chute by the inner pulling device 722. At the outlet or downstream end of the chute, the expanded stuffing 755' is fed between the outer layers $P_o$ which are shaped and connected at outer edge portions thereof to form a casing that contains the cushioning or stuffing 755' as further described below.

While the inner layer or layers $P_i$ are being embossed, separated and pre-shaped into a strip of stuffing or cushioning 755, the outer layers $P_o$, as shown in FIG. 38, are passed along respective serpentine paths each defined by a horizontal array of rollers 770–772 and then over a guide roller 773 for feeding the outer layers onto diametrically opposite sides of the post-shaping tube 768 substantially tangentially with respective opposite sides of the tube. As shown in FIG. 43, the center of the outer layers are received between the tube and respective top and bottom axially moving belts 776 and 778 of the outer pulling device 724. The belt has a transfer flight which extends parallel to the axis of the post-shaping tube to advance the center of the outer layer along the outer surface of the tube diametrically opposite the center of the other outer layer as shown in FIG. 43. The belts 776 and 778 may be provided with a narrow V-shape projection along the length thereof for mating in a correspondingly shaped groove provided in the chute 768 along the length thereof to facilitate guiding of the outer layers along the chute, i.e., to maintain the outer layers in contact with the chute along their centerlines.

Figure 44:
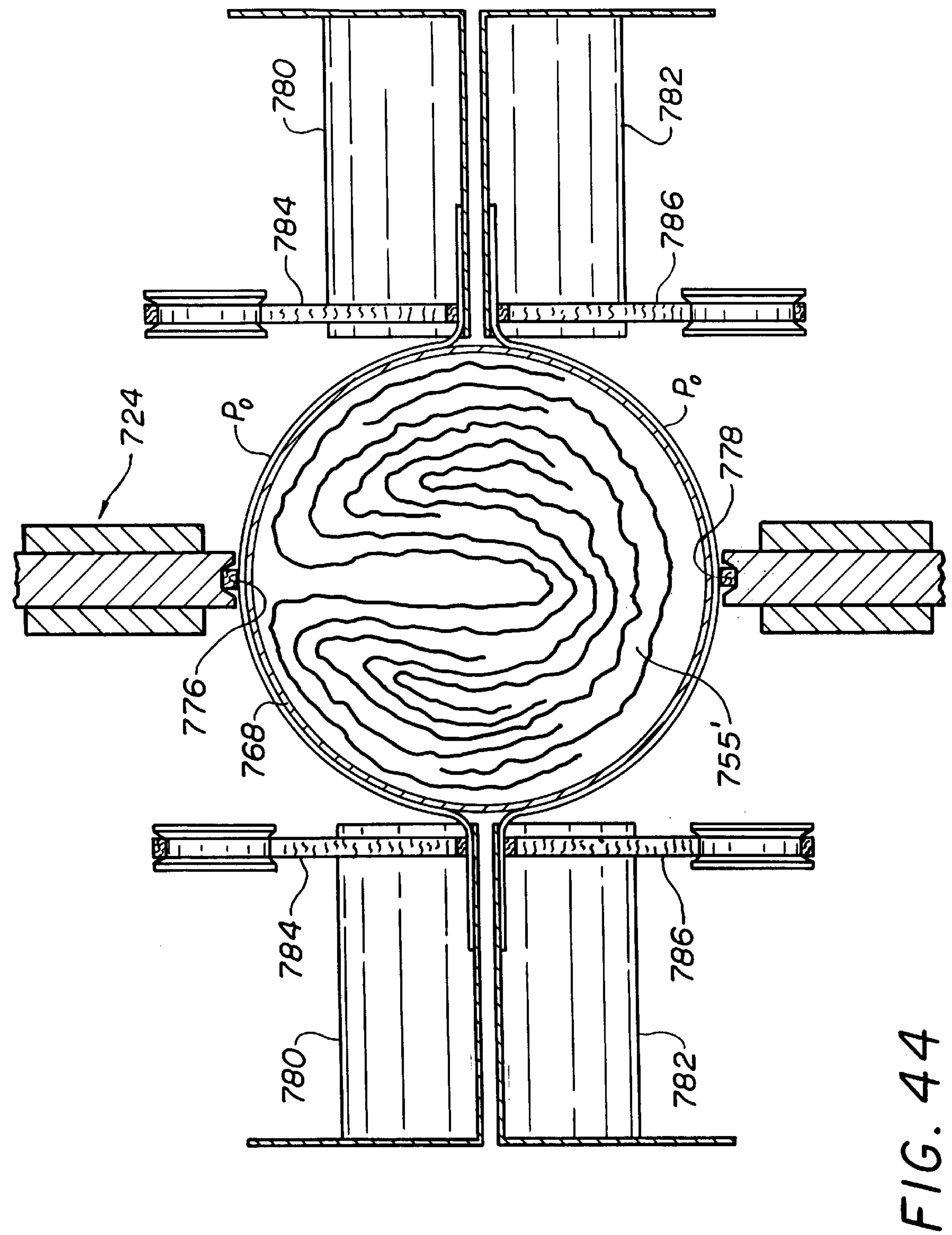
Figure 45A:
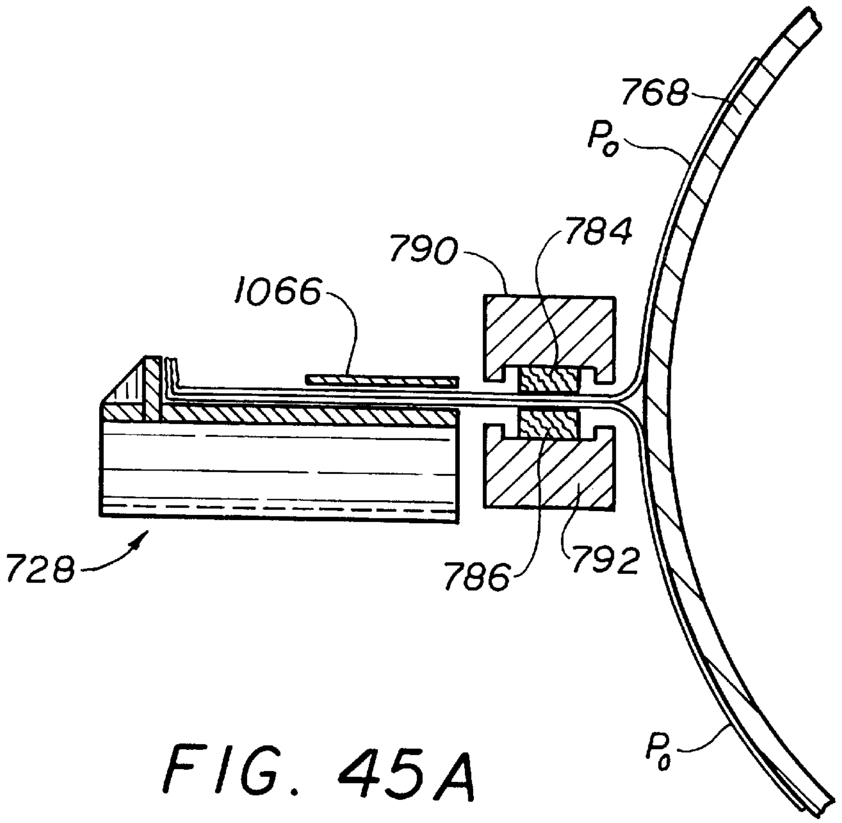

Side portions of the outer layers $P_o$ are received between respective inclined top and bottom guides 780 and 782 and correspondingly inclined flights of transfer belts 784 and 786. The moving transfer belts pinch the outer layers against the guides for fictionally engaging and advancing the side portions of the outer layers along with the center of the outer layers which is being advanced by the center transfer belts 776 and 778 that are synchronously driven with the outer belts 784 and 786 in the manner hereinafter described (or by other suitable means). The guides 780 and 782 at each side of the tube 768 converge towards one another to bring the laterally outer edge portions of the outer layers together as shown in FIG. 44. At the downstream ends of the guides, the laterally outer side portions of the outer layers are brought together and advanced between axially extending flights of the moving belts as shown in FIG. 45A. The axially extending flights of the belts 784 and 786 are respectively supported by guides 790 and 792 which pinch the belts together with the side portions of the outer layers sandwiched therebetween.

Figure 45B:
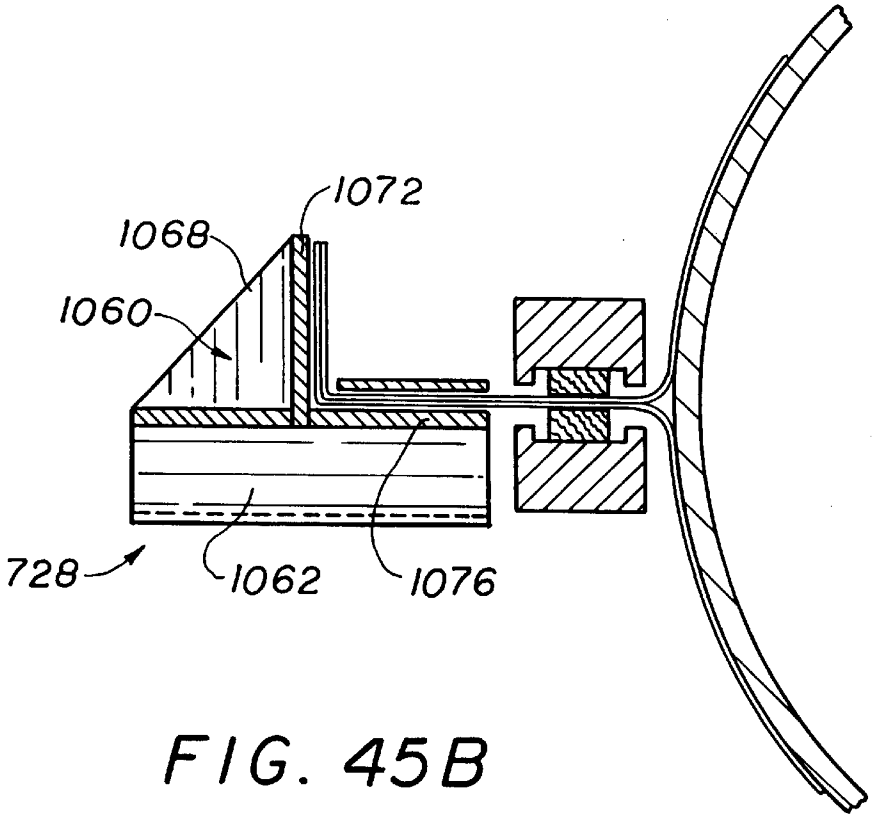
Figure 45C:
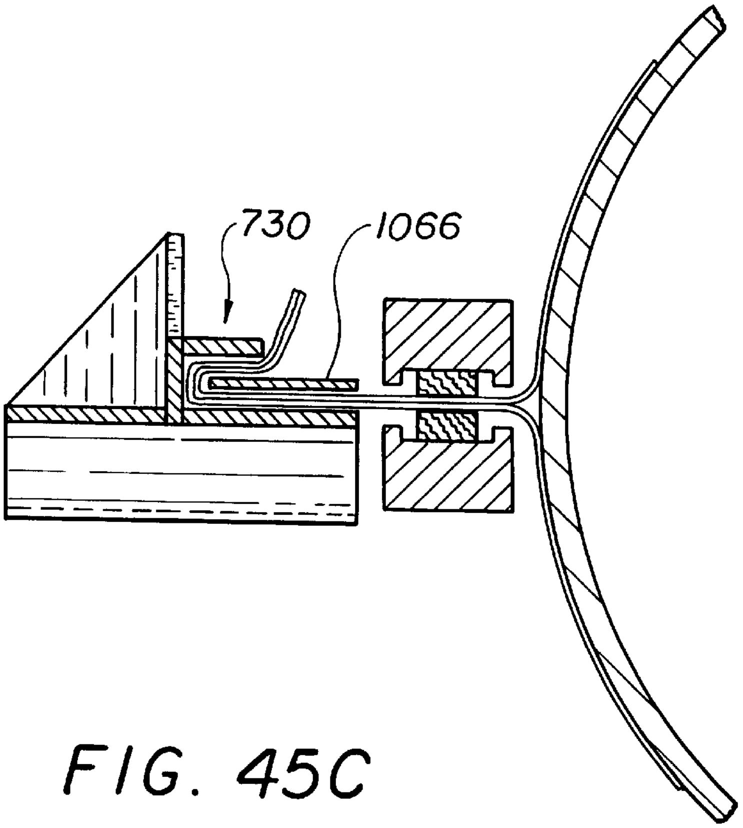
Figure 45D:
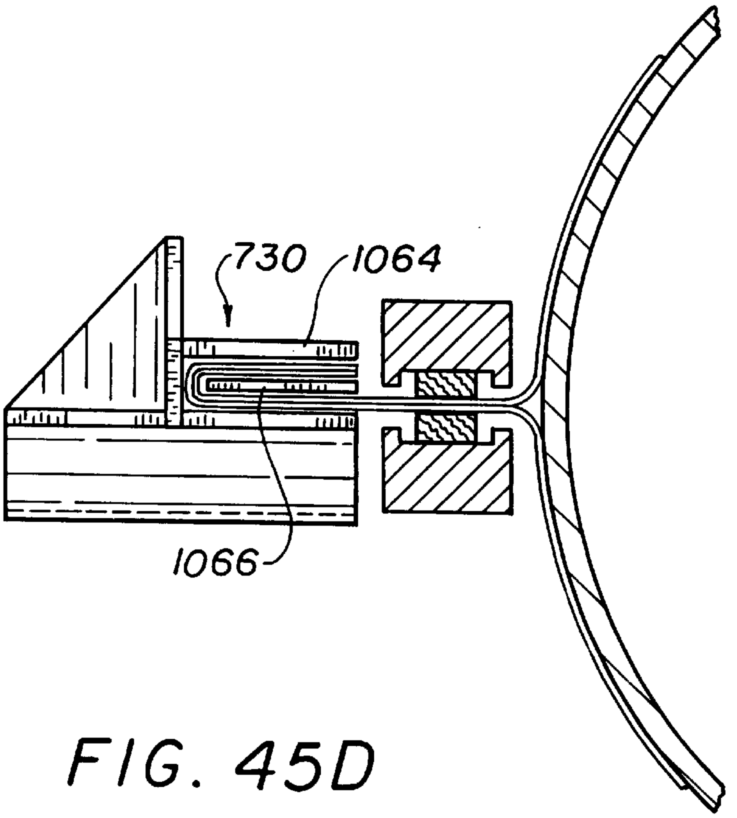

As also shown in FIGS. 45A and 45B, the laterally outer edge portions of the outer layers projecting beyond the belts 784 and 786 at each side of the chute 768 are creased by the creasing device 728 and then folded back on itself by the folding device 730 as shown in FIGS. 45C and 45D. The folded edge or tab portions are then connected together by the connecting device 732 (FIG. 38) which in illustrated preferred embodiment, coins the tab portions and perforates them to positively interlock the outer layers together at the tab portions, as schematically depicted in FIGS. 46 and 47.

The folded tab portion, preferably having a width in the range of about 1 inch to about 2 inches and more preferably about 1½ inch, is coined to form a continuous connected tab portion 793. Thus, the tab portion includes a coining pattern that includes a series of openings 794 in the tab's distal section which mate with indentations 795' in the tab's proximate section; and a series of openings 794' in the tab's proximate section which mate with indentations 795' in the tab's distal section. In the preferred embodiment this connecting step is performed by the connecting device 732.

In the illustrated manner, the outer layers $P_o$ have side portions thereof brought together and connected thereby to form an outer casing C for the stuffing 755' which is being pushed through the interior of the tube by the inner pulling device 722. At the exit end of the tube, the outer layers have been connected together to form the casing that then encloses the interior expanded stuffing as shown in FIG. 48, thereby forming a low density cushioning strip 796 that may be cut into sections 798, e.g., pads, of desired length, for use as a cushioning product as shown in FIG. 49. In relative relation to each other, the pillow-like portion 799 forms the major part of the continuous strip and is substantially larger than the tab portions. Preferably, the width of the pillow-like portion is at least twice as great as the width of the tab portions, more preferably at least three times as great, and even more preferably at least five times as great. The diameter of the cushioning strip (not including the connected tabs) preferably is in the range of about 4 inches to about 12 inches and more preferably in the range of about 6 inches to about 8 inches. In the case of a noncircular casing, the cushioning strip (not including the connected tabs) preferably has a cross-sectional area between about 10 square inches to about 115 square inches and more preferably about 25 square inches to about 50 square inches.

Thus, the cushioning product 798 according to the present invention is comprised of a stock material including at least two outer layers and one or more inner layers. The inner layer or layers of the stock material are deformed as by pleating and crumpling to form a low density stuffing or cushioning that is contained in a casing formed by the outer layers that are connected by tab portions which project from the central pillow-like portion. Preferably, the stock material comprises two, three, four, five, six or more inner layers and two outer layers, and each of the layers is 15 inches wide, biodegradable, recyclable and reusable thirty-pound Kraft paper. The cushioning product preferably has a density in the range of about 0.30–0.50 pounds/foot$^3$ and more preferably has a density approximately equal to about 0.35–0.40 pounds/foot$^3$. Although the casing is preferably formed by two layers, it may be formed by more layers or even by one layer. In the latter case, the single outer layer may be shaped all the way around the forming tube with its edge portions being brought together and connected.

As was indicated above, in the preferred embodiment the steps of the conversion method are performed by the stock-preparing assembly, and stock-shaping assembly, the tab-connecting assembly, and the strip-cutting assembly. Also, as was indicated above, these conversion assemblies are all mounted on the frame assembly. Each of these assemblies is discussed separately below.

Referring now to FIG. 29, the frame assembly 702 forms the structural skeleton of the machine 700. The frame assembly 702 comprises a table section 800, a main frame section 802 supported on the table section 800, and a cantilevered upstream section 804 secured to the upstream end of the main frame section 802 in cantilever-like fashion. As shown in FIGS. 30A–30E, the main frame section 802 comprises a pair of inner side frame members 806 and 808 and a pair of outer side frame members 810 and 812. The inner and outer side frame members are all secured at their downstream ends to a downstream or rear frame member 814. The side frame members and rear frame member preferably are all in the form of plates with the rear frame plate spanning the downstream ends of the side frame plates. The inner and outer side frame members at each side of the frame are further interconnected by bottom frame members 816 and 818. The bottom frame members preferably are in the form of plates which together with the respective inner and outer side frame plates form U-shape composite frame structures that are secured at the bottom plates to the top of the table section 800. The outer side frame members 810 and 812 are further connected and maintained in spaced parallel relationship to the inner side frame members 806 and 808, respectively, by brackets 820 and 822.

The table section 800 may be of any suitable construction. In the illustrated embodiment, the table frame section comprises four upright legs 824 arranged in a rectangular configuration and interconnected by longitudinally and transversely extending frame components 826 to provide a stable support for the main frame section 802 and also to elevate the cantilevered frame section 804 at a height permitting a stock cart 736 to be rolled therebeneath as illustrated in FIG. 29. Also, it is desirable to locate the main and cantilevered frame sections at a convenient or desired dispensing height.

As shown in FIGS. 30A–30D and 31A–31D, the cantilevered frame section 804 comprises a pair of side frame members 830 and 832. The side frame members 830 and 832 are secured at their downstream ends by a plurality of fasteners 834 to the upstream ends of the side frame members 806 and 808, respectively, and essentially form longitudinal continuations thereof. If desired, the side frame members 830 and 832 may be formed as a single piece with the respective inner side frame members 806 and 808, if desired, but generally it is preferred to form the side frame members from separate plates to provide for convenient removal of the cantilevered frame section 804 from the main frame section 802 as may be desired for maintenance, repair or other purposes. As will be appreciated, the cantilevered frame section 804 is removable as a unit from the main frame section 802 by removing the fasteners 834 and by disconnecting a drive component for the embossing device. The side frame members 830 and 832 of the cantilevered frame section 804 are interconnected and maintained in space parallel relationship by a plurality of cross frame members generally designated by reference numeral 836, as well as by the side frame members 806 and 808 of the main frame section when connected thereto.

The side frame members 806 and 808 define therebetween an inner machine cavity 838 in which certain conversion assemblies, namely the outer shaping device 718 and tab-connecting assemblies 708, are located. Similarly, the side frame members 830 and 832 define an inner machine cavity 840, essentially forming a continuation of the inner machine cavity 838 of the main frame section. The inner machine cavity of the cantilevered frame section houses certain conversion assemblies, namely the stock-preparing assembly 704 and inner shaping device 720.

The inner side members 806 and 808 further define with the outer side members 810 and 812 respective outer cavities 842 and 844 which house therein various drive components of the machine. The drive components are hereinafter described in greater detail, along with other frame components which coordinate with the conversion assemblies of the machine to couple them to the abovedescribed primary structural members.

Although the illustrated embodiment reflects the preferred orientation of the machine 700, other orientations are possible with, and contemplated by, the present invention. Consequently, the use of specific modifiers (such as top, bottom, lateral, vertical and/or horizontal) and dimensional definitions (such as height, width and/or length) do not reflect any necessity to strictly adhere to the illustrated orientation. Instead these terms should be interpreted as referring to the arrangement of the frame assembly 702 relative to the other components of the machine 700. It should be noted for future reference that similar definitions will be applied when explaining the other assemblies of the machine 700, and the machine 700 itself, and these definitions should be similarly interpreted, regardless of the orientation of an actual working embodiment.

Referring now additionally to FIGS. 29, 30A–30B, 31A and 31B and 32A, the stock-preparing assembly 704 is shown in detail. As was indicated above, the stock-preparing assembly includes a supplying device 712, and outer separating device 713, an embossing device 714, and an inner separating device 716. These stock-preparing devices coordinate to prepare the stock material for the later stages of the conversion process. To this end, they are positioned adjacent the upstream end of the frame assembly.

In the illustrated manner, the supplying device 712, the outer separating device 713, the embossing device 714, and the inner separating device 716 may be mounted to the side frame members 830 and 832. These stock-preparing devices are strategically arranged so that the stock material smoothly travels from the supplying device to the embossing device and outer separating device, so that the embossed inner layers smoothly travel from the embossing device to the inner separating device, and the outer layers smoothly travel to the array of rollers 770–772.

Turning now to the supplying device 712 (FIG. 29), it includes a supply rod 850 which is cradled in open slots formed by U-shape members 852 on the horizontal side frame members 854 of the cart 736. The supply rod 310 is sized to extend relatively loosely through a hollow cylindrical tube of the stock material roll 734. In this manner, as the stock material is pulled through the cushioning conversion machine, the tube will freely rotate thereby dispensing stock material. A pin (not shown) may be provided through one or both ends of the supply rod to limit or prevent rotation of the rod itself. Another form of stock material holder is described in U.S. Pat. No. 5,749,539.

The supplying device further includes the constant-entry bar 738 which is rotatably mounted between the side plates 830 and 832 at the upstream end thereof. The constant-entry bar provides a non-varying point of entry for the stock material into the embossing device 714 and to the outer layer separator members 739 which are secured between the side plates 830 and 832, regardless of the diameter or exact position of the roll of the stock material. Thus, when a different diameter roll is used and/or as dispensation of the stock material from the roll decreases its diameter, the point of entry of the stock material into the embossing device and to the separator members 739 remains constant. This consistency is believed to facilitate uniform production of the cushioning product. Details of a “roller member” or a “bar member” similar to the constant-entry bar are set forth in U.S. Pat. No. 4,750,896.

The primary function of the inner layer embossing device 714 is to imprint the desired embossing pattern onto the inner layers of the stock material. To this end, the embossing device includes a top embosser roller 856 and a bottom embosser roller 858 which are concentrically attached to respective shafts 860 and 862 in a vertically aligned manner and between which the inner layers travel. The design of the embosser rollers understandably corresponds to the desired embossing pattern. Consequently, in the preferred embodiment, the embosser rollers each have a two inch outer diameter and a 1⅝ inch inner diameter. The embosser rollers each include sixteen teeth and an “untoothed” portion equivalent to two teeth.

Figure 31A:
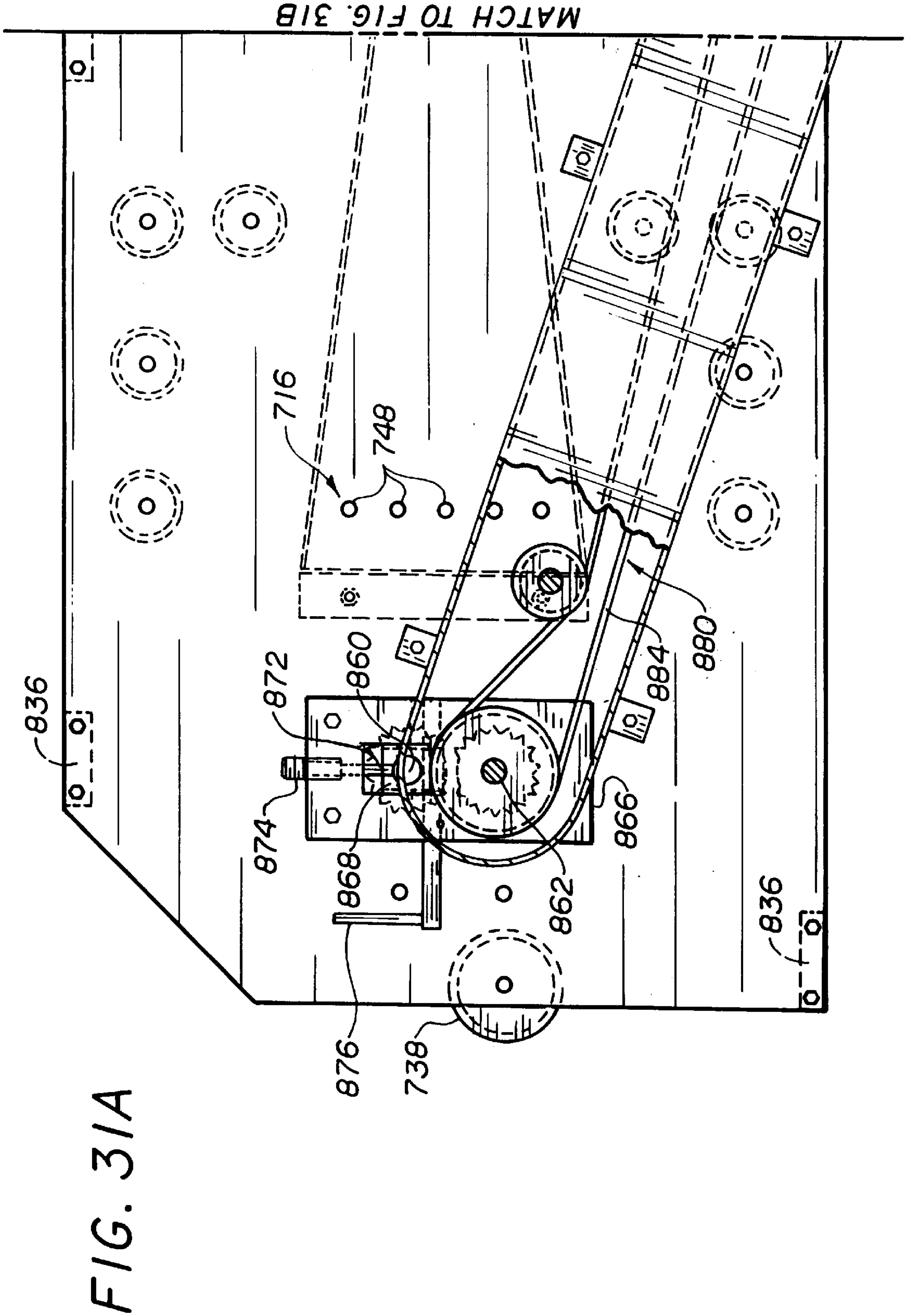
Figure 31B:
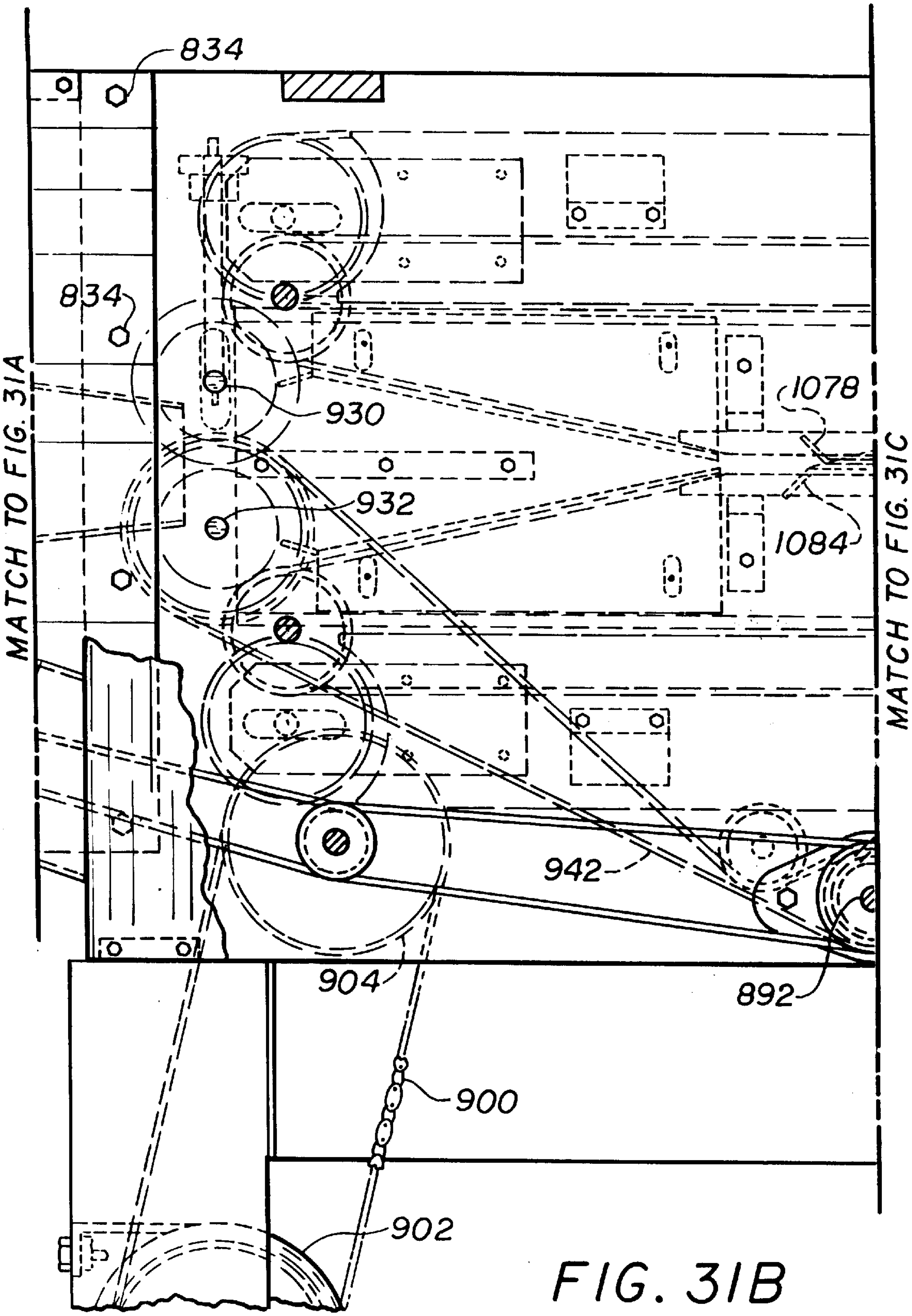

The shafts 860 and 862 of the embosser rollers 856 and 858 are mounted at the ends thereof to the side frame members 830 and 832 by a pair of embosser-mounting blocks 866. These embosser-mounting blocks 866 are secured to the side frame members by appropriate fasteners. The embosser-mounting blocks are positioned between the outer and inner layer separating devices 713 and 716 as shown in FIGS. 31A and 32A. While the axis of the shaft 862 is fixed, the other shaft 860 has the ends thereof supported in slide blocks 868. The slide blocks 868 are movable in slots in the mounting blocks 866 for guided movement towards and away from the shaft 862. Springs 872 are provided to resiliently bias the slide blocks and thus the shaft 860 towards the fixed shaft 862, and set screws 874 are adjustable to vary the biasing force and thus the pinch pressure applied by the rollers 856 and 858 to the inner layers passing therebetween. A lever actuated cam mechanism 876 is provided on each mounting block for radially retracting the slide blocks 868 away from the fixed shaft 862 thereby to permit easy threading of the inner layers between the rollers 856 and 858 during loading of the stock material in the machine.

The embossing device 714 further includes an embosser-drive assembly 880 which rotates the bottom embosser roller 858 in a first direction to thereby rotate the top embosser roller 856 in the opposite direction. The rotational direction of the respective embosser rollers is chosen so that the stock material travels between the rollers, and the embossed stock material is urged towards the inner separating device 716. In FIGS. 31A and 32A, this direction would be counterclockwise for the upper embosser roller and clockwise for the lower embosser roller.

With particular reference to FIGS. 30B, 30C and 30D, the embosser-drive assembly 880 includes a sprocket/pulley 882 that is coupled by an embosser-drive belt 884 to an idler shaft 888 that in turn is connected by drive belt 890 to a main drive shaft 892 of the machine 700. The idler shaft 888 is mounted between side frame members 808 and 812 on the same side of the machine as the embosser-drive assembly 880, whereas the main drive shaft extends between and is mounted to the side frame members 806, 808, 810 and 812. A drive belt 896 couples the main drive shaft to a drive input shaft 898 which in turn is coupled by a drive chain 900 to a drive motor 902 mounted in the table frame section 800. Preferably, the sprocket 904, over which the drive chain 900 is trained, is coupled to the drive input shaft 898 by a clutch 906. During normal operation of the machine, the motor may be continuously operated and the clutch engaged to feed stock material through the machine for conversion and disengaged to stop feeding of stock material.

It is noted here, in general, that the above and below described shafts of the machine's overall drive mechanism are rotatably mounted to and between the side plates of the frame assembly by suitable bearings. Also, timing belts and pulleys such as those having meshing ribs and grooves (or chains and sprockets) preferably are employed to ensure synchronized operation of the various drive components of the machine.

As was explained above, the embossed inner layers $P'_i$ travel from the embossing device 714 to the inner separating device 716. The separating device 716 performs the function of separating the embossed inner layers from each other prior to their passage to or immediately upon entry into the inner shaping device 720. The number of separating members 748, namely five, corresponds to one less than the number of inner layers of the stock material, and thus this number may be increased/decreased depending on the make-up of the stock material. This "pre-separation" is believed to improve the loft of the cushioning product. The separating members 748 essentially consist of cylindrical rods which may be rotatably or non-rotatably mounted between the side frame members 830 and 832, or have rotatable sheaths provided thereon.

The separating members 739 of the outer separating device 713 also consist of cylindrical rods which may be rotatably or non-rotatably mounted between the side frame members 830 and 832 (or provided with rotatable sheaths. The separating members separate the outer layers $P_o$ from the inner plies prior to passage of the latter to the embossing device 714. From the separating member 739 the outer layers move away from one another symmetrically with respect to a center plane through the embossing device and chute 750 to the rollers 770–772 for travel along a serpentine path to facilitate tracking through the machine. The outer layers last pass over guide rollers 773 which positions and feeds the outer layers tangentially onto diametrically opposite sides of the shaping tube 768 for shaping of the outer layers.

Thus, when the machine 700 is used to convert the sheet-like stock material into the cushioning product, the stock material is dispensed from the supplying device 712 with the inner layers traveling to the embossing device and the outer layers along an outer serpentine path at opposite sides of the inner layers as the latter are being embossed and then shaped in the chute 750 of the stock shaping assembly 706. The embossing device embosses the stock material to form the embossed stock material. The embossed stock material is then separated by the separating device to form prepared stock material. The prepared stock material then travels to the stock-shaping assembly which shapes the prepared stock material into the continuous strip of stuffing while the outer layer are fed to the outside of the shaping tube 768 for forming of the casing that surrounds the stuffing.

With reference to FIG. 29, the stock-shaping assembly 706 includes the outer shaping device 718 and the inner shaping device 720. These devices coordinate to shape the prepared stock material into the continuous strip. More particularly, the outer shaping device forms the outer casing of the pillow-like portion while the inner shaping device forms the inner stuffing of the pillow-like portion.

As shown in FIGS. 30A–30D, 32A and 32B, the inner shaping device 720 includes the funnel or chute 750 which is suitably mounted between the side frame members 830 and 832 by suitable means, such as by using fasteners or other means to secure side flanges 914 at the wider end of the chute to the side frame members. The chute preferably is rectangular in cross-section with the cross-sectional area progressively decreasing going from the upstream end to the downstream end of the chute by reason of the converging side walls and converging top and bottom walls. At its upstream or entry end, the chute preferably has a width at least equal and more preferably closely corresponding to the width of the stock material, whereas the height preferably is less than one half and greater than one quarter the width of the chute. Also, the side walls 751 and 752 preferably are inclined to the axis of the chute at an angle greater than the top and bottom walls 753 and 754. Although the illustrated converging chute is preferred, it will be appreciated that the shape of the chute may be varied as deemed desirable for a particular application.

The inlet of the converging chute is defined by an inlet edge 918 (FIG. 30B) and its outlet is defined by an outlet edge 920 (FIG. 30C). The inlet and the outlet are coaxial with one another and with the center axis through the machine. In the preferred embodiment, the inlet is approximately 15–16 inches wide and approximately 6 inches high, whereas the outlet is approximately 5.5 inches wide and approximately 2.5 inches high, with the chute having an overall length of approximately 13 inches.

The converging chute operates to inwardly fold the embossed inner layers onto themselves and one another, as by rolling or otherwise, to form the low density stuffing for the pillow-like portion of the continuous strip. As above indicated, in the preferred method of converting the sheet-like stock material into the cushioning product, six layers of the prepared sheet-like stock material are used. However, this method may be modified if necessary or desired for certain applications. For example, the number of "stuffing" layers could be increased or decreased to alter the density of the pillow-like portion. These and other modifications are possible with, and contemplated by, the present invention.

The converging chute directs the stuffing material into the nip of the rollers 756 and 758 of the inner pulling device 722. To this end, the exit of the chute is recessed at 924 as shown in FIGS. 30C and 30D to receive the upstream portions of the rollers 756 and 758 to ensure capture of the stuffing between the rollers. As above discussed, the rollers cooperate to engage the pre-shaped stuffing for pulling the same through the chute and pushing it into a post-shaping chute 768 for final shaping. Also, the rollers form therebetween a generally U-shape passage for the pre-form stuffing and in conjunction therewith cooperate to pull the stuffing (or the plies forming the stuffing) towards the center. The cooperating rib and groove may also function to offset a central portion of the pre-shaped cushioning strip relative to adjacent side portions of the strip, thereby to produce interlocking structure restricting lateral shifting movement of adjacent layers in the region of the offset.

As the pre-shaped stuffing is pushed into the post-shaping chute 768 it is free to expand and to fill and assume the cross-sectional shape of the chute which in the illustrated embodiment is circular. The expanded stuffing 755' is pushed along the chute by stuffing successively pushed into the chute by the inner pulling device 722. At the outlet or downstream end of the chute, the expanded stuffing 755' is fed between the outer layers $P_o$ which are shaped and connected at outer edge portions thereof to form a casing that contains the cushioning or stuffing 755', as was above described.

As shown in FIGS. 30C, 30D, 31C, 31D, and 33, the rollers 756 and 758 are mounted on respective shafts 930 and 932 which extend between and are mounted to the side frame members 806 and 808. More particularly, the grooved roller 756 is keyed to the shaft 932 for rotation therewith, and the shaft 932 is rotatably supported by bearings secured to the side frame members 806 and 808. The ribbed roller 758 is supported on but free to rotate relative to the shaft 930. The ends of the shaft extend through slots in the side frame members 806 and 808 which extend radially with respect to the axis of the grooved roller shaft 932. The ends of the shaft 930 which project outwardly of the side frame members 806 and 808 are attached to and supported by the lower ends of respective adjustment screws 936 which extend radially with respect to the groove roller shaft 932. The adjustment screws 936 are threaded in mounting blocks 938. By rotating the screws 938, the spacing between the grooved and ribbed rollers may be adjusted as needed to obtain desired performance.

The outer pulling device 724 comprises upper and lower belt assemblies 950 and 952 that respectively include the upper and lower belts 776 and 778. As shown in FIGS. 30C, 30D, 31B, 31C, 32B, 33 and 34, the belt 776 is trained around and extends between upstream and downstream pulleys 954 and 956. The lower or inner flight 958 (FIG. 32B) of the belt is guided and held by a guide 960 along and against the top side of the post-shaping chute 768, the guide extending between the pulleys 954 and 956 parallel to the axis of the post-shaping chute. As shown in FIGS. 30C and 34, the guide 960 may be secured by transverse members 962 to the side plates 806 and 808. As best seen in FIG. 34, the guide 960 is in the form of a plate or bar having grooves in the top and bottom edges thereof forming respective guide tracks 966 and 968 for the upper and lower flights of the belt 776 extending between the pulleys 954 and 956.

As shown in FIGS. 30C, 32B and 33, the upstream pulley 954 is rotatably supported by an axle pin 970. The ends of the axle pin 970 are constrained in longitudinally extending slots 972 in parallel brackets 974 secured to and projecting longitudinally from opposite sides of the guide plate 960 to form in essence a clevis. Adjustment screws 976 are provided to adjust the position of the axle forwardly or rearwardly in the slots to adjust the tension of the belt 776.

At the downstream end of the guide plate 960, the downstream pulley 958 is keyed to a shaft 978 for rotation therewith. The shaft 978 is supported at the center thereof by a pair of brackets 980 secured to and projecting longitudinally from opposite sides of the guide plate to form a clevis that laterally constrains the pulley 958. The shaft 978 also extends through and is supported at end portions thereof by the inner and outer side plates 806 and 810. Intermediate the inner and outer side plates each end portion of the shaft has keyed thereto a pulley 982 over which a drive belt 984 is trained. The drive belt 984 also is trained over another pulley 986 keyed to a shaft 988 which is drivingly coupled to the main drive shaft 892 in the hereinafter described manner.

The other or lower belt 778 is similarly supported and guided by pulleys 990 and 992 and guide 994, although with respect to the bottom of the past-shaping chute 768 in diametric opposition to the upper belt 776. The upper and lower belt assemblies 950 and 952 are essentially identical but oppositely disposed, and reference may be had to the above description of the upper belt assembly for details of the lower belt assembly.

Together, the upper and lower belts 776 and 778, moving at the same speed, engage and move the center of the outer plies along the outside of the post-shaping chute 768 in diametric opposition relative to the longitudinal axis of the chute. As the centers of the outer plies are thus advanced, the outer edge portions thereof are brought together and connected by the tab connecting assemblies 708.

Turning now to FIGS. 30C, 30D, 31C, 32B and 33–35, the tab-connecting assemblies 708 are located on opposite sides of the post-shaping chute 768 and are essentially identical but mirror images of one another. As was indicated above, each tab-connecting assembly includes a pulling device 726, a creasing device 728, a folding device 730, and a connecting device 732. These devices coordinate to connect the tab portion of the continuous strip.

Addressing initially the pulling device 726 of each tab-connecting assembly, such device comprises the aforesaid transfer belts 784 and 786. The transfer belt 784 is trained around an upstream pulley 1000, a downstream pulley 1002, an idler pulley 1004 and a take-up pulley 1006. The pulleys 1000, 1002 and 1004 are mounted on respective shafts 1008, 1010 and 1012 that extend through and are rotatably supported by the relatively adjacent inner and outer side plates of the frame 702. The take-up pulley 1014 is rotatably supported on a shaft 1014 on a bracket 1016 adjustably mounted to the relatively adjacent frame side plate 806, 808 for adjusting the tension of the transfer belt. The shaft 1010 has keyed thereto another pulley 1018 over which a belt 1020 is trained. The belt 1020 is trained over a pulley 1022 on a coining gear drive shaft 1024 which is drivingly coupled to the main drive in the below described manner.

Figure 31C:
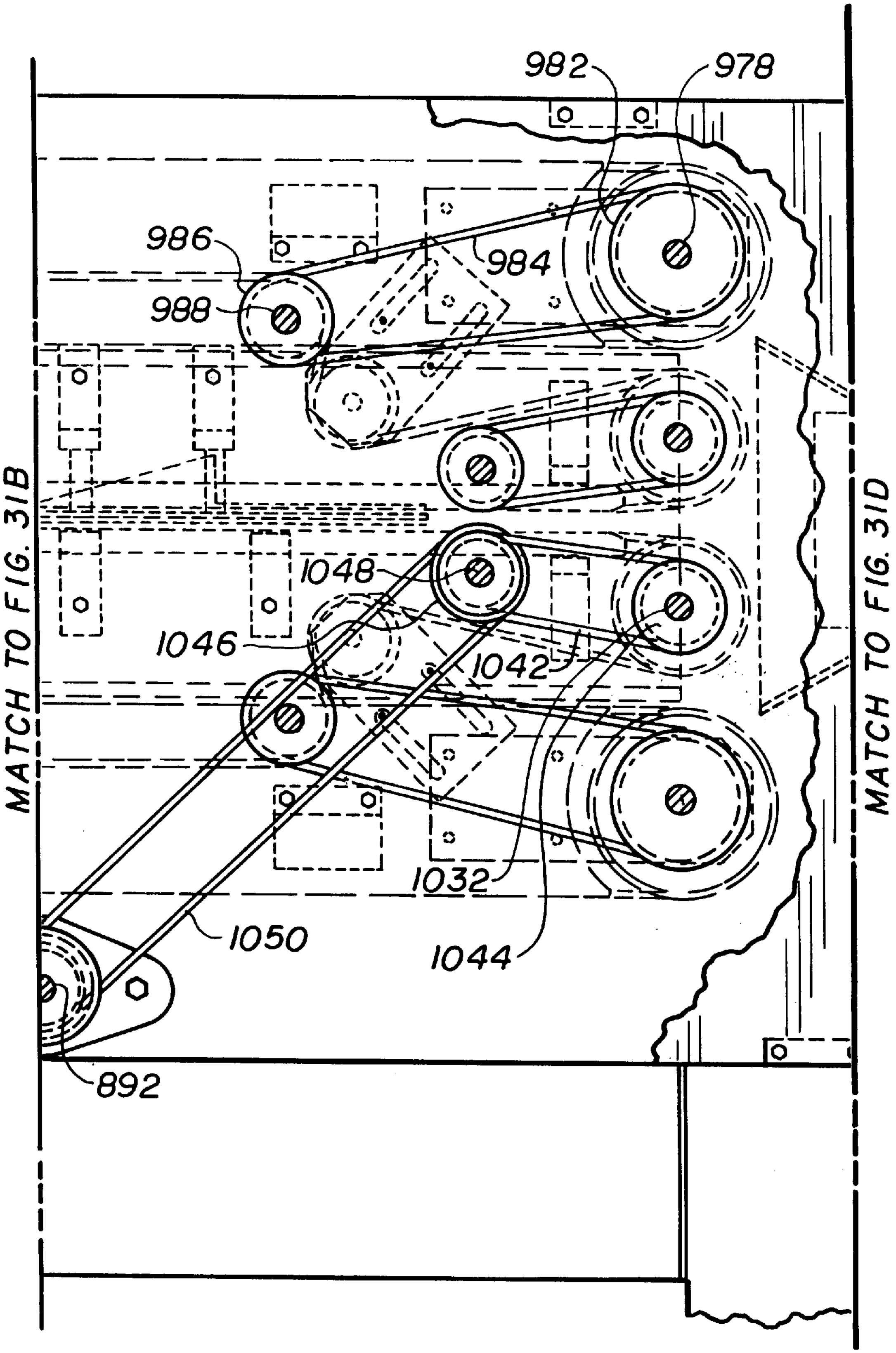

The other or lower transfer belt 786 is trained around a similar pulley system comprising upstream pulley 1026 and its shaft 1028, downstream pulley 1030 and its shaft 1032, idler pulley 1034 and its shaft 1036, and take-up pulley 1038 and its shaft 1040. As shown in FIG. 31C, a belt 1042 drivingly couples pulleys 1044 and 1046 respectively on the shafts 1032 and 1048. The shaft 1048 in turn is drivingly coupled by belt 1050 to the main drive shaft 892. The lower coining gear shaft 1048 at each side of the machine has keyed thereto a gear that is in mesh with a gear 1052 which, as shown in FIGS. 30C and 30D, is keyed to the upper coining gear shaft 1024 of the upper belt assembly 950. In this manner, the upper and lower belt assemblies 950 and 952 are drivingly connected for moving the respective corresponding belts thereof at the same speed. Also, the mating gears serve to synchronously connect the coining gears 1053, this avoiding excessive wear of the coining gears and assuring a desired connection pattern. As is preferred, the pulleys 1002 and 1030 are coupled to their respective shafts 1010 and 1032 by overrunning clutches to permit overrunning if the coining (perforating) gears feed material too fast, as might arise when using different weights of paper which affect the effective pitch diameter of the coining gears, the pinch belt and tube belt speeds being set for the minimum feed rate of the perforating gears.

The relatively adjacent flights of he belts 784 and 786 extending between the respective upstream and downstream pulleys have an inclined portion and a parallel portion. The parallel portions are supported, respectively, by the horizontal guides 790 and 792. The guides 790 and 792 are supported by adjustable brackets 1054 and 1056 secured to the relatively adjacent frame side plate. The guides, which may include guide grooves in the relatively adjacent sides thereof as shown in FIGS. 33–35, operate to sandwich therebetween the edges of the outer layers of the stock material. It is noted that edge transfer belts 784 and 786 move at the same speed as the center transfer belts 776 and 778 uniformly to advance the outer layers along the past-forming chute 768. The grooves in the guides may be provided with Teflon tape for reducing friction and wear between the belts and guides. More generally, any surface over which the belts of the machine may slide may be provided with Teflon tape or other friction reducing device.

The inclined portions of the relatively adjacent flights of the edge transfer belts 784 and 786 pinch the side portions of the outer layers against the inclined guides 780 and 782. The upstream ends of the guides 780 and 782 each preferably is angled inwardly to form a wide mouth 1058, 1059 for receiving the respective outer layer from the quick roller 773 (FIG. 32A). The guides 780 and 782, in the form of plates secured to the inner frame side plate, converge towards one another to bring the laterally outer edge portions of the outer layers together for passage between the edge transfer belts 784 and 786.

Turning now to the creasing and folding devices 728 and 730 shown in detail in FIGS. 30C, 30D, 32B and 34, it will be seen that the folding device 730 is similar to the above described folding device 49 shown in FIGS. 23–25 while the creasing device is formed by the upstream portion of such folding device, as opposed to the above described creasing device 48 which could be employed, if desired, in the machine 700. The thus composite creasing and the folding device comprises a bottom wall 1060, an outer side wall 1062, another outer wall 1064, and a central wall 1066. Preferably, the bottom wall, and the outer side walls are integrally formed, with the central wall being a separate component. In any event, these walls are shaped and arranged to crease and fold the tab portion to form the folded tab portion.

In the illustrated and preferred embodiment, the bottom wall 1060 projects perpendicularly from the outer side wall 1062 and includes an upstream section 1068, a downstream section 1070, and an intermediate section 1072 therebetween. The upstream section 1068 is triangular in shape and slopes upward towards the downstream end of the folding device. The intermediate section 1072 is essentially a level, rectangular extension of the base of the triangular section 1068, while the downstream section 1070 is basically a substantially thinner rectangular extension of the intermediate section 1072.

The outer side wall 1062 includes an upstream section 1074 and a downstream section 1076. The upstream section, which is coextensive with the upstream and triangular section 1068 of the bottom wall 1060, is shaped like a right trapezoid and tapers upwardly towards the downstream end of the folding device. Additionally, the upstream section 1074 includes an outwardly flared upstream edge 1078. The downstream section 1076, which is coextensive with the downstream and intermediate sections 1070 and 1072 of the bottom wall 1060, forms a rectangular extension of the narrower, proximate, end of the upstream section 1074.

The other side wall 1064 is coextensive with, and extends perpendicularly from, the edge of the downstream section 1070 of the bottom wall 1060. The outer side wall 1064 includes an upstream section 1080, which is triangular in shape and which slopes upwardly towards the downstream end of the folding device, and a downstream section 1082 which is rectangular in shape and which extends from the base of the triangular section 1080.

As was indicated above, the bottom wall 1060 and the side walls 1062 and 1064 are preferably integrally formed. Particularly, this integral collection of walls is attached to the adjacent side frame plate 808 by attachment members 1083.

The central wall 1066 is rectangular (with rounded bottom corners) in shape and includes an outwardly flared upstream edge 1084. The wall 1066 is horizontally positioned centrally between the outer side walls 1062 and 1064 and vertically positioned slightly above the downstream and intermediate sections 1070 and 1072 of the bottom wall 1060. Attachment members 1086 and suitable brackets 1088 are provided to couple the central wall 1066 to the side frame plate 808 and position it in the desired orientation relative to the other components of the folding device.

The folding device is dimensioned and arranged to receive the outer edge or tab portion of the outer plies. Additionally, the dimensions of the downstream sections of the bottom wall 1060 and the outer side walls 1062 and 1064 correspond to the dimensions of the desired folded tab portion.

The preferred folding process is essentially the same as that described above in connection with folding device 49 except that the overlapped edge portions of outer layers are not precreased. Accordingly, there is formed at each side a folded tab portion that is then advanced to the connecting device 732.

Referring now to FIGS. 30C, 30D, 32B and 35, the connecting device 732 is shown in detail. The connecting device is similar to the above described connecting device 50. Accordingly, the device includes connecting, or coining, members 1092 which are keyed to the downstream shaft members 988 and 1024 to receive the folded tab portion as it exits the folding device. In the illustrated embodiment, this position is upstream of the downstream pulleys 1002 and 1030. The coining members each include radially aligned, but axially offset teeth which are designed to form a coining pattern in the folded tab portion. Thus, the connecting device forms the continuous strip having the connected tab portion.

Figure 31D:
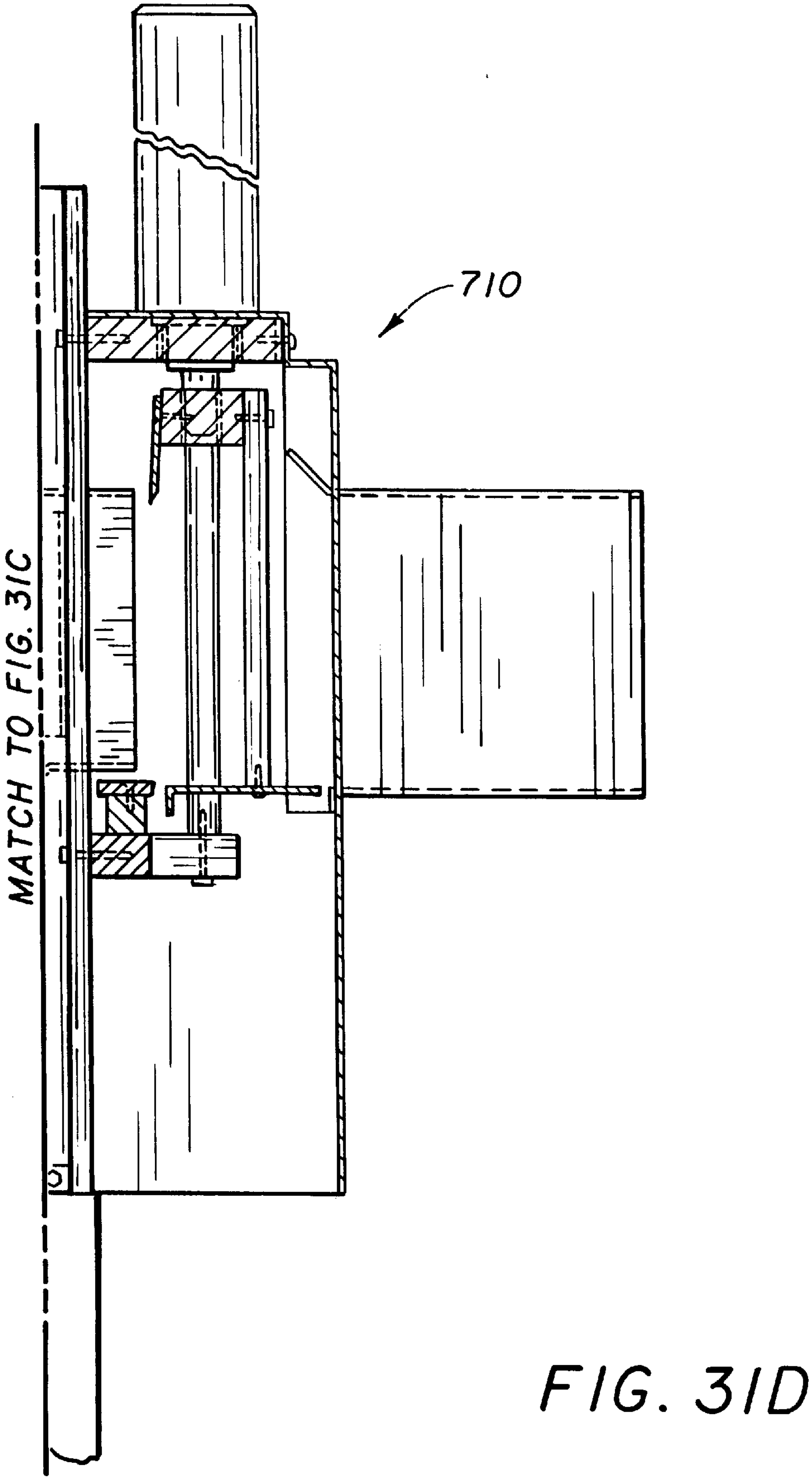

Referring now additionally to FIGS. 30E, 31D and 36, the strip-cutting assembly 710 is shown along with the relevant sections of the machine frame assembly. As was explained above, the strip-cutting assembly is preferably used to cut the continuous strip at a desired length to form a cushioning product. In this manner, the length of the cushioning product may be varied depending on the intended application. The particular construction and operation of the strip-cutting assembly is not essential to the present invention, and the following explanation is for exemplary purposes only. However, reference may be had to U.S. patent application Ser. No. 08/110,349 for a cutting assembly similar to that illustrated.

One may now appreciate that the present invention provides a cushioning conversion machine for converting multilayer stock material into a cushioning product. The construction of the cushioning product is such that the product's overall density is relatively low while at the same time the integrity of the product's cushioning qualities are maintained. Moreover, the cushioning product of the present invention may be, and preferably is, made of paper which is biodegradable, recyclable and renewable. Accordingly, the present invention provides an environmentally responsible alternative to plastic packaging products.

Although the invention has been shown and described with respect to a certain preferred embodiment, it is obvious that equivalent alterations and modifications will occur to others skilled in the art upon the reading and understanding of this specification. The present invention includes all such equivalent alterations and modifications and is limited only by the scope of the following claims.

What is claimed is:

1. A cushioning product made from multiple plies of stock material, the product comprising a pillow-like portion having a shell which surrounds the lateral sides of the pillow-like portion and stuffing within the shell;

the shell being formed from two plies of stock material; and the stuffing is formed only from the remaining plies of stock material;

wherein the stuffing is formed from a plurality of plies of stock material.

2. A cushioning product comprising a pillow-like portion made from multiple plies of a sheet-like stock material, the pillow-like portion including an inner stuffing and a shell which surrounds the inner stuffing;

the multiple plies of the sheet-like stock material including at least one ply and not more than two plies shaped to form the shell of the pillow-like portion and remaining plies which are crumpled to form the inner stuffing;

the inner stuffing being formed only from the remaining plies of the sheet-like stock material;

wherein all of the plies of the sheet-like stock material are of substantially the same width.

3. A cushioning product as set forth in claim 2 wherein the shell is formed from a single ply of the multiple plies of the sheet-like stock material.

4. A cushioning product as set forth in claim 3 wherein the stuffing is formed from a plurality of plies of the sheet-like stock material.

5. A cushioning product as set forth in claim 3 wherein the stuffing is formed from a plurality of plies of the sheet-like stock material.

6. A cushioning product as set forth in claim 2 wherein the shell is formed from two plies of stock material.

7. A cushioning product as set forth in claim 6 wherein the stuffing is formed from a plurality of plies of stock material.

8. A cushioning product as set forth in claim 7 further comprising two tab portions projecting from the opposite sides of the pillow-like portion and wherein each of the two plies of stock material forming the shell includes a central section, which together form a casing for the pillow-like portion, and two lateral end sections, respective ones of which form the two tab portions.

9. A cushioning product as set forth in claim 2 wherein the sheet-like stock material is paper.

* * * * *

UNITED STATES PATENT AND TRADEMARK OFFICE

CERTIFICATE OF CORRECTION

PATENT NO. : 6,254,945 B1
DATED : July 3, 2001
INVENTOR(S) : James A. Simmons

It is certified that error appears in the above-identified patent and that said Letters Patent is hereby corrected as shown below:

<u>Column 38,</u>
Line 19, after "claim" please change "3" to -- 2 --.

Signed and Sealed this

Nineteenth Day of March, 2002

*Attest:*

JAMES E. ROGAN
*Director of the United States Patent and Trademark Office*

*Attesting Officer*